United States Patent
Gordin et al.

(10) Patent No.: US 6,692,142 B1
(45) Date of Patent: Feb. 17, 2004

(54) APPARATUS, METHOD, AND SYSTEM OF A MOVEABLE LIGHTING

(75) Inventors: Myron K. Gordin, Oskaloosa, IA (US); Greg Kubbe, Ottumwa, IA (US); Thomas A. Stone, University Park, IA (US); James Whitson, Oskaloosa, IA (US); James Marshall, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 09/632,960

(22) Filed: Aug. 4, 2000

(51) Int. Cl.[7] ............................. F21S 13/10; F21S 8/08
(52) U.S. Cl. ....................... 362/431; 362/413; 362/414; 362/418; 362/424
(58) Field of Search .................. 362/431, 414, 362/418, 424, 249, 386, 286, 285, 413, 427, 250; 248/218.4, 219.2, 230.1, 352, 354.1, 539, 540

(56) References Cited

U.S. PATENT DOCUMENTS

| | | |
|---|---|---|
| 859,233 A | 7/1907 | Lane |
| 976,879 A | 11/1910 | Hughs |
| 980,580 A * | 1/1911 | Williams ............... 362/413 |
| 1,542,575 A | 6/1925 | Perry |
| 1,567,301 A | 12/1925 | Ross |
| 2,036,771 A | 4/1936 | Pfistershammer |
| 2,243,190 A | 5/1941 | Capaldo |
| 2,632,850 A | 3/1953 | Anderson |
| 2,750,155 A | 6/1956 | Nixon |
| 2,791,453 A | 5/1957 | Baker et al. |
| 2,792,947 A | 5/1957 | Weedman |
| 2,819,385 A | 1/1958 | Smith |
| 2,892,647 A | 6/1959 | O'Neill |
| 2,911,518 A | 11/1959 | Anderson |
| 3,103,375 A | 9/1963 | McMullin |
| 3,361,456 A | 1/1968 | Durand |

(List continued on next page.)

FOREIGN PATENT DOCUMENTS

| | | |
|---|---|---|
| AU | B-20518/92 | 1/1993 |
| CA | 627522 | 9/1961 |
| CA | 2060585 | 10/1992 |
| DE | 426074 | 3/1935 |
| DE | 2255713 | 11/1972 |
| EP | 0440531 B1 | 8/1991 |
| ES | 2105960 | 10/1997 |
| FR | 876891 | 11/1941 |
| FR | 1162522 | 2/1955 |
| FR | 2276446 | 1/1976 |
| FR | 2536780 | 11/1982 |
| GB | 279691 | 11/1927 |
| GB | 586007 | 3/1947 |
| GB | 862350 | 3/1961 |
| GB | 2272717 | 5/1994 |
| WO | WO98/14676 | 4/1998 |

OTHER PUBLICATIONS

Union Metal Corporation; *Abacus–raising and lowering lighting cols. 3m to 35m height*; Printed in England; 1985, Abacus Municipal Ltd.; 13 pg. brochure.

Primary Examiner—Sandra O'Shea
Assistant Examiner—Bao Truong
(74) Attorney, Agent, or Firm—McKee, Voorhees & Sease, P.L.C.

(57) ABSTRACT

An apparatus, method, and system for lighting includes one or more moveable bases, one or more lighting arrays, and one or more extendable poles. The base, pole, and array are designed to allow elevation of the array to heights exceeding 35', yet the combination is transportable by conventional over-the-road trucks. In one form, a plurality of bases, poles, and arrays are designed to fit on a conventional over-the-road trailer for transport on one trailer to a lighting location.

41 Claims, 69 Drawing Sheets

U.S. PATENT DOCUMENTS

| | | | |
|---|---|---|---|
| 3,452,837 A | 7/1969 | Herrell | |
| 3,656,287 A | 4/1972 | Morrison et al. | |
| 3,865,498 A | 2/1975 | Okuto et al. | |
| 3,949,218 A | 4/1976 | Hayward | |
| 3,957,124 A | 5/1976 | DeSourdy | |
| 3,982,715 A | 9/1976 | Lindgren et al. | |
| 4,033,080 A | 7/1977 | Fukushima | |
| RE30,000 E | 5/1979 | Loffler et al. | |
| 4,181,929 A | 1/1980 | Barber et al. | |
| 4,190,117 A | 2/1980 | MacLean | |
| 4,190,881 A | 2/1980 | Drost et al. | |
| 4,220,981 A * | 9/1980 | Koether | 362/431 |
| 4,228,489 A | 10/1980 | Martin | |
| 4,264,051 A | 4/1981 | Walmsley et al. | |
| 4,319,311 A * | 3/1982 | Mitchell | 362/250 |
| 4,423,469 A | 12/1983 | Zerlaut et al. | |
| 4,423,471 A | 12/1983 | Gordin et al. | |
| 4,450,507 A | 5/1984 | Gordin | |
| 4,492,496 A | 1/1985 | Arnold | |
| 4,617,768 A | 10/1986 | Gebelius | |
| 4,673,157 A | 6/1987 | Wells | |
| 4,712,167 A | 12/1987 | Gordin et al. | |
| 4,729,077 A | 3/1988 | Gordin et al. | |
| 4,765,441 A * | 8/1988 | David et al. | 187/9 E |
| 4,779,168 A | 10/1988 | Montgomery | |
| 4,918,896 A | 4/1990 | Wiese | |
| 5,207,747 A | 5/1993 | Gordin et al. | |
| 5,313,378 A | 5/1994 | Gordin et al. | |
| 5,337,221 A | 8/1994 | Gordin et al. | |
| 5,398,478 A | 3/1995 | Gordin et al. | |
| 5,509,502 A | 4/1996 | Beaulieu | |
| 5,531,419 A | 7/1996 | Gustafsson et al. | |
| 5,540,017 A | 7/1996 | Eilam et al. | |
| 5,623,786 A | 4/1997 | DeMeyer | |
| 5,624,046 A | 4/1997 | Zimmermann | |
| 5,757,597 A | 5/1998 | Frank, Sr. | |
| 5,944,413 A | 8/1999 | Crookham et al. | |
| 6,202,369 B1 | 3/2001 | Partee et al. | |
| 6,446,408 B1 | 9/2002 | Gordin et al. | |

\* cited by examiner

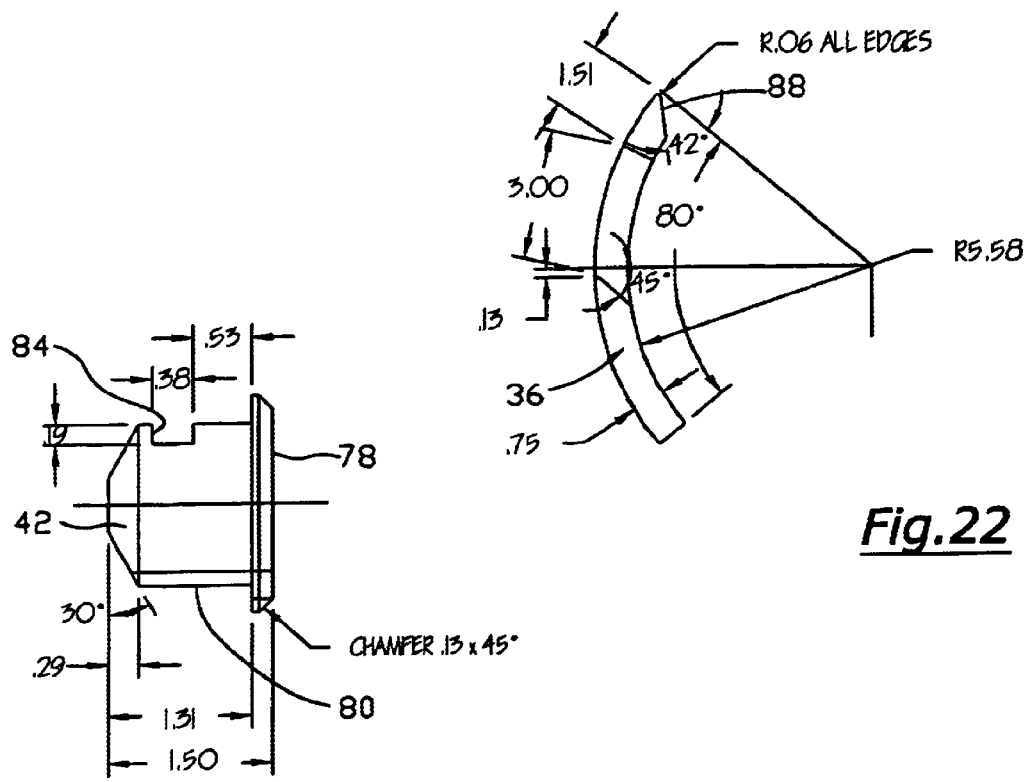
*Fig. 22*
*Fig. 21*
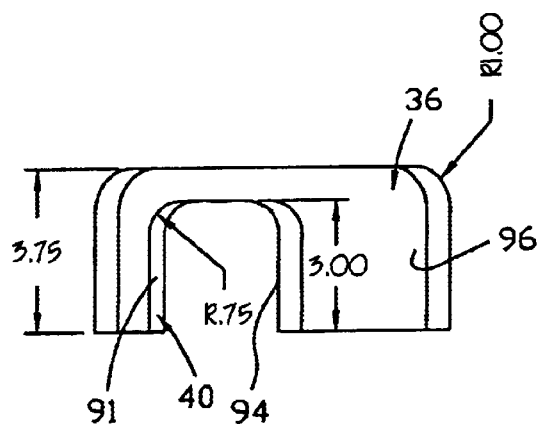
*Fig. 23*

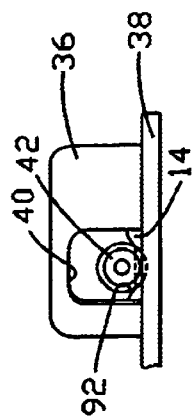
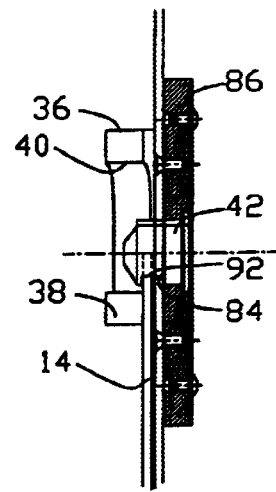
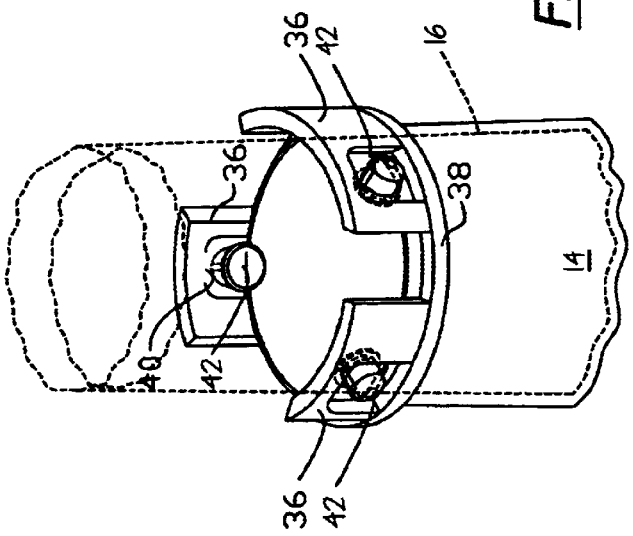
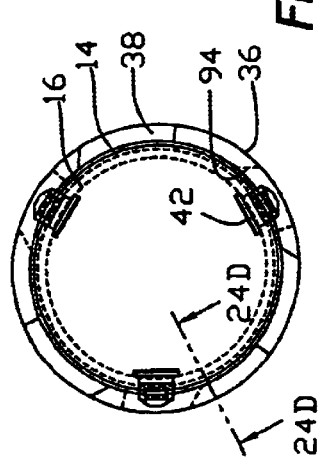

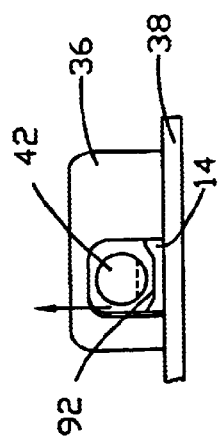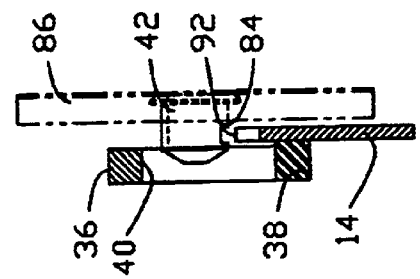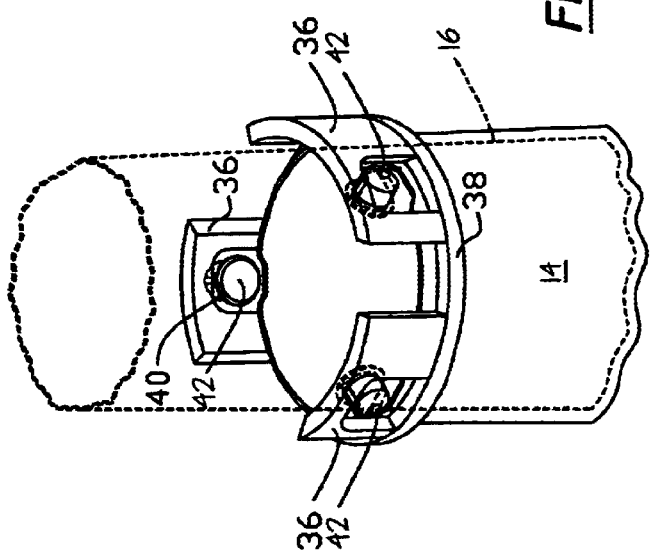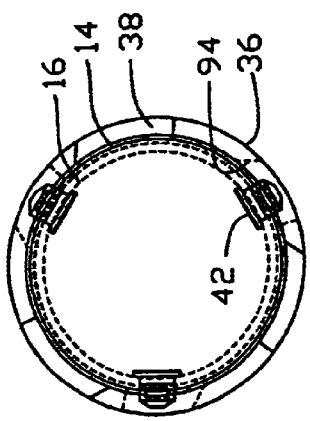

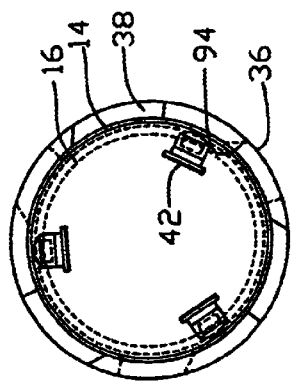
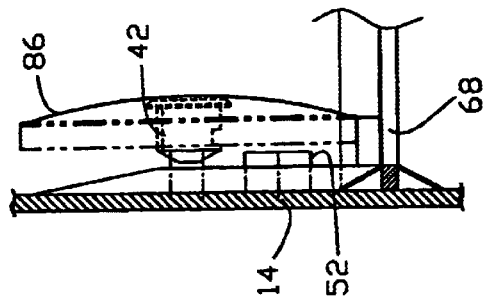
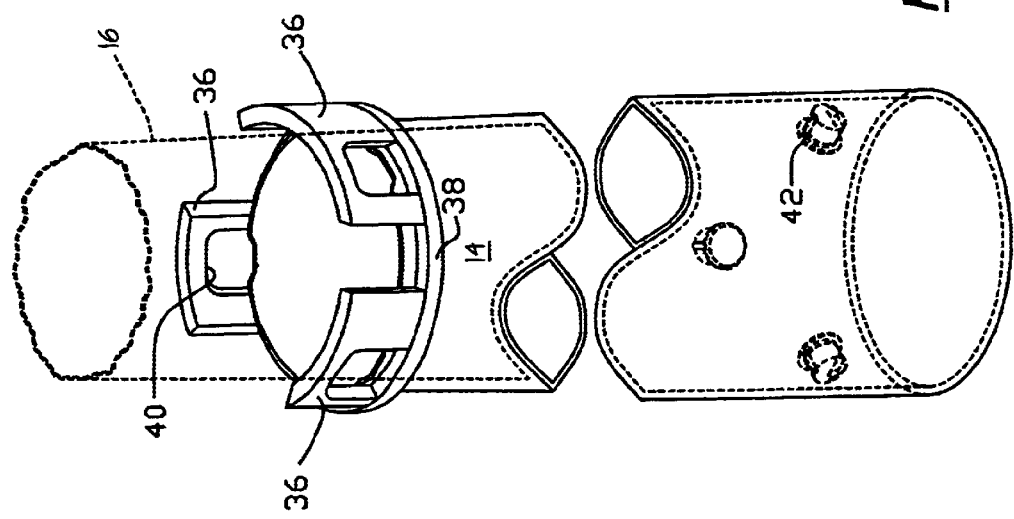

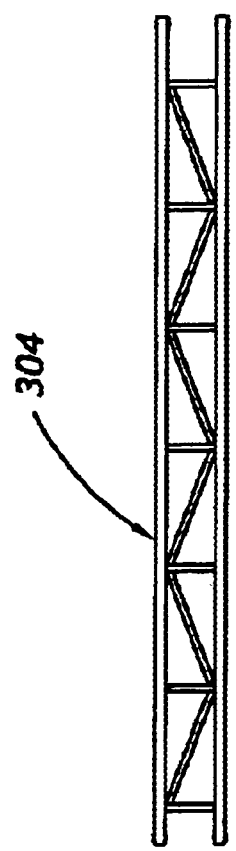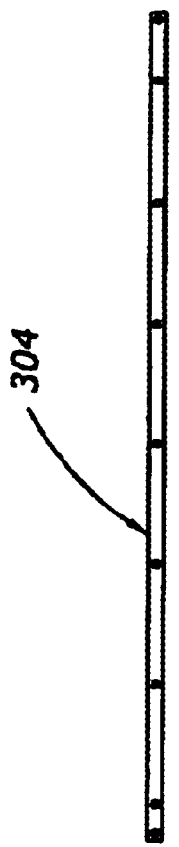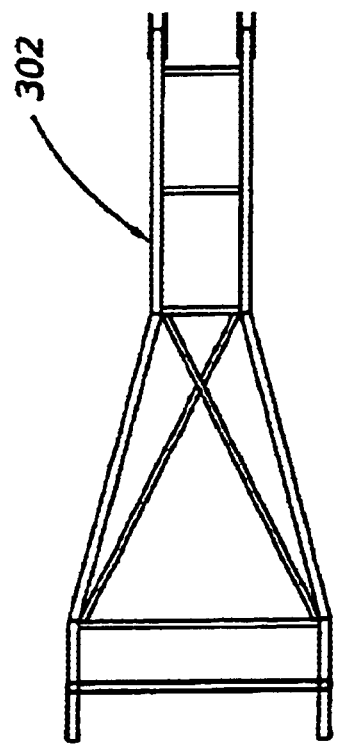

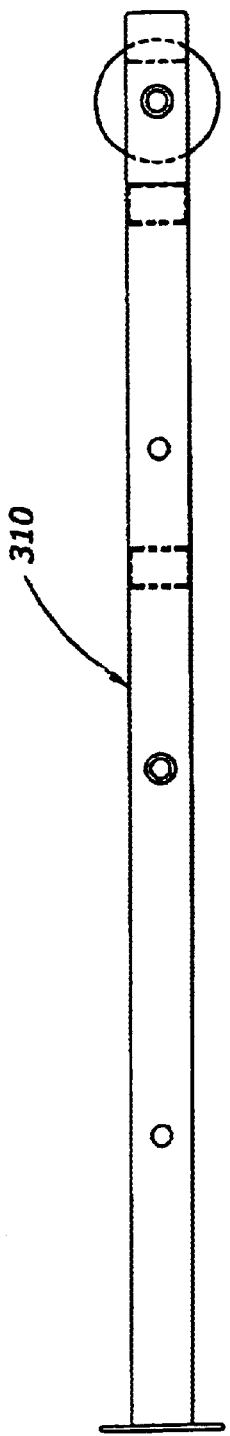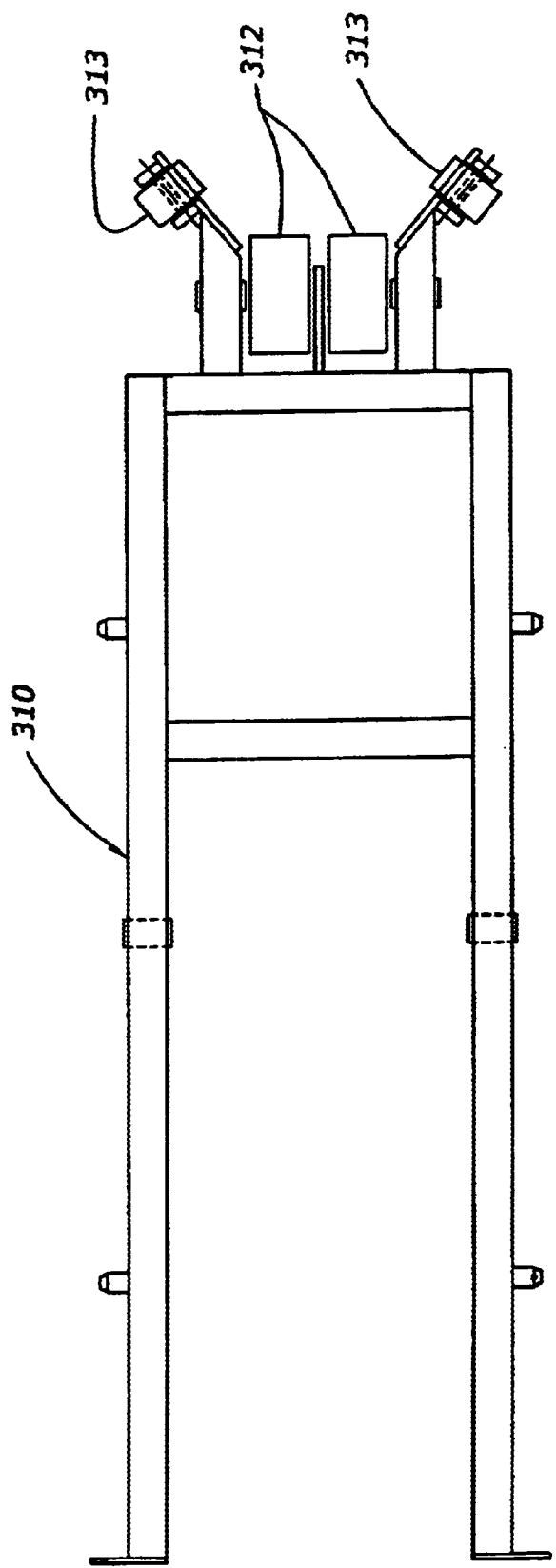

APPARATUS, METHOD, AND SYSTEM OF A MOVEABLE LIGHTING

BACKGROUND OF THE INVENTION

1. Field Of The Invention

The present invention relates to lighting, and in particular, to lighting relatively large or distant areas.

2. Problems In The Art

The need for temporary or moveable lighting has been long-standing. Adequate solutions exist for relatively small lighting tasks. Hand-held spotlights, shop lights, tripod-mounted lights, and the like are relatively inexpensive and easy to handle. Larger, temporary lighting applications tend to utilize larger, more high intensity lights. It is generally desirable to elevate such lights as high as possible. Therefore, such lights are either temporarily mounted on existing elevated structures, such as buildings, permanent elevated structures, and the like, or large scaffolds are built to elevate such lights.

Many applications do not have the necessary existing structure upon which to simply mount temporarily lights. Scaffolds or temporary towers are time-consuming and cumbersome to erect and then take down.

Still further, it is simply not practical, and sometimes not feasible, to elevate lights sufficiently to achieve needed temporary lighting. Sometimes the only options are to either accept less than adequate smaller temporary lighting, or utilize very costly alternatives. One such alternative is to utilize large cranes or equipment to elevate lights. The cost of having such equipment dedicated to a temporary lighting purpose is often economically impractical.

U.S. Pat. Nos. 4,423,471 and 5,207,747, co-owned by the owner of the present application, illustrate high intensity moveable lighting systems. Crane booms are mounted on substantial sized truck beds. The boom elevates an array of lights. While these systems are very flexible and highly moveable, again, they result in dedicated, costly equipment used for such temporary lighting.

A need exists in the art for moveable or temporary lighting for relatively large or distant target areas by light sources that can be elevated to substantial heights. The higher the elevation; the more flexibility with respect to lighting. Furthermore, it is often desirable to elevate lights to substantial heights to eliminate glare from the lights or spill of light outside of the target area. This can be a significant safety issue, for example, for highway construction zones.

It is therefore a principal object of the present invention to provide a method and apparatus which solves or overcomes the problems and deficiencies in the art.

Other features, objects and advantages of the present invention include a method and apparatus for a lighting system which is:

a. Temporary.
b. Moveable.
c. Erectable and disassemble relatively quickly and easily.
d. Provides large, wide and/or distance area lighting.
e. Has a lot of flexibility, allowing selection of a package of lighting features for a variety of lighting applications.
f. Efficient.
g. Economical.
h. Minimizes labor costs.
i. Minimizes labor time for erection and disassembly and transportation.
j. Durable.
k. Integratable with a complete moveable lighting system, including power generation and power control and connections.
l. Uses conventional and readily available components.
m. Does not require dedicated large equipment and machines.
n. Utilizes relatively non-complex structure.

These and other objects, features and advantages of the invention will become more apparent with reference to the accompanying specification and claims.

SUMMARY OF THE INVENTION

The present invention includes lighting apparatus comprising at least one moveable base, at least one pole having a lower end adapted to mount on the base and an upper end adjustable between a retracted position and an extended position of substantial height, and at least one high intensity lighting fixture adapted to mount on the upper end of a pole.

The present invention also includes, in one form, a lighting system comprising a plurality of such moveable bases with a plurality of such poles and a plurality of lighting arrays.

The present invention also includes, in one form, a method of lighting comprising providing a moveable base, lighting array, and extendible pole as previously described that can elevate the lighting fixture to substantial heights but all components can be transported on standard over-the-road tractor-trailer combinations.

BRIEF DESCRIPTION OF THE DRAWINGS

FIG. 21 is a side elevational view of the pin of FIG. 20.

FIG. 22 is a top plan view of a latch catch for the catch pin of FIG. 4.

FIG. 23 is a front elevational view of FIG. 22.

FIG. 24A is an enlarged perspective view of two pole sections in an extended and locked position.

FIG. 24B is an isolated elevational view of the latch pin and latch catch of FIG. 24A.

FIG. 24C is a top view of FIG. 24A.

FIG. 24D is a section view taken along line 24D—24D of FIG. 24C.

FIGS. 25A–D are similar to FIGS. 24A–D except that the two pole sections are moved slightly relative to one another along the longitudinal axis.

FIGS. 29A–29C are similar to FIGS. 28A–28D but show two pole sections completely retracted relative to one another.

FIG. 44 is a top plan view of a portion of the device depicted in FIG. 42 for raising the pole.

FIG. 45 is a top plan view of another portion of the device in FIG. 42 for raising the pole.

FIG. 46 is a side elevation of FIG. 46.

FIG. 47 is a top plan view of a still further portion of the device in FIG. 42 for raising the pole.

FIG. 48 is a side elevation of FIG. 48.

DETAILED DESCRIPTION OF THE PREFERRED EMBODIMENT

Figure 1:
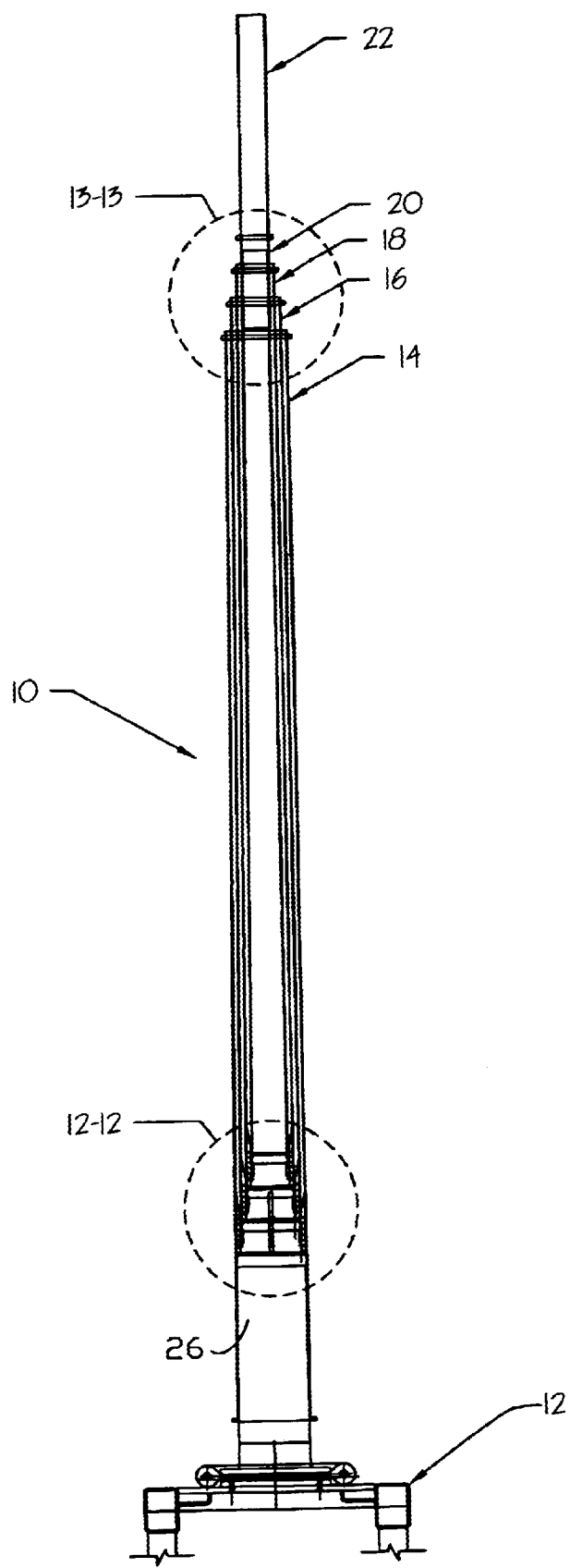
FIG. 1 is a front elevational partial sectional view of a collapsible pole, according to preferred embodiment of the present invention, shown in a collapsed position on a base.

To achieve a better understanding of the invention, one embodiment thereof will now be described in detail. Frequent reference will be taken to the drawings. Reference numbers and letters will be used in the drawings to indicate certain parts and locations in the drawings. The same reference numbers or letters will be used throughout the drawings to indicate the same parts and locations, unless otherwise indicated.

General Environment

This detailed description describes a lighting system including six high intensity lighting arrays, six telescopically extendible poles, and six moveable bases. Components are sized to fit on an approximately 50-foot long conventional over-the-road tractor-trailer combination that has a maximum total weight capacity of approximately 80,000 pounds. It is to be understood that the invention is not limited to this specific combination. The aspects of the invention are defined solely by the claims.

General Structure

Figure 30:
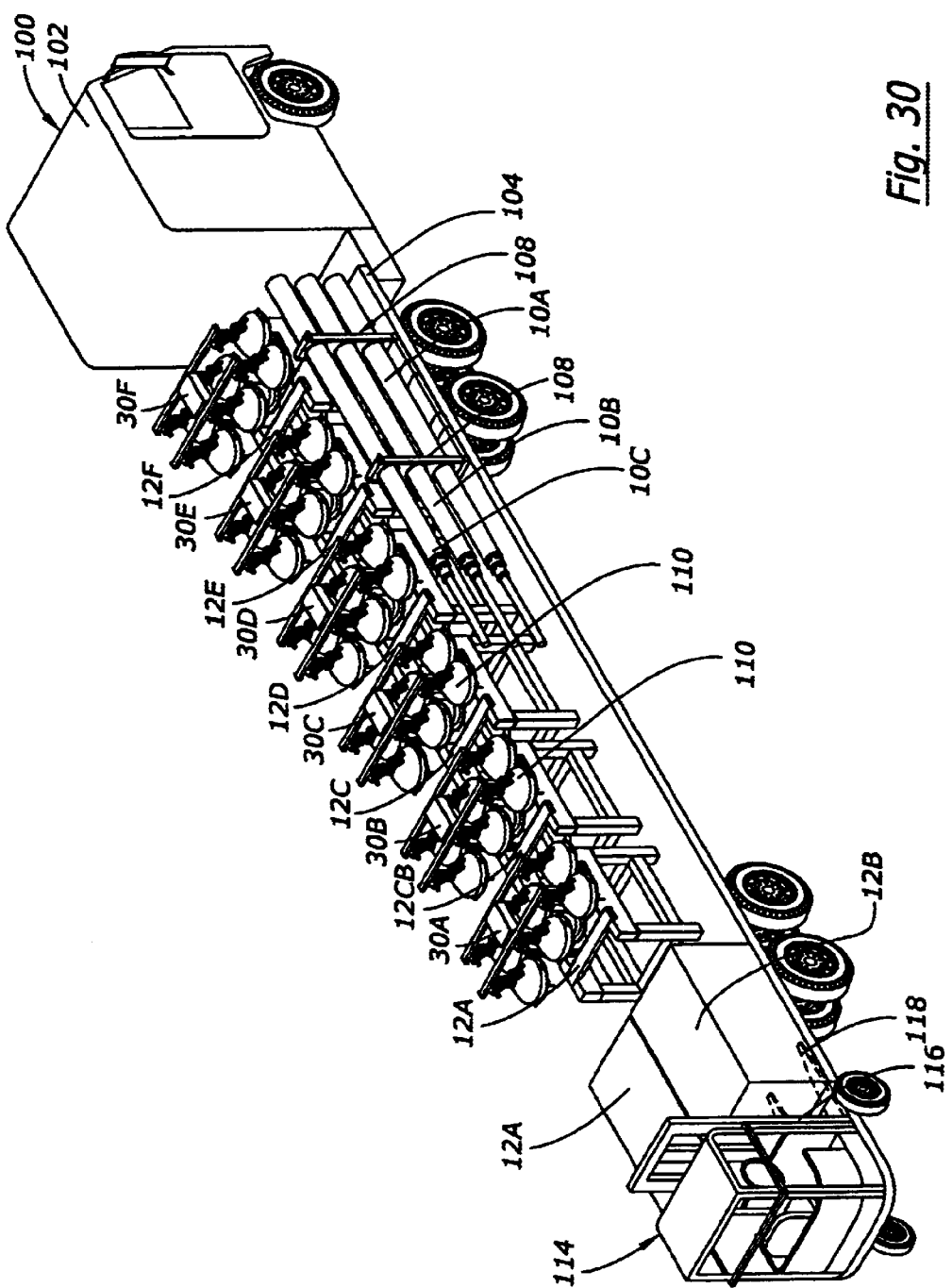
FIG. 30 is perspective view of a lighting system according to the invention in disassembled form loaded for transport.

A moveable lighting system according to the present invention is illustrated at FIG. 30. Conventionally over-the-road tractor-trailer 100 includes a tractor 102 and a flatbed trailer 104. Its components are conventional, meet state and federal transportation regulations, and do not require special permits. Tractor-trailer 100 is highly maneuverable, can travel over most roadways and is a relatively efficient and economical way to transport equipment, especially over substantial distances.

Trailer 104 includes static receivers or brackets 106 attached at its rear. Brackets 106 receive the forks of the lift of lift truck 114 and holds and supports a lift truck 114. Removable mounting of lift truck 114 to trailer 104 is conventional and available from a variety of manufacturers. One example is a Moffett Mounty truck mounted fork lift, models M4000-standard or M5000-standard (or high flotation or building supply style) with Moffett Smooth Ride Mounting Kit (from Moffett Engineering Ltd., Ardee Road, Dundalk, County Louth, Ireland and available from Cargotec, Inc., Swanton, Ohio). Lift truck 114 is a relatively small in size lift truck. Another example is model #M-8000 from Cargotec. Lift truck 114 includes a mast 116 and forks 118. Mast height is approximately 181 inches (raised). Forks 118 can travel on mast approximately 12 feet.

FIG. 30 shows six bases 12 (differentiated as 12A–12F) on or along the longitudinal axis of trailer 104. Six poles 10 (differentiated as 10A–10F) are positioned three on each opposite side of trailer 104. Pole racks 108 assist in holding poles 10A–F in position (see also FIG. 37).

Six lighting arrays (designated generally as 30A–30F) are mounted on top of bases 12A–12F respectively.

Two diesel-powered, electrical generators 112A and B are mounted at the rear of flatbed of trailer 104 (for example Kohler 40,000 watt sound attenuated generators-4' wide, 8' long, 4' tall). They could be mounted elsewhere in various configurations with the other components to stay below maximum Department of Transportation (DOT) axle weight rules. They could also be removed, e.g., at the lighting site.

Generators 112A and B fixedly mount on trailer 104 by methods within the skill of those skilled in the art. Likewise, lift truck 114 is removably secured to the back of trailer 104 by mount 106 in a conventional manner (e.g. to static mounting brackets 106 and uses its own forks and power to lift and lower lift truck 114 to and from stowed position). Each of bases 12A–F could be releasably secured to trailer 104 by a variety of means(e.g. chains), and poles 10A–F likewise secured appropriately.

As will be discussed in more detail later, lighting arrays 30A–F are removably mounted on bases 12A–F and may not require any additional securing components, although such can be used if desired.

Figure 31:
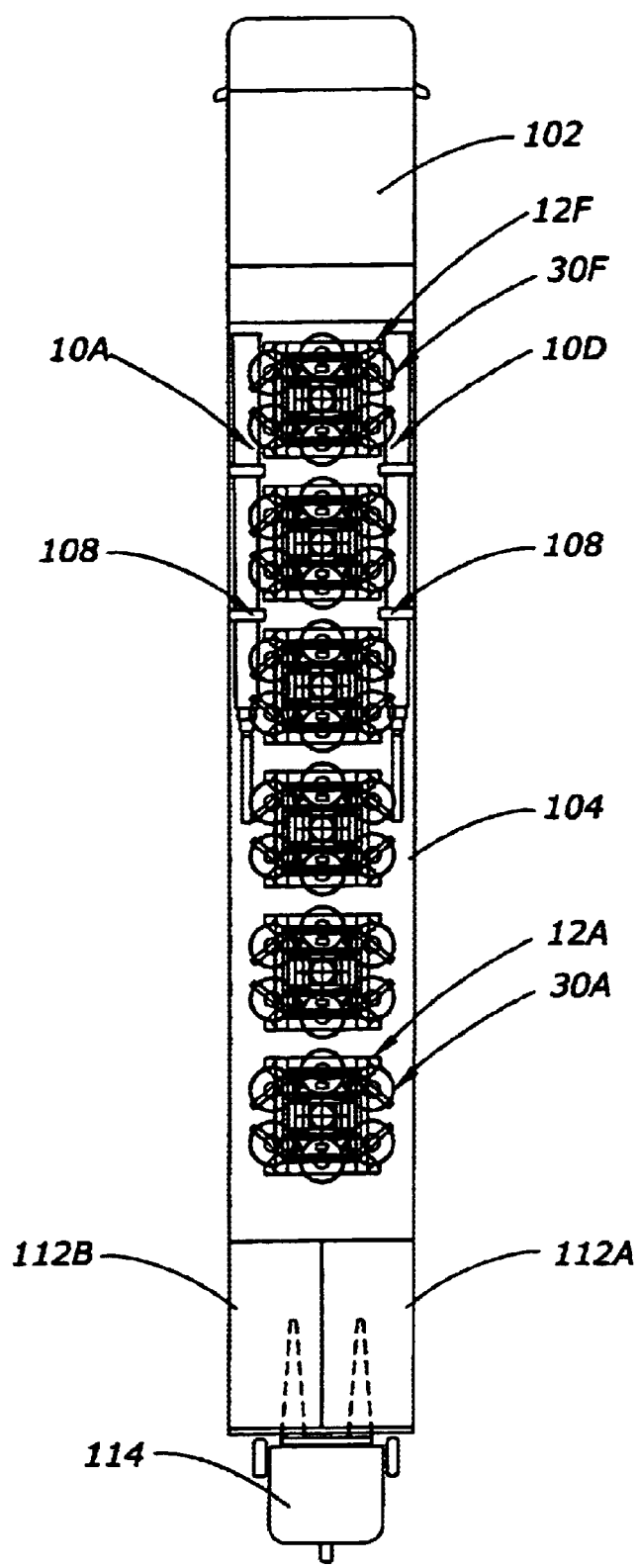
FIG. 31 is a top elevational view of FIG. 30.

Therefore, FIGS. 30 and 31 illustrate a lighting system that can be transported directly to location. The relatively small lift truck 114 is the only relatively expensive and complex machinery needed to unload bases 12A–F, poles 10A–F, and lighting arrays 30A–F, and position and install them. The lighting system of FIG. 30 is designed so that combined total weight does not exceed permissible conventional over-the-road tractor-trailer weight (for example 80,000 pounds). The system does not exceed height maximums or weight or length maximums that would require special handling or special permits.

Lighting arrays 30A–F will be described in more detail later. Each light fixture 110 comprises a parabolic reflector 109 (approximately 23 inches in diameter) with an adjustable mount 111 (e.g. articulatable elbow joint attached to bulb cone) to cross-arm 113 (see FIG. 32). A high-intensity arc lamp (1,000 watts or more) is mounted in fixture 110. As can be seen, six fixtures 110 exist for each lighting array 30F. Each fixture 110 can be adjusted relative to its cross-arm 113 and locked in position. Alternatively, it is possible to include actuators (not shown) that would allow remote positioning of fixture 110. An example is disclosed at U.S. Pat. No. 4,712,167, which is incorporated by reference herein.

Six fixtures 110 of such high intensity and directability can provide highly flexible, high-intensity lighting for wide and/or distance areas or targets. Six such arrays 30 each elevated 60' or so, provide a highly flexible large area lighting system that exceed the coverage and/or intensity of most, if not all, conventional portable lighting systems of the type that are pulled on small trailers behind pick-up trucks or small straight trucks and which have one to four lighting fixtures that elevate between 7' and 30' in the air.

Figure 50:
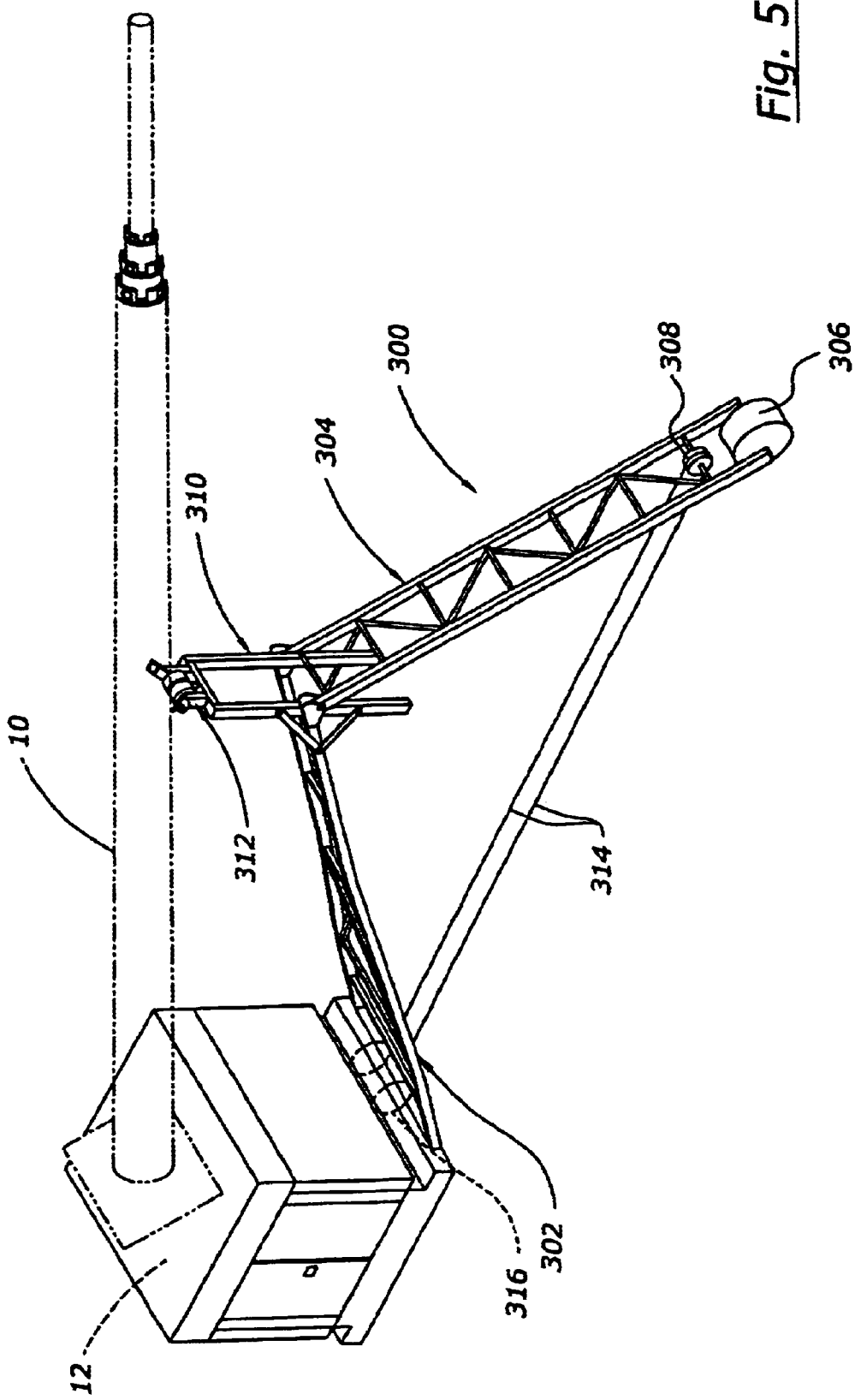
FIG. 50 is a perspective view similar to FIG. 42 but showing how the device of FIG. 42 can raise the pole to a vertical position.

Trailer 104 is 47' to 48' long. Lift truck 114 adds an additional 5' to trailer 104 (together not exceeding 53'). Trailer 104 is approximately 8' wide. As illustrated in FIGS. 30 and 31, bases 12A–F are approximately 5' wide by 5' deep, and 5' tall. It is usually desirable to have as big a foot print on the ground or supporting surface as possible, to support poles that extend to such heights (35' to 120' for example) in the air. As shown in FIG. 50, doors and/or shelves could be included to allow storage of items in base 12. The size and available foot print of the base are determined by a number of factors, including weight, center of gravity and foot print needed for the fixtures and pole being elevated. The interior of base 12 has therefore been maximized to can provide space for supporting equipment (e.g. cables and electrical wires) and spare parts. Enough room is left for stacking poles 10A–C and 10D–F on opposite sides of bases 12, and for generators 112A and B at the back of trailer 104.

For more details regarding an example of a base 12, reference can be taken to co-pending U.S. patent application Ser. NO. 09/217,975, commonly owned by the owner of the present application, which is incorporated by reference herein. Additional reference can be taken to U.S. Pat. No. 5,944,413, also incorporated by reference herein.

Figure 32:
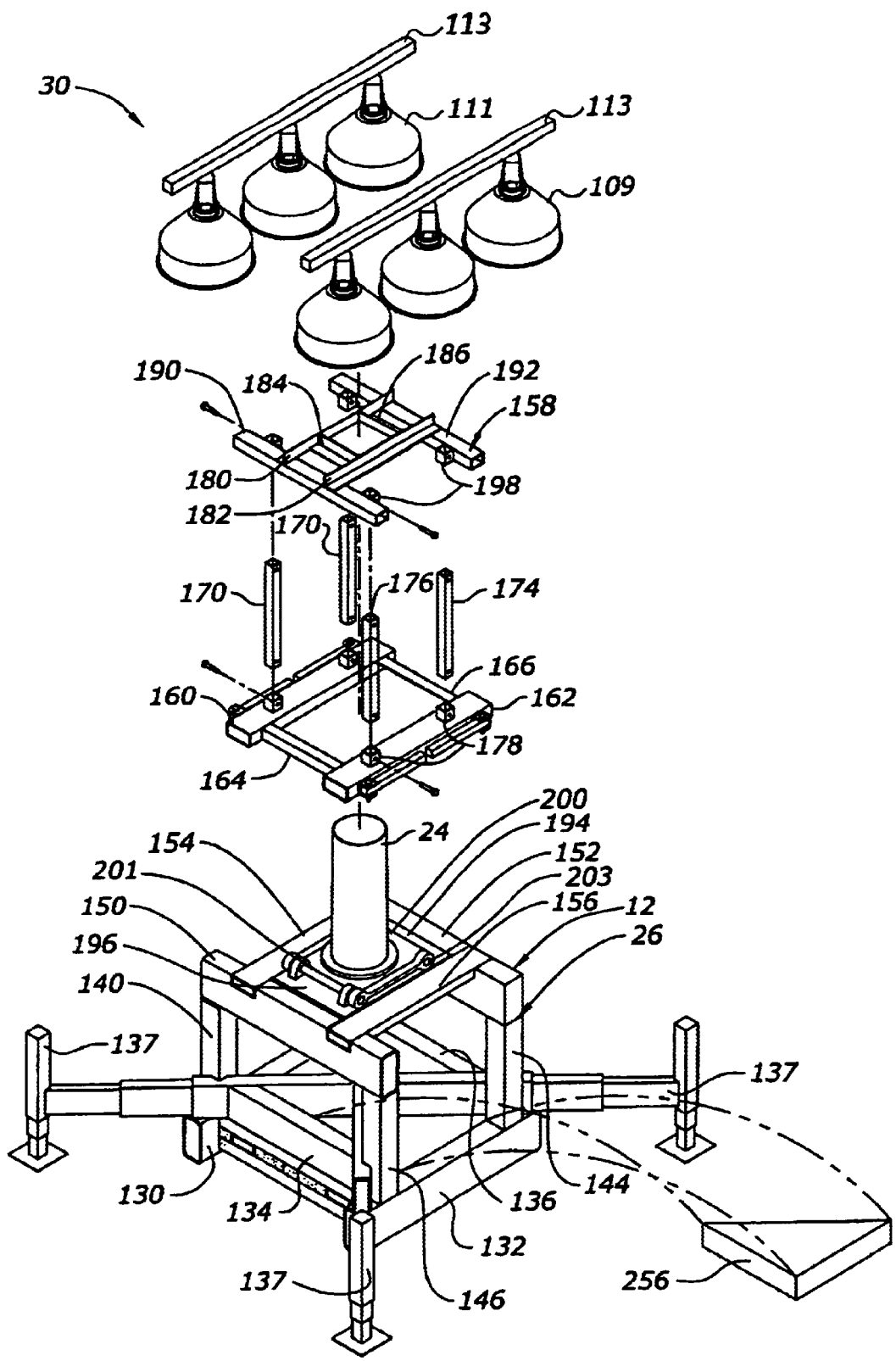
FIG. 32 is an enlarged isolated view generally illustrating a base and a lighting array and its transport mount to the base, shown in exploded form from the base.
Figure 33:
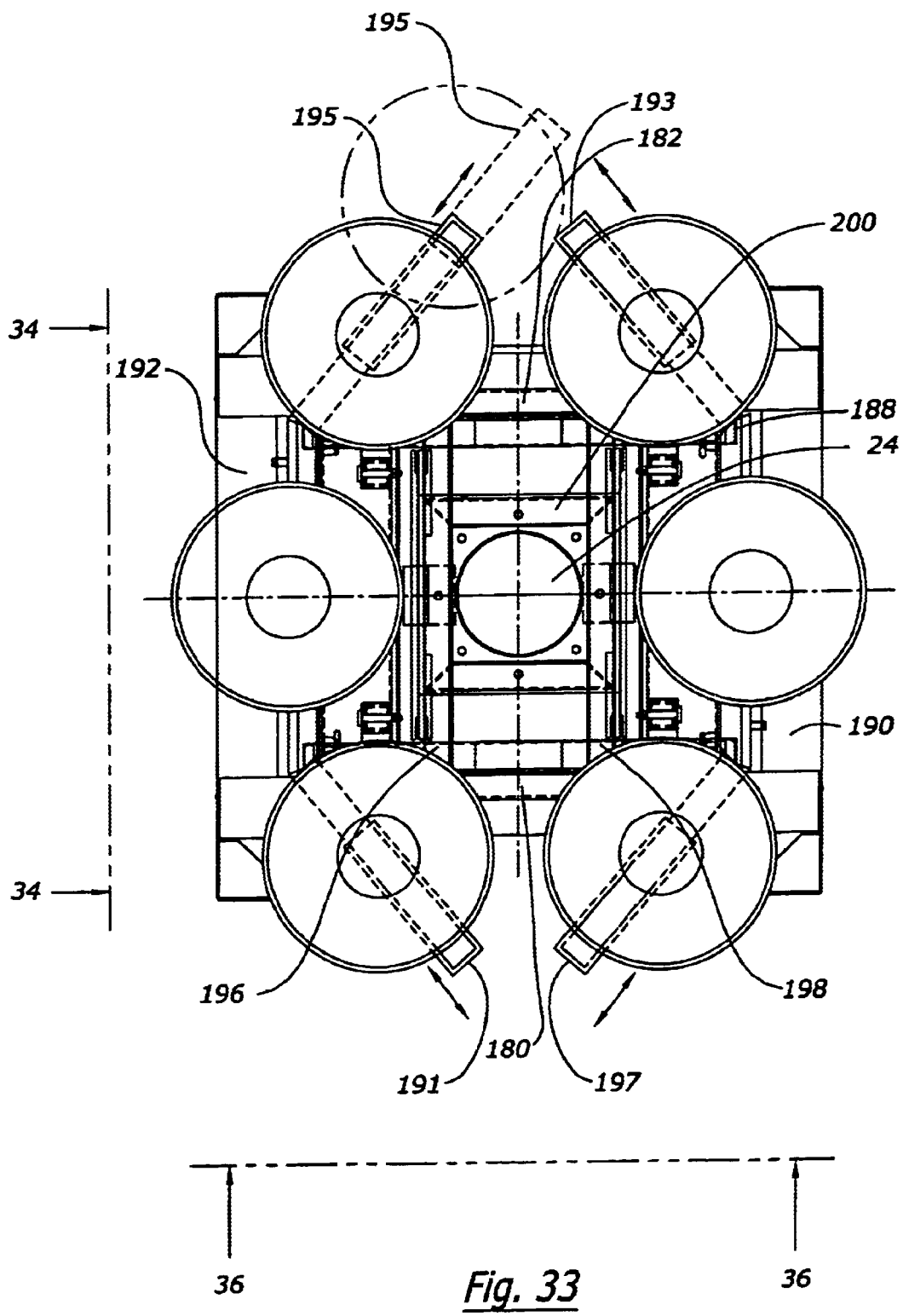
FIG. 33 is a top plan view of a base, lighting array and transport mount similar to that of FIG. 32, showing an optional lighting array.
Figure 34:
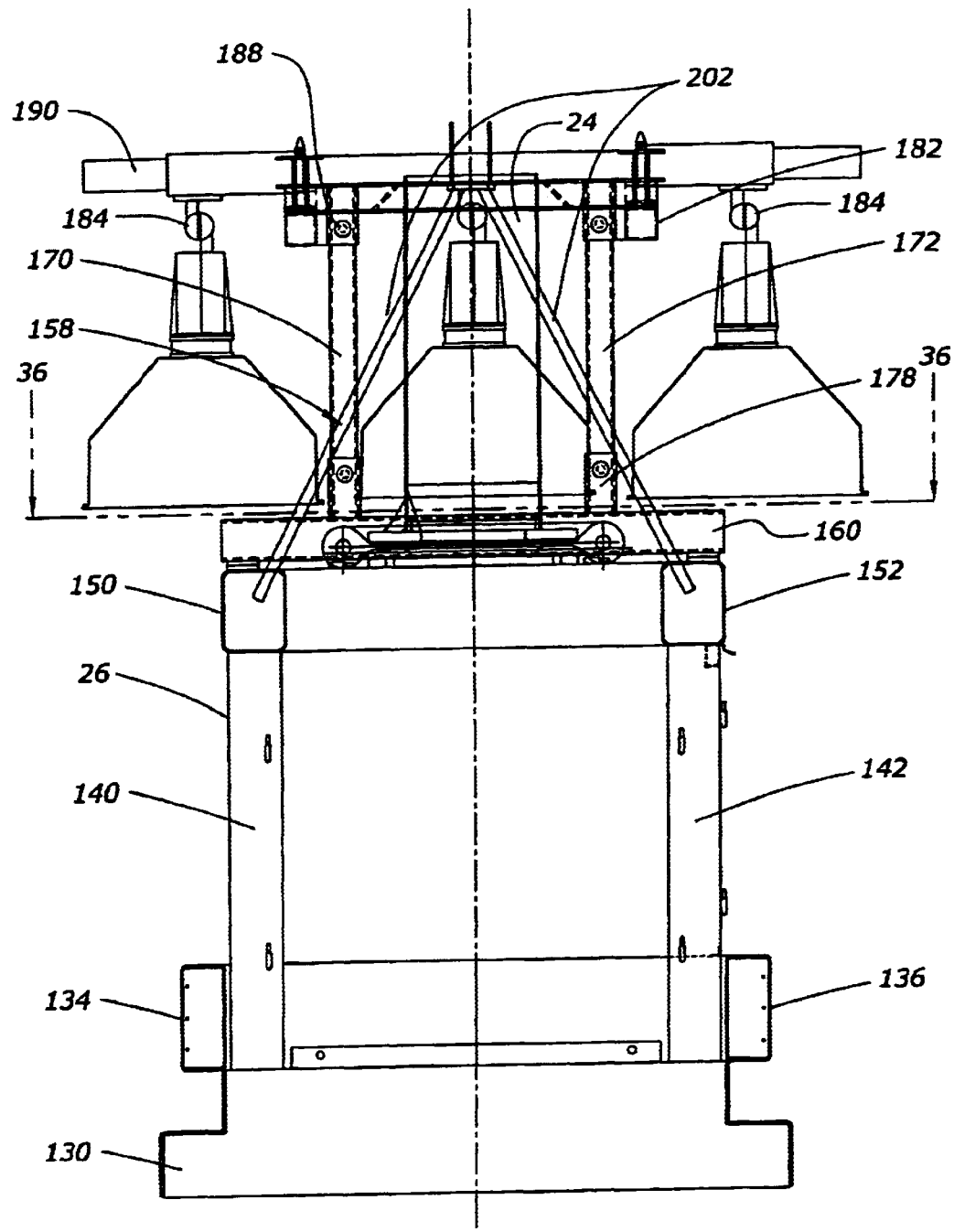
FIG. 34 is an elevational view taken along line 34—34 FIG. 33.
Figure 35:
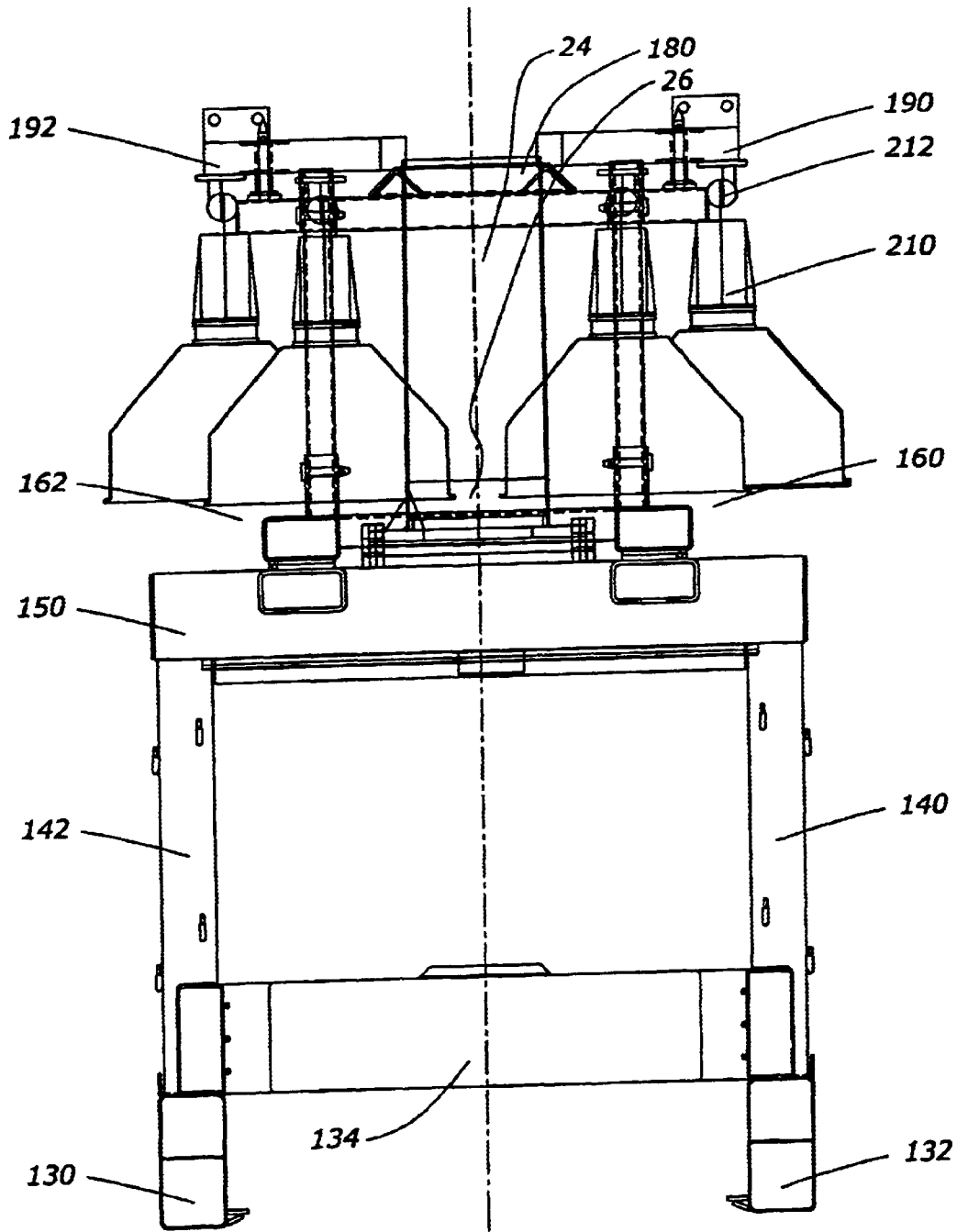
FIG. 35 is an elevational view taken along line 36—36 of FIG. 33.
Figure 36:
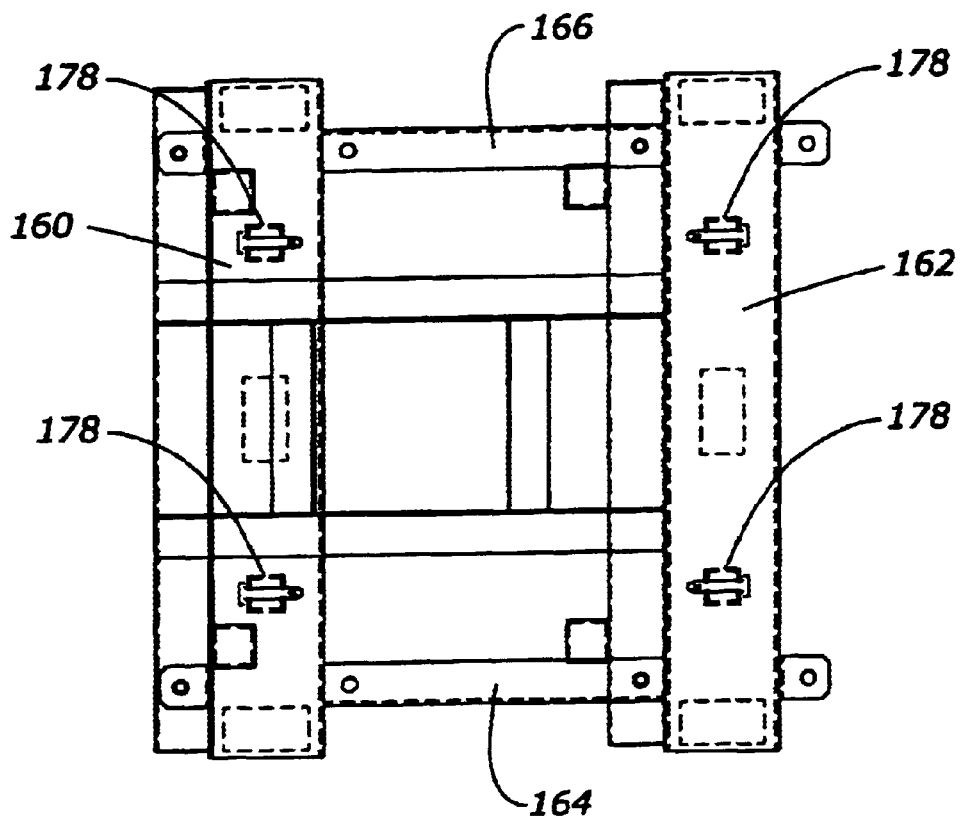
FIG. 36 is an isolated top plan view taken along line 36—36 of FIG. 34.

FIG. 32 illustrates in more detail the structure of lighting array 30 as well as how it can be mounted onto base 12 for storage or transport. See also FIGS. 33–37.

As shown in FIGS. 32–36, base 12 comprises a frame 26 substantially made up of tubular steel components that form a rectilinear frame of previously mentioned dimensions. More details regarding the frame 26 are set forth in co-pending Ser. No. 09/217,975, incorporated by reference herein. Frame 26 is generally comprised of lower skids 130 and 132. Vertical posts 140, 142, 144, and 148 extend upwardly from skids 130 and 132. Lower cross braces 134 and 136 extend between skids 130 and 132.

At the top of frame 26 are a set of top beams 150 and 152, and cross beams 154 and 156.

Two cross members, herein called stub plate beams 196 and 198 extend between cross beams 154 and 156 at the top of frame 26 of base 12. A stub plate (generally indicated at 200) is removably attached to stub plate beams 194 and 196. As will be further discussed, the removable attachment is by pivots 201 and 203 at opposite sides of stub plate 200.

Stub 24 is rigidly attached to stub plate 200 and comprises an upwardly extending round tapered member. Stub 24 is specifically adapted to receive, in a slip-fit manner, the lower end of a hollow steel pole 10 so that pole 10 can be removable slip-fit onto stub 24, and thus onto base 12.

It is to be understood that base 12 could include outriggers 137, or other structure to assist in adding weight or increased stability to base 12 when in use. Stub 24 provides a reasonably accessible mounting location (approximately 6' in height when tilted down as in FIG. 42) to allow lift truck 114 to slip-fit the bottom of a pole 10 to base 12.

FIG. 32 shows, straight light bars 113. Fixtures 110 are connected to light bars 113. Light bars 113 are connected to a pole mounting frame 158. The rest of the pieces, such as the vertical spacers, are detachable and storable until the system is disassembled for transport or storage. During transport or storage, mounting frame 158 is pinned or bolted to base 12. When the lighting system is assembled, mounting frame 158 is releasable connectable to the top 22 of pole 10 (the pole fitter).

FIGS. 33–36 shown an alternative design for light bars 113 and frame 158. Light bars 113 have swept back opposite ends and doors on base 112.

FIGS. 32–36 also show that the lighting array holding lighting fixtures 110 also comprises a tubular metal framework.

Frame 158 has bottom beams 160, 162, bottom cross beams 164, 166, top cross beams 180, 182, 190, and 192, that are connected by posts 170, 172, 174 and 176. As shown, vertical posts 170, 172, 174, and 176 are removably connected by bolts to the top and bottom portions 178 and 198 of frame 158.

Frame 158 in turn is removably connected by connections 184, 186 and/or other structure to frame 26 of base 12. Straps 202 (see FIG. 34) can be used to hold each frame 158 to a base 12.

This arrangement allows cross-arm assembly 30, holding light fixtures 110, to be removably secured to base 12 for storage or transport. When fixtures 110 are to be installed on pole 10, post 170, 172, 174, 176 and lower beams 160, 162, 164, 166 are removed, freeing frame 158 to be attached to pole top 22 of a pole 10. The method of attachment can be by clamps, or other releasable mechanisms well known in the art. The removed portions of frame 158 can be stored on trailer 104 until needed. It is important to hold fixtures 110 in a secured manner during transport.

As illustrated in FIGS. 32–36 extension arms 191, 193, 195, and 197 support four of the six fixtures 110 in a manner such that when installed on base 12, extension arms are angled relative to the center portion. This provides a more balanced lighting array which helps when extending the pole sections with the lighting array on top. It also creates a smaller stored package for better utilization of space. Optionally, extension arms 191, 193, 195 and 197 are slideably moveable so that two of the three fixtures 110 on each light bar 113 can be spread out somewhat if desired. Extension arms can be locked in place by pins or other locking mechanisms.

It can therefore be seen from the foregoing description that lighting system can be relatively compactly stored on trailer 104, yet is designed and dimensioned to maximize the size of base 12 and maximize the number of fixtures for each array 30. It is to be understood that the lighting system shown utilizes six bases 12, but a lesser number, even one, could be utilized along with one pole 10 and one array 30, for some applications or uses.

Pole 10 is extendible from a collapsed or retracted length of approximately 25' (as illustrated in FIG. 1, to a fully extended length of on the order of 60'). The structure, extendibility, and retractability of pole 10 is now described with reference to FIGS. 1–29.

FIG. 1 illustrates collapsible pole 10 according to the invention in a collapsed or retracted position on base 12. What will be called a base pole section 14 is mounted on base 12. Pole sections 16, 18 and 20 nest within base pole section 14 but have upper ends which extend outside of their immediately preceding pole section. A pole top 22 is mounted at the top of pole section 20. Pole top 22 does not move relative to pole section 20.

Figure 2:
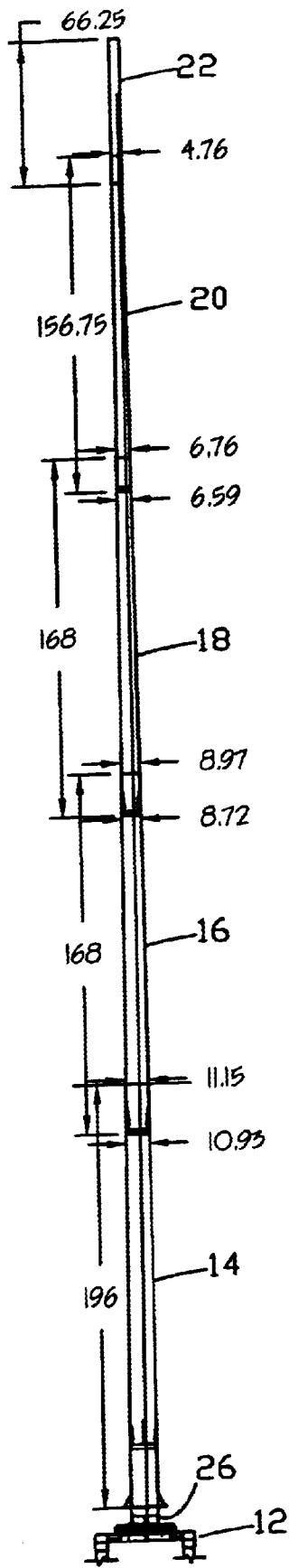
FIG. 2 is similar to FIG. 1 but is a reduced in size version showing pole of FIG. 1 in a fully extended position.

FIG. 1 is a sectional view and illustrates the nesting of sections 16, 18, and 20 within section 14. In comparison, FIG. 2 shows pole 10 in fully extended position. Pole sections 16, 18, and 20 are telescopically extended. As can be seen, in an extended position pole 10 appears to be a unitary tapered pole from top to bottom, as opposed to a sectional pole. Also, as can be seen comparing FIGS. 1 and 2, the fully extended height of pole 10 is well over twice that of pole 10 in collapsed or retracted form (FIG. 1).

Figure 3:
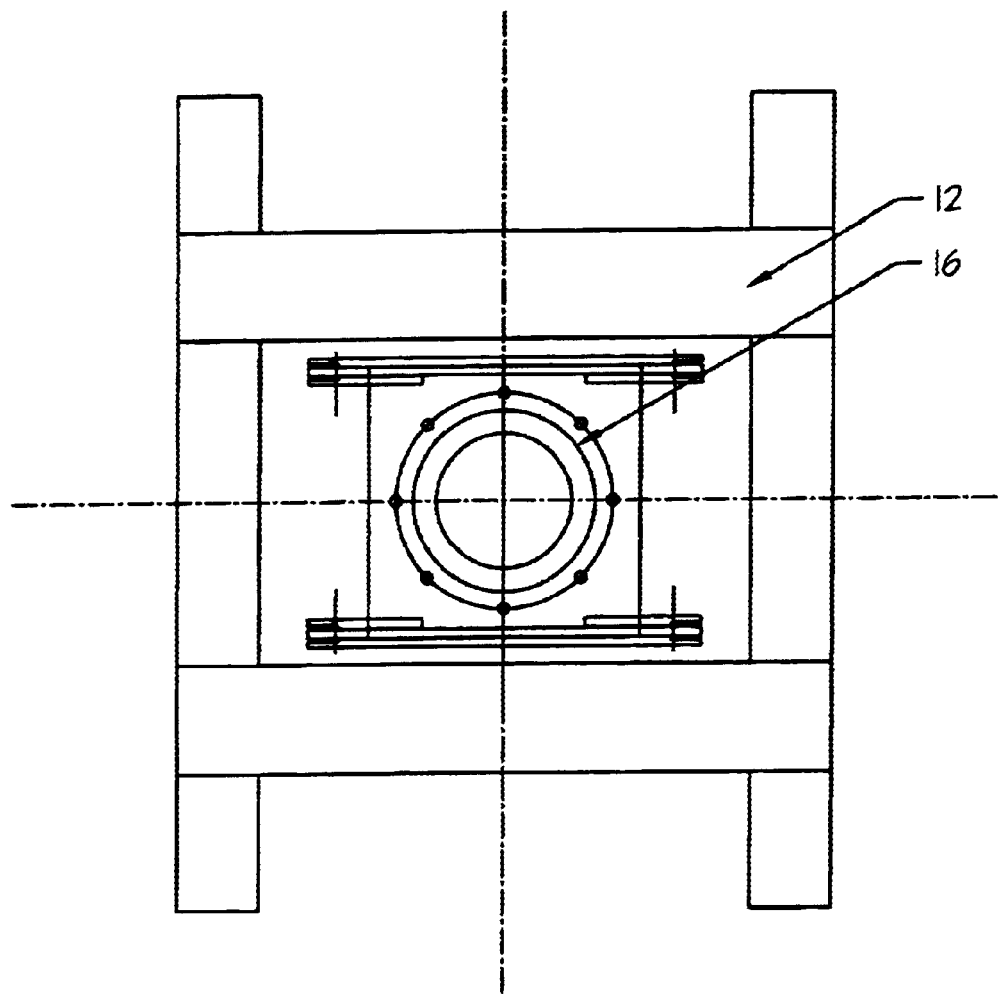
FIG. 3 is a top plan view of FIG. 1.
Figure 4:
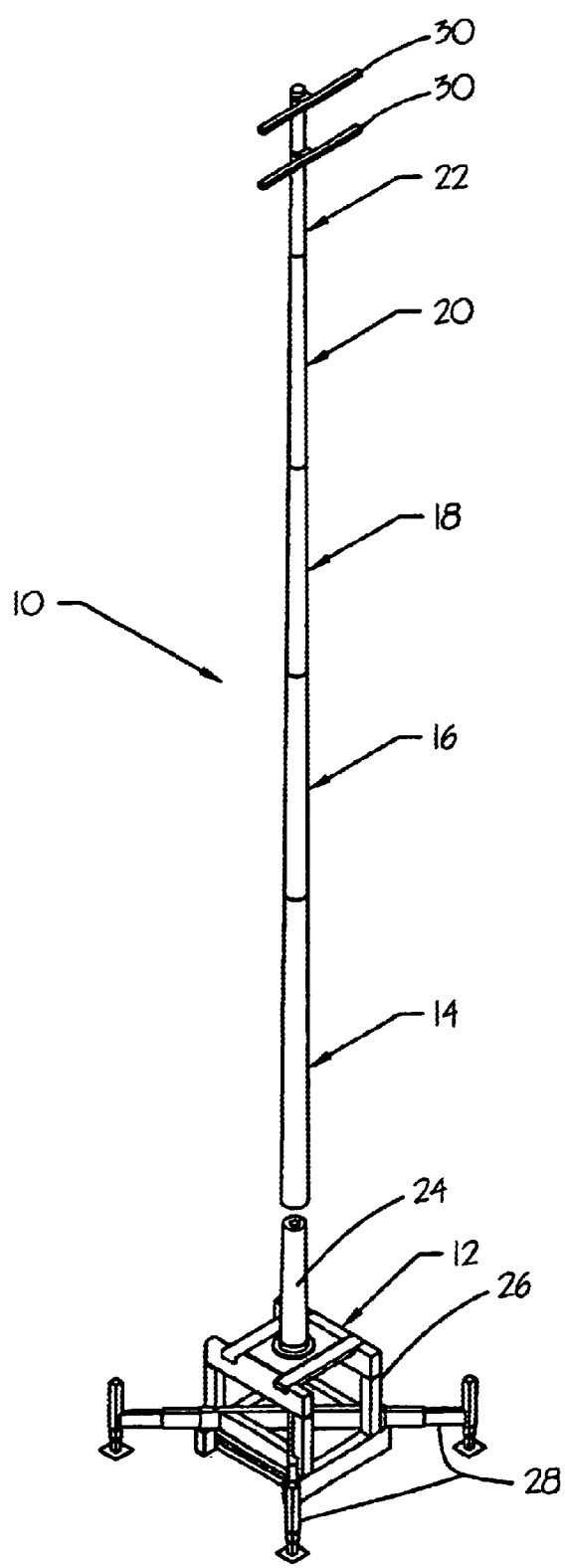
FIG. 4 is a reduced in scale perspective view of an example of a portable base with the pole of FIG. 1, and shows cross arms at the top of the extended pole.

FIG. 3 is a top plan view of FIG. 1 showing pole 10 on a moveable base 12. By further reference to FIG. 4, it can be seen that base 12 can be a portable framework 26 including an upwardly extending tapered stub 24 mounted in the framework 26. Base pole section 14 can be removably slip-fit over stub 24 to mount pole 10 in place. Outriggers 28 can be used to provide a relatively large footprint to resist over-turning moment. A substantial amount of weight and/or equipment can be placed in the interior frame 26 to further support pole 10 or to provide such things as electrical power or components, for example, for operation of lights that could be mounted on cross-arms 30 could be attached to pole top 22. For more specifics regarding base 12 of this type, reference can be taken to co-owned, co-pending U.S. Ser. No. 09/217,975, which is incorporated by reference herein. An example of a pole top 22 can be seen at co-owned U.S. Pat. No. 5,600,537 which is incorporated by reference. It is to be understood, however, that base 12 could also be a permanent base. Stub 24 could be permanently and rigidly mounted in the ground or in some other supporting structure. For examples of such base, reference can be taken to co-owned issued U.S. Pat. No. 5,398,478, which is incorporated by reference herein.

Pole 10 is made of tubular steel (0.120"–0.179" thick). Pole 10 may or may not be galvanized and may be made of different material (e.g. aluminum, Fiberglass, carbon epoxy, etc.) Each pole section 14, 16, 18, and 20 is tapered at the following rate—0.14" per longitudinal foot, with the very bottom of base pole section 14 having a 13.401" diameter and the very top of pole section 20 having a 4.761" diameter. As shown in FIGS. 1 and 2, this allows pole sections to nest within one another (FIG. 1) with substantial room between each section when nested. However, when extended, pole 10 looks like it is a unitary tapered pole from top to bottom. Most of the room between sidewalls of each of the adjacent pole sections is reduced as they are extended. Table 1 below sets forth dimensions of pole 10.

| Section | Length | Bottom-Most Diameter | Top-Most Diameter |
| --- | --- | --- | --- |
| 14 | 196" | 13.40" | 10.93" |
| 16 | 168" | 11.15" | 8.72" |
| 18 | 168" | 8.97" | 6.95" |
| 20 | 156.75" | 6.76" | 4.76" |
| 22 | 66.25" | 5.14" | 5.00" |

As a general rule, in the fully extended position of FIG. 2, the overlap between adjacent pole sections should be 1 ½ diameters minimum. Retracted pole 10 is less than 25' long. Extended, it is on the order of 60' tall. Of course, a variety of sizes are possible.

As will be discussed further, releasable locks mounted on pole 10 lock adjacent pole sections in place in extended position. This additional structure is added to the pole and pole sections, but is relatively minimal in nature and weight, is non-complex, and is durable. Therefore, pole 10 obtains essentially the characteristics of a hollow tapered steel pole, but is sectional in nature, can be collapsed, and therefore can be more easily transported and handled in a collapsed state as opposed to a single piece pole of size of FIG. 2. Stress remains relatively constant from top to bottom of pole 10 when extended. Wind drag is smallest at the top because of the tapering of pole 10.

Furthermore, pole 10 can be removed from base 12 and thus stored, shipped and handled separately from base 12 until it needs to erected.

There is no need for extremely accurate tolerances between pole sections. Therefore, conventional commercially available tubular steel sections are readily available and are more economical because no exact tolerances are needed.

Specific Structure of Pole 10

Figure 5:
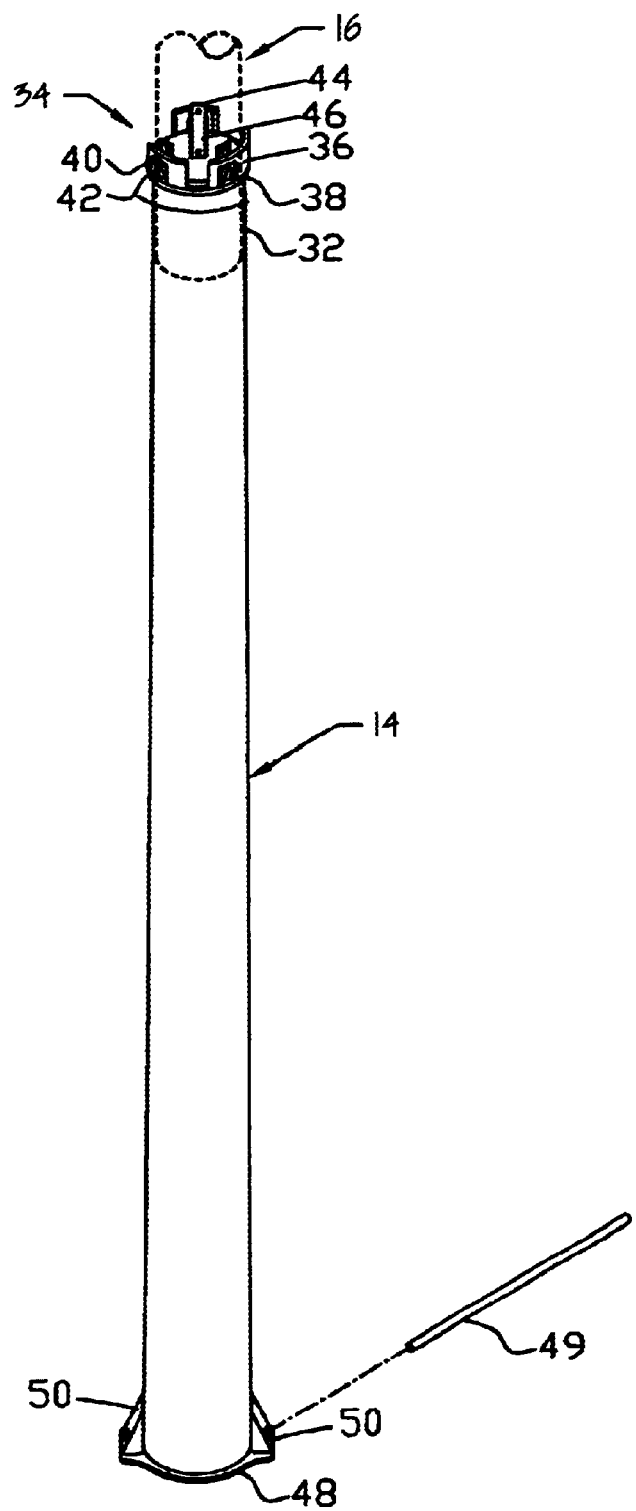
FIG. 5 is enlarged isolated perspective view of a preferred embodiment of a bottom-most pole section of the pole in FIG. 1 with a succeeding pole section in extended position and a pole rotation tool shown in ghost lines.

FIGS. 5–23 show specific structure of pole 10. FIG. 5 illustrates base pole section 14. Its upper end 32 including a locking mechanism (indicated generally at 34). Locking mechanism 34 releasably locks pole section 14 and pole section 16 (shown in ghost lines) in extended position relative to one another.

Locking mechanism 34 consists of three latch catches or plates 36 fixed (e.g. 120 degrees apart) on a annular ring 38 welded to the top 32 of base pole section 14 at equally spaced apart positions. Each latch catch 36 is essentially curved to follow the curvature of the upper end 32 of base pole section 14 and includes generally a rectangular opening 40.

Locking mechanism 34 also includes spring-loaded catch pins 42 mounted in catch pin blocks 44 which are in turn mounted by screws or bolts to the interior of the lower end of pole section 16. Catch pins 42 extend through openings in the lower end of pole section 16 and are mounted to correspond in position with latch catches 36 on base pole section 14.

In the position of FIG. 5, with pole section 16 fully extended and catch pins 42 aligned with openings 40 of latch catches 36, each catch pin 42 is biased outwardly by a flat spring attached to the back of catch block 44 so that they extend radially outwardly of the diameter of the top 32 of base pole section 14, catch pins 42 thus prevent longitudinal movement of pole section 16 relative to base section 14, to lock the two pole sections in an extended position.

As will be described in more detail later, catch pins 42 can be retracted to releasably disengage locking mechanism 34 and allow pole section 16 to move longitudinally downward and collapse or retract into base pole section 14. Catch pins 42 are retracted radially inward of the inside diameter of the top 32 of base pole section 14 to allow such movement.

FIG. 5 also shows base pole rotation ring 48, welded to the lower end of base pole section 14 and having an annular opening approximately the size of the bottom opening of base pole section 14 (not shown), and base pole turning gussets 50. This arrangement allows a tool (manual or mechanized) to be inserted therein (e.g. an elongated metal pole or rod 49, see FIG. 5) to grab or connect to the bottom of base pole section 14 and allow it to be rotated. Such rotation is either used when seating pole 10 on stub 24 of base 12, or when turning base pole section 14 to lock or unlock pole sections of pole 10 as will be discussed later. A washer (e.g. plastic) or other friction-reducing member could be placed between section 14 and base stub 24.

Figure 6:
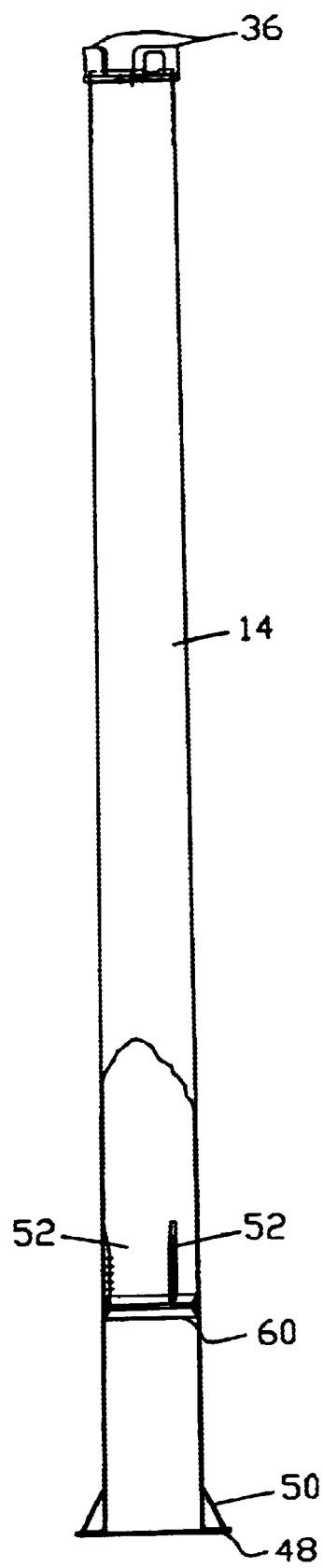
FIG. 6 is a side elevational and partial interior cut away view of FIG. 5.
Figure 7:
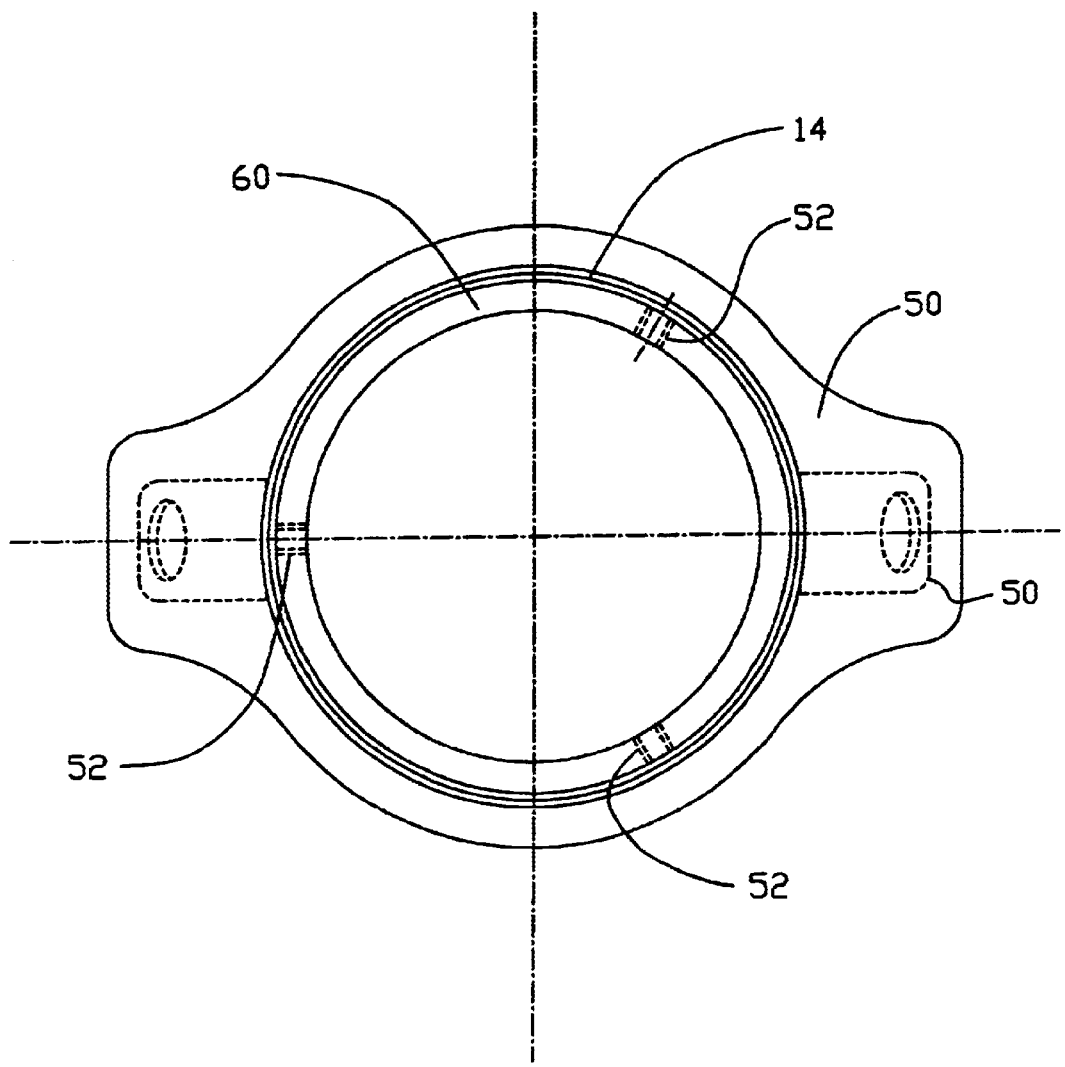
FIG. 7 is an enlarged bottom plane view of FIG. 6.
Figure 8:
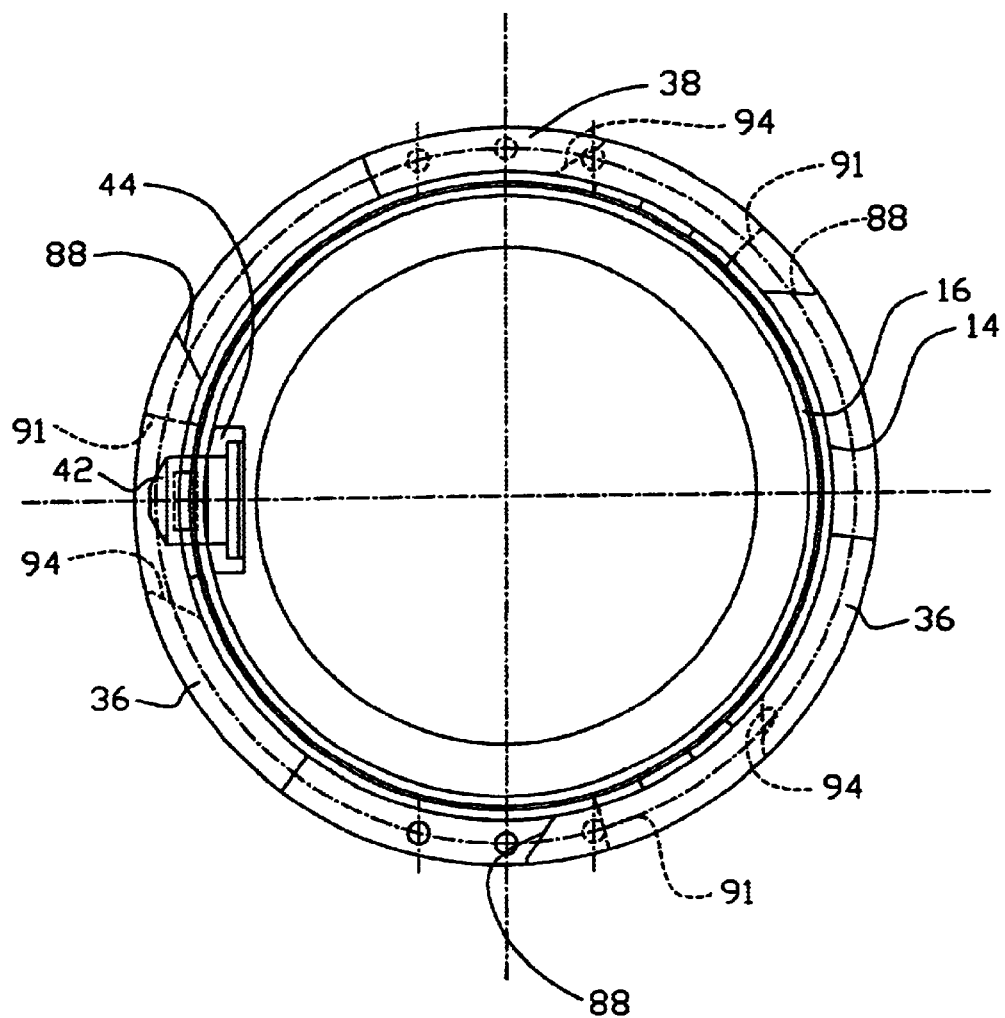
FIG. 8 is an enlarged top plan view of FIG. 6 also showing a catch pin and succeeding pole section in place.
Figure 9:
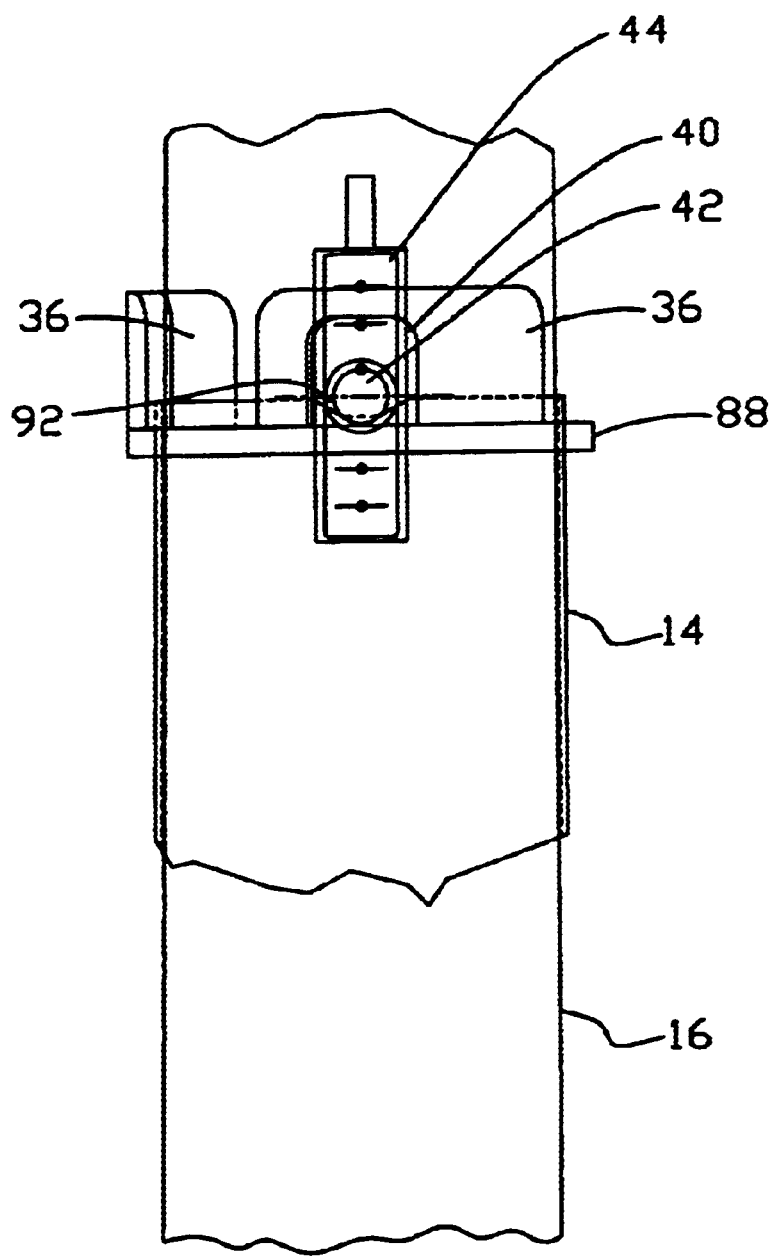
FIG. 9 is an isolated side elevational view of the top of FIG. 6.
Figure 10:
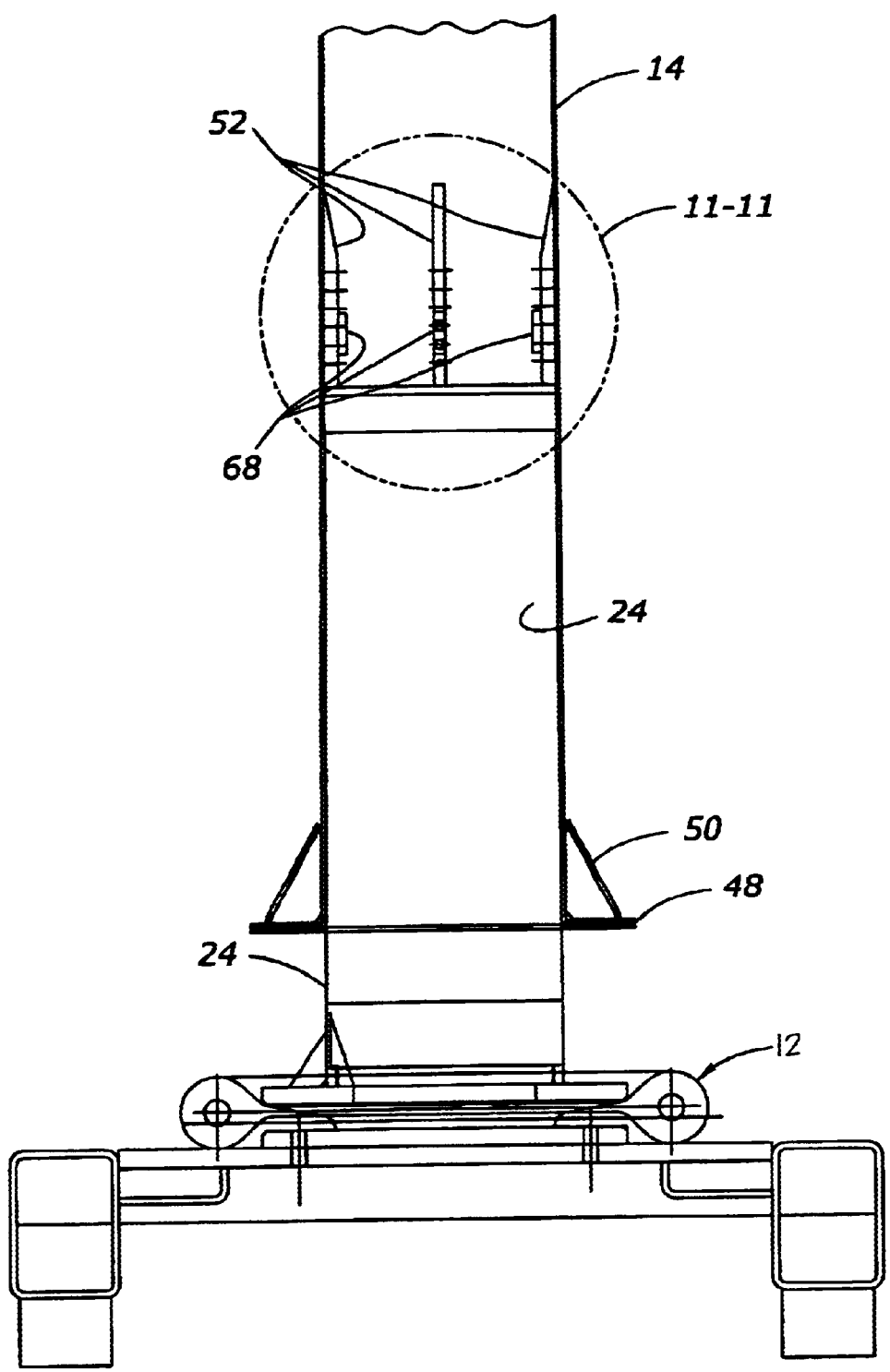
FIG. 10 is an enlarged partial sectional view of the bottom portion of FIG. 2.
Figure 11:
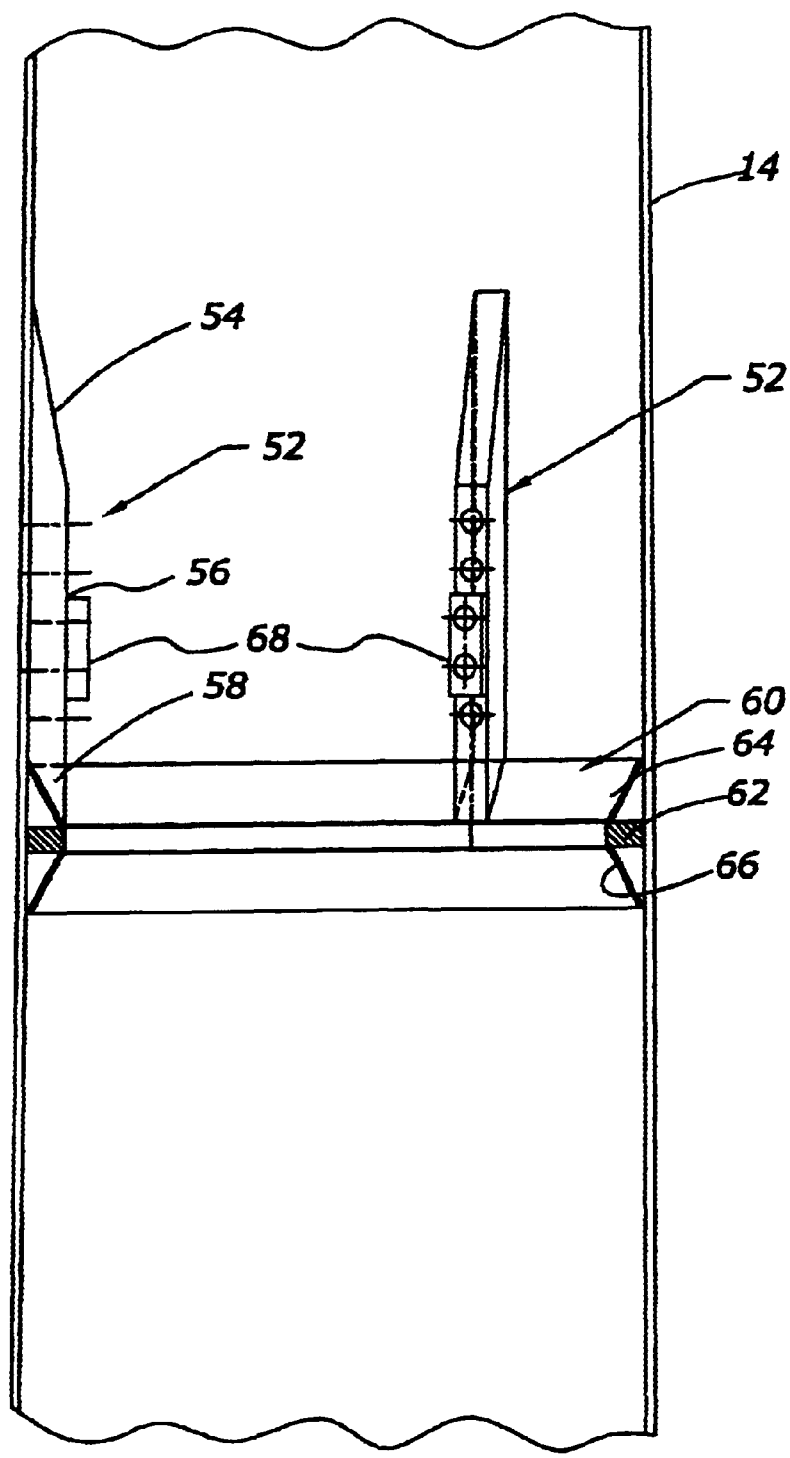
FIG. 11 is still a further enlarged view of the region shown by dashed line 11—11 in FIG. 10.

FIGS. 6–11 show additional details of base pole section 14 and locking mechanism 34. Additionally, as shown at FIGS. 6, 10, and 11, interior centering ramps 52 can be screwed, bolted, or welded to the interior of base pole section 14, near its bottom. Each centering ramp 52, with a ramp portion 54, a middle section 56, and a bottom section 58, abuts a constriction 60 (see particularly FIG. 11). Constriction 60 is comprised of a solid annular reinforcing ring 62 welded to the interior of section 14, with adjacent opposite sloped rings 64 and 66. Ring 62 forces the pole section to be round. Centering ramps 52 serve to center and retain the lower end of pole section 16 when retracted to its lower most position, as shown in FIG. 1. Constriction 60, with sloped rings 64 and 66, allows pins 42 of another pole section to cam action over ring 62 during extension or retraction of that pole section.

The tapering of pole 10 results in the gap between base pole section 14 and pole section 16 to increase the farther pole section 16 is collapsed or retracted into section 14. Thus, centering ramps 52 are particularly valuable to retain pole sections when collapsed and deter damage, rattling, or forces that might cause any pole section to go out of round, including during shipment and handling.

As shown in FIG. 11, a stop block 68 can be welded or otherwise secured to middle portions 56 of centering ramps 52. Stop blocks 68 would function as a lower limit or stop to limit how far down into base pole section 14, pole section 16 can collapse or retract.

As shown in FIG. 10, the position of restriction 60 and centering ramps 52 would be high enough in base pole section 14 that they would not interfere with stub 24 of base 12 when base pole section 14 is fully seated and installed on stub 24.

Figure 12:
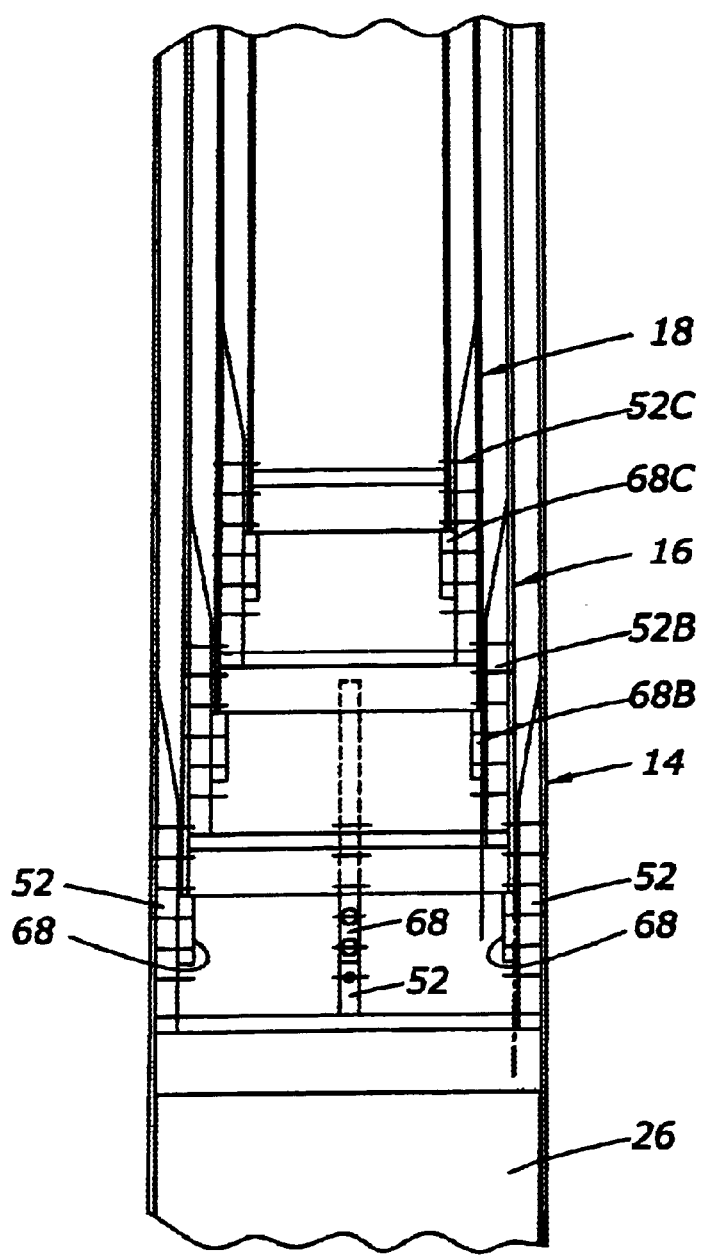
FIG. 12 is an enlarged view of the region shown by dashed line 12—12 in FIG. 1.

FIG. 12 illustrates that a similar arrangement can be used for succeeding pole sections in pole 10. Centering ramps 52B with lower limit/stop 68B can be attached to the lower interior end of pole section 16. When pole section 18 is collapsed into pole section 16, centering ramps 52B center pole section 18 and lower limit/stop 68B defines how far it can be retracted relative to pole section 16.

The same structure can be built into the lower interior end of pole section 18 (see centering ramps 52C and lower limit/stop 68C) relative to pole section 20. FIG. 12 thus shows how pole 10, when in collapsed or nested form, results in centering and support of the lower end of succeeding pole sections in a preceding pole section. Also, if desired, centering ramps 53 (like ramps 52) could be attached at spaced apart positions around the tops of the pole sections (other than the bottom most pole section) to help center the tops when collapsed (see FIG. 13 for examples). Still further if desired, a small ear or piece could be affixed to an adjacent pole section and in between ramps 52 (or 53) to limit rotation of one of the sections relative to the other (e.g. limit rotation to approximately 120 degrees because the ear would come into abutment with a ramp 52 (or 53) if it were attempted to rotate a pole section outside the angular range between ramps 52 (or 53); in this embodiment 120 degrees.

As can be easily understood, these structural relationships, in combination with the lengths of the pole sections, can be designed so that when in the fully collapsed position of FIG. 1, the upper-most ends of each of pole sections 16, 18, and 20 extend outside of their immediately preceding pole section so that even in collapsed form, some portion of each pole section is available and accessible from the exterior of pole 10. This allows each pole section to be individually grasped from the exterior for extension purposes, as will be discussed in more detail later.

Figure 13:
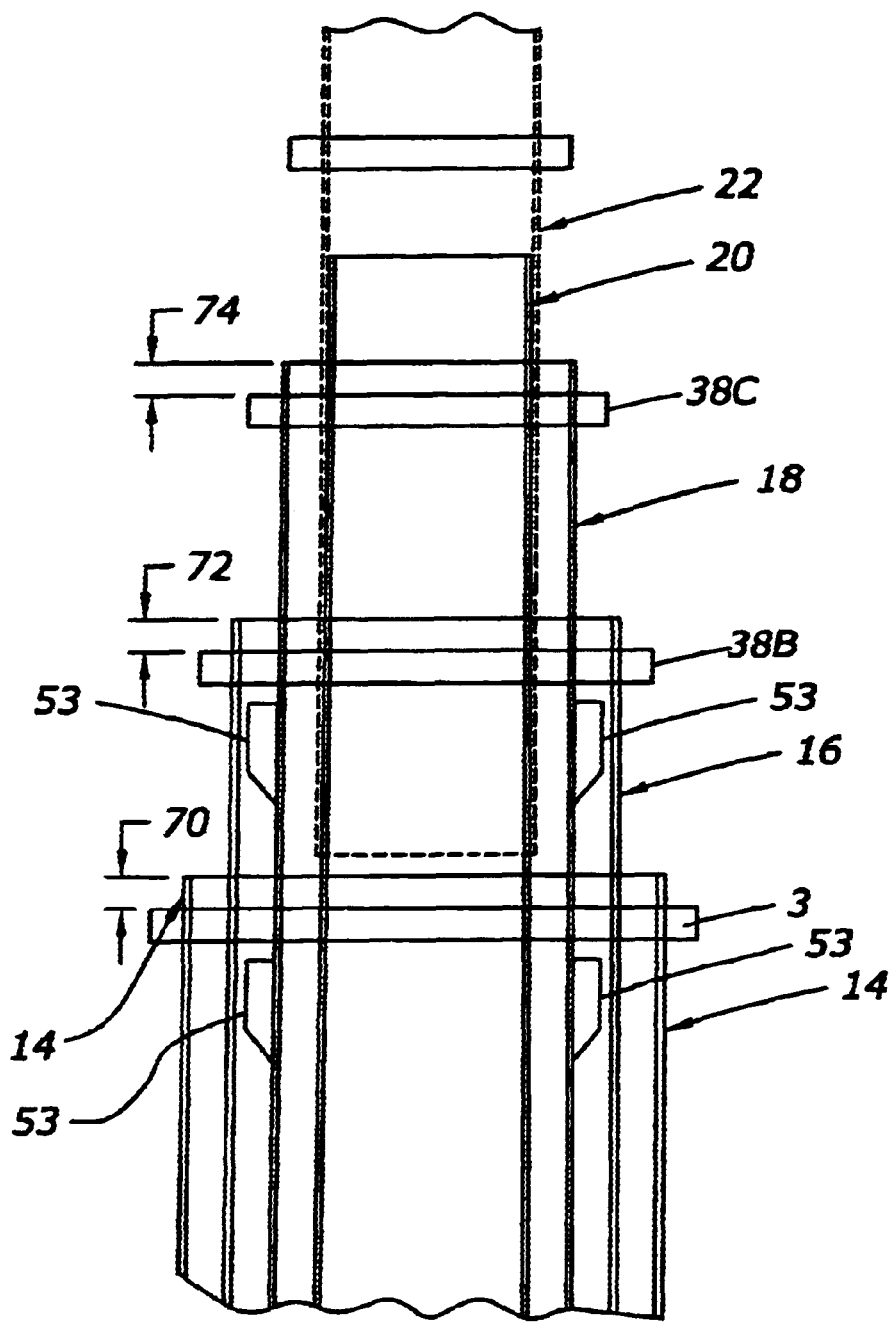
FIG. 13 is an enlarged view of the region shown by dashed line 13—13 in FIG. 1.
Figure 14A:
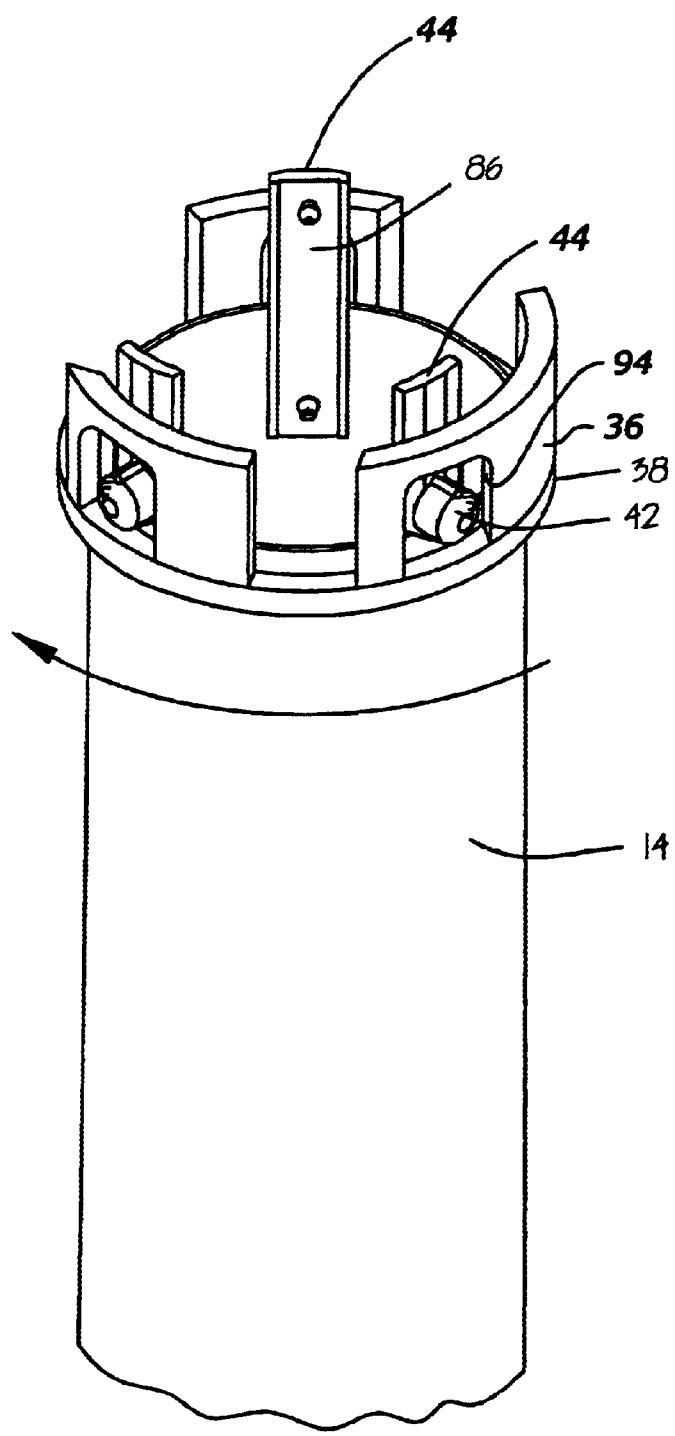
FIG. 14A is an enlarged view of the top part in FIG. 5.
Figure 14B:
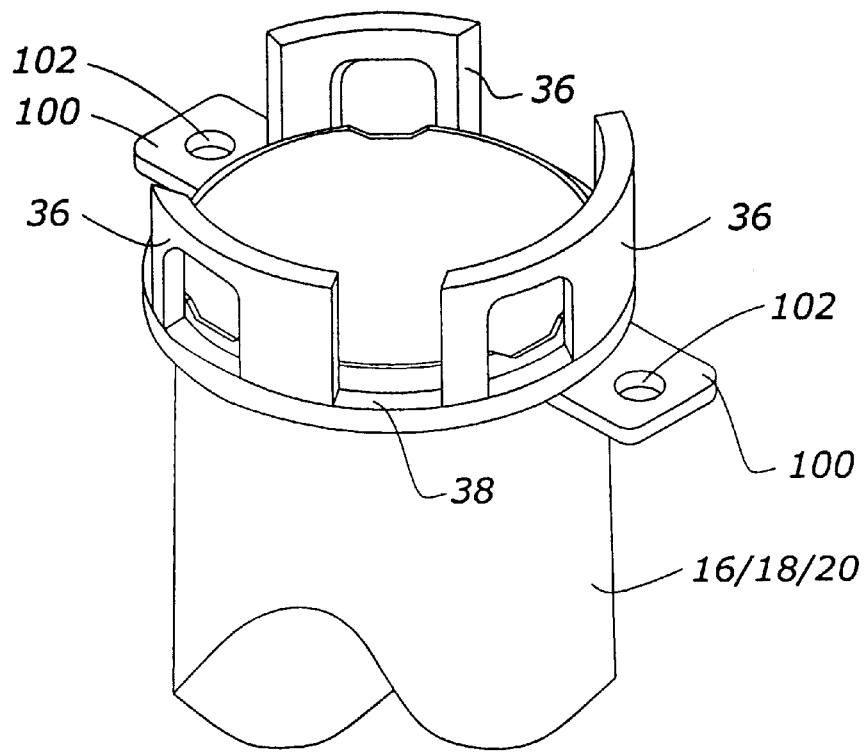
FIG. 14B is an enlarged view of the top of a collapsible pole section showing grasping ears that can be used to grab the section to extend it or retract it.
Figure 15:
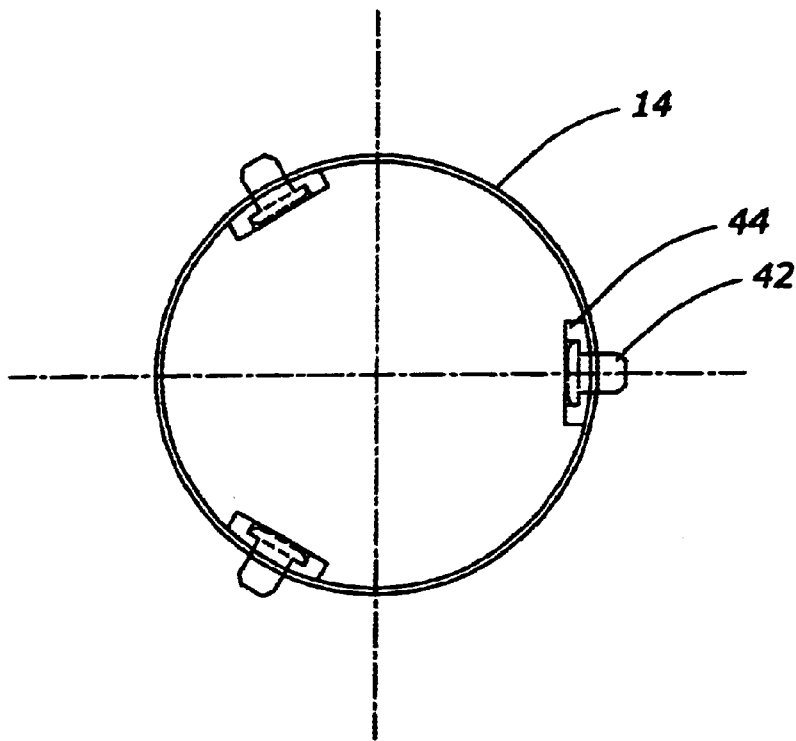
FIG. 15 is a bottom plan view of the bottom of pole section that telescopically nests within the base pole section in FIG. 6.
Figure 16:
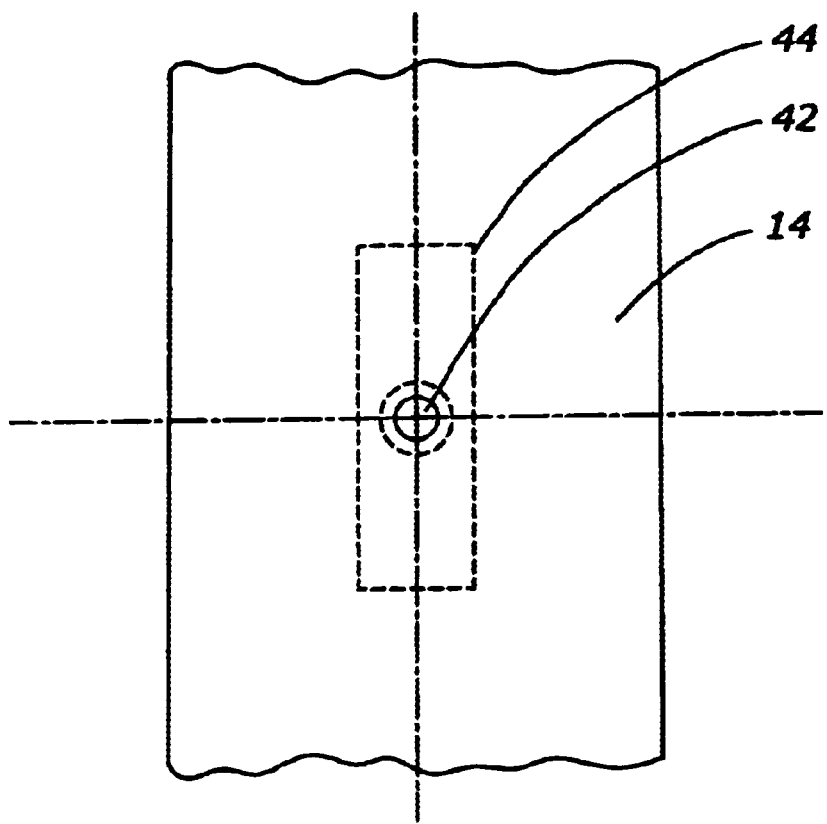
FIG. 16 is a side elevational view of FIG. 15.
Figures 17A, 17B:
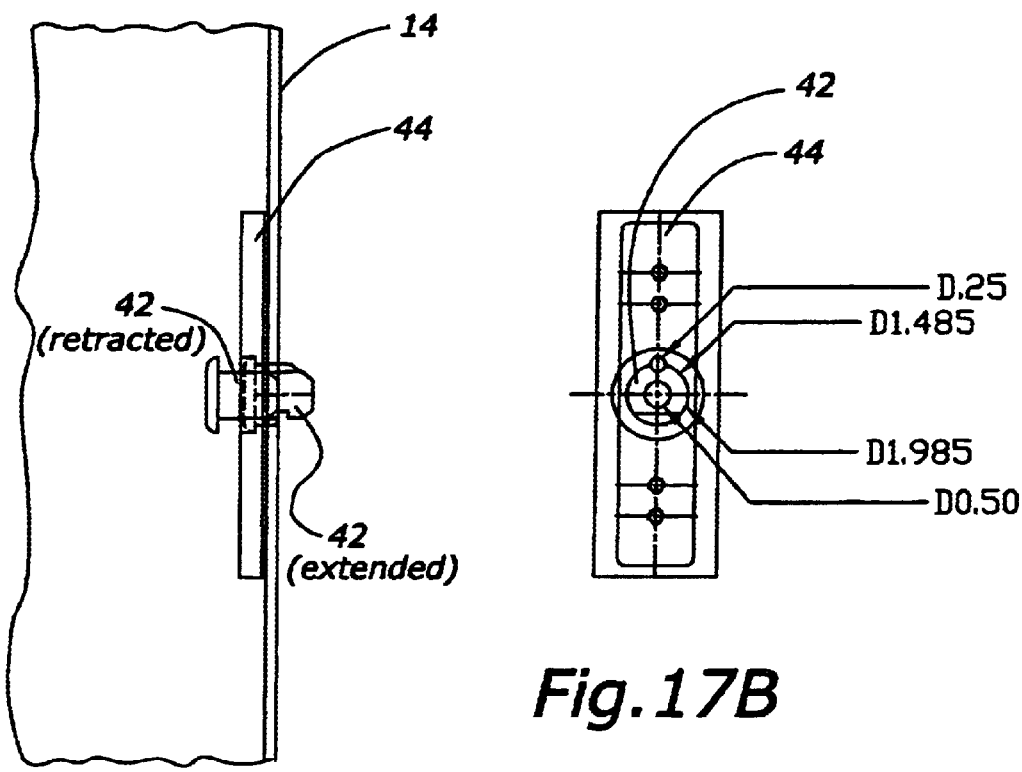
FIGS. 17A and B are side and front elevational views of a locking pin shown in FIGS. 15 and 16 with FIG. 17A showing the pin in retracted and extended positions.
Figure 18:
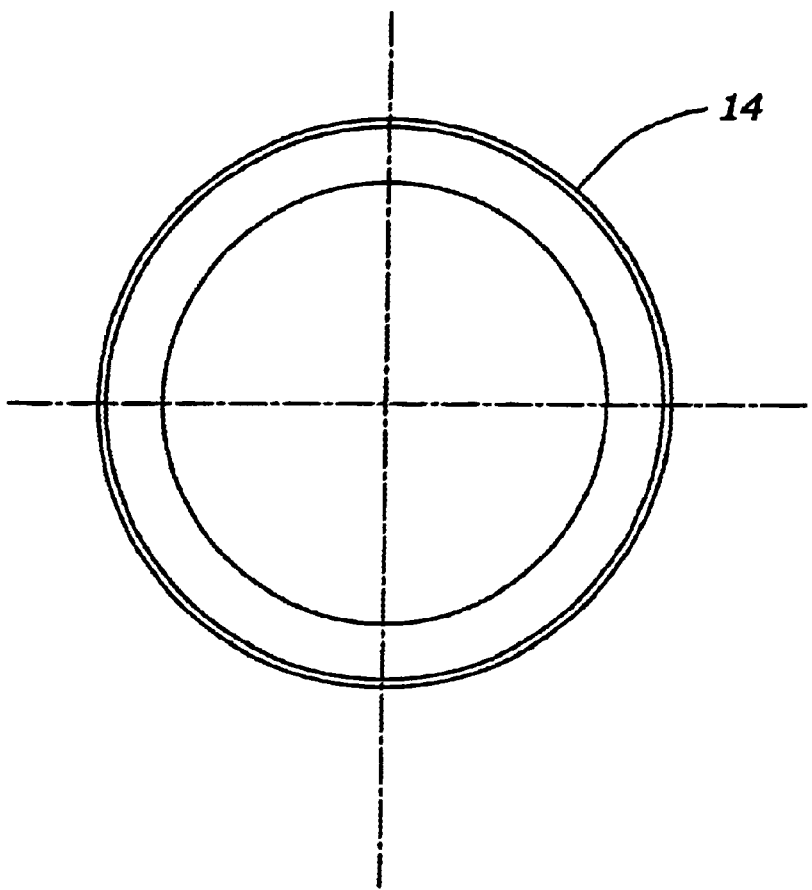
FIG. 18 is a plan view of top of pole section.
Figure 19:
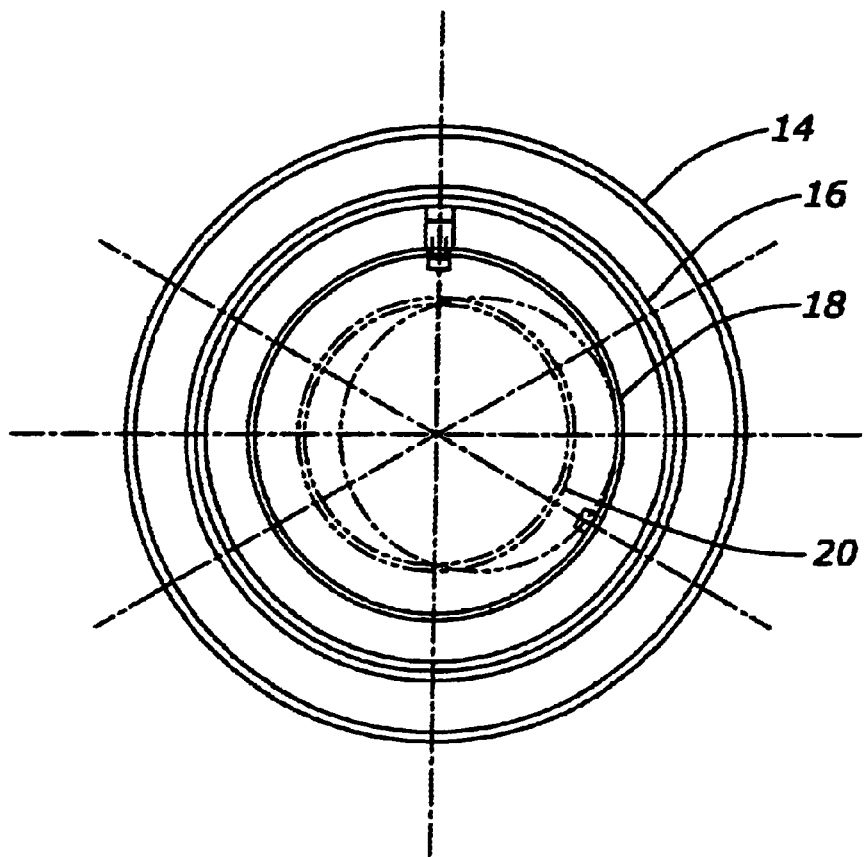
FIG. 19 is a top plan view of FIG. 1, showing a plurality of pole sections in a nested relationship.

FIG. 13 shows this relationship of the top ends of the pole sections. Note that annular ring 38 at the top of base pole section 14 is spaced a distance 70 from the very upper edge of base pole section 14. Similarly, annular rings 38B and 38C, associated with locking mechanisms 34B and 34C of pole sections 16 and 18, are spaced distances 72 and 74 respectively from the very tops of pole sections 16 and 18 respectively.

As shown in FIGS. 14–18, this arrangement allows catch pins 42 to abut and sit upon the top edge of a preceding pole section so that catch pins 42 are supported by the preceding pole section instead of annular plate 38.

Figure 20:
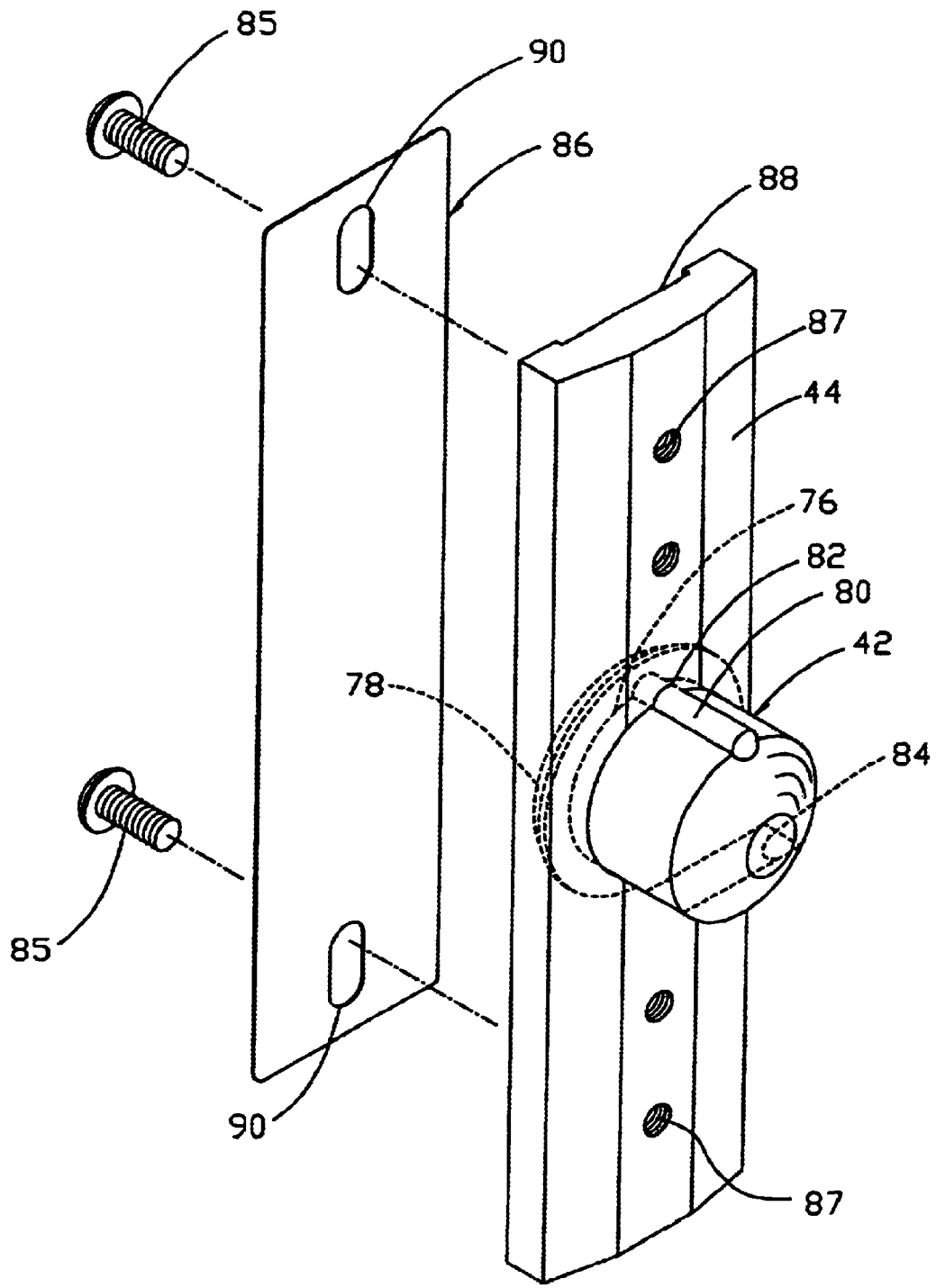
FIG. 20 is an enlarged perspective view of a locking or catch pin of FIG. 17 and its mounting block and spring.

FIGS. 20 and 21 show catch pin 42 and catch blocks 44 in more detail. Catch block 44 has an opening 76 approximately at its center. Catch pin 42 matingly fits through opening 76 and includes a flange 78 that prevents pin 42 from moving all the way through opening 76. A guide rib 80 on the perimeter of catch pin 42 rides within notch 82 in opening 76 to prevent catch pin 42 from rotating in opening 76. A flat steel spring 86 is mounted in a channel 88 in the back of block 44 and holds catch pin 42 in the position shown in FIG. 20 (biases it outwardly from the front of block 44). A transverse cut-out or notch 84 exists in the catch pin 42, opposite guide rib 80. Transverse cut-out 84 is sized so that it can fit over the upper edge of the top of a pole section to further secure adjacent pole sections together when locked in extended positions. Note that the upper edge of pole section 14 can have curved cut-outs 92 (see e.g. FIG. 24B) to further secure catch pins 42 and retain pins 42 from lateral movement. Spring 86 is held in position relative to block 44 by bolts or screws 85 extending through oblong apertures 90 near opposite ends of spring 86 and into threaded apertures 87 in block 44. Block 44 is approximately 6" long and 2" wide by ½" thick.

Pin 42 (A500 steel) is 1.485" outside diameter. Flange 78 is 1.985" outside diameter. Pin 42 is 1.5" in total length, including flange 78; without flange 78, pin 42 is 1.31" long. Slot 84 is 0.38" in width and spaced 0.53" away from flange 78.

Spring 86 is 7.63" long, 1.88" wide, and 0.015" thick. It is made of 0.015" spring steel. Pin 42 is made of A500 steel, as is block 44.

FIGS. 22 and 23 depict more specifically latch catches 36. Latch catch 36 is made of A500 steel. It is approximately 7" long and curved along a radius of 5.58". It is 3.75" in width and 0.75" thick. As shown in FIGS. 22 and 23, opening 40 is 3" tall and has upper corners radiused at 0.75". One side of opening 40 (see reference numeral 91) is 1.51" inward from the one end of latch catch 36 and is essentially radially aligned relative to the center of curvature of latch catch 36. The other side 94 of opening 40 is 3" away from side 91, but is angled approximately 45° from the radial centerline of latch catch 36. Note also that the very end 98 of one side of latch catch 36 is sloped at 42° from the radial line shown in FIG. 22.

The purpose of such structure will become more apparent with reference to the operation of the locking mechanism 34 as will be described later.

Operation of Pole 10

FIGS. 24–29 illustrate operation of pole 10. FIG. 24A illustrates base pole section 14 and pole section 16 in an extended and locked position such as shown in FIG. 2. Catch pins 42 aligned with openings 40 in latch catches 36 and transverse cut-outs 84 in catch pins 42 are seated on the upper lip 92 of base pole section 14 (see in particular 24B and 24D).

In this position, longitudinal movement of pole section 16 relative to base pole section 14 is deterred because of the weight of pole section 16 (and other pole sections), pole top, 22 and any items supported by pole top 22. Flat springs 46 of catch blocks 44 bias catch pins 42 radially outwardly. Even a force that would tend to move pole section 16 upward, would result in catch pins 42 hitting against the top of openings 40 and preventing further upward movement.

To collapse pole section 16 relative to base pole section 14, force is applied upwardly on pole section 16 to lift pole section 16 and thus catch pins 42 (and particularly transverse cut-outs 84 of catch pins 42) off of the top edge 92 of base pole section 14 (see FIGS. 25A–D).

Either base pole section 14 or pole section 16 is then rotated to move catch pins 42 in the direction of the arrows in FIGS. 26A–D. By particularly looking at FIGS. 26A and 26C, the beveled heads of catch pins 42, in combination with ramps 94 of openings 40, forces catch pins 42 by essentially a camming action to begin retracting.

This allows continued relative rotational movement of base pole section 14 and pole section 16 (see arrows in FIGS. 27A–D) until catch pins 42 are camped or retracted sufficiently to be out of openings 40 and sufficiently retracted so that transverse cut-outs 84 in catch pins 42 would not catch the top of base pole section 14. Catch pins 42 are forced inwardly against springs 86.

FIGS. 28A–D then illustrate that pole section 16 can be forced straight downwardly and catch pins 42 would not prohibit downward longitudinal movement of pole section 16 because they are moved sufficiently inwardly. Pole section 16 can then be retracted or collapsed into base pole section 14 to a position illustrated at FIGS. 29A–C, where it is noted that catch pins 42 ride along the interior surface of base pole section 14. Pole section 16 would be collapsed to the position shown in FIGS. 1 and 12 until the bottom of pole section 16 strikes the lower limit/stop 68.

The preceding has described how pole section 16 can be unlocked and retracted into base pole section 14. The same steps would be used to unlock and retract pole section 18 relative to pole section 16 and pole section 20 relative to pole section 18.

The reverse procedure would be practiced to extend pole 10 from the retracted, collapsed state of FIG. 1 to the fully extended state of FIG. 2.

It is generally preferred to extend the upper-most pole section 20 first, followed by the second-to-upper-most pole section 18, followed by the third-to-upper-most pole section 16. One way to do so would be to use mechanical means (e.g. a lift truck or other mechanisms to grasp structure (for example, ears 100 (with holes 102) on opposite sides of the top of a pole section—see FIG. 14B), and raise that pole section until catch pins 42 are in any of the positions of FIGS. 27A–D, 26A–D, or 25A–D. Ultimately, one would rotate the pole sections at issue to get catch pins 42 in the position shown in FIGS. 25A–D—where catch pins 42 are aligned with openings 40 in latch catches 36, but are neat the top of openings 40. Once so aligned, the upper pole section can be lowered such that transverse cut-outs 84 in catch pins 42 would seat upon the upper edge of the lower of the two pole sections (FIGS. 24A–D).

The next lowest pole section could then be grasped by the mechanism and raised and locked in a similar manner. This procedure would then continue until pole 10 is fully extended.

The structure and the amount of work needed to extend and lock pole sections in this manner is relatively minimal and can be accomplished with mechanisms such as lift or lull trucks instead of more costly and cumbersome cranes or other similar equipment. Alternatively, a dedicated mechanical device or devices, or a self contained extension device mounted directly on the pole, could be used to slide pole sections from retracted to extended positions or vice versa. The installer could use bar or pole 49 (FIG. 5) to rotate section 14 while the device holds the extended section form rotation, so that the latch catches 36 move to capture the catch pins 42 and thus lock the extended section in extended position. Other methods are possible. The lift mechanism(s) can be moved from pole to pole. The pole sections can include markings to help with rotational and longitudinal alignment. For example, as roughly illustrated in FIG. 24A, a vertical line 104A could be marked on pole section 16 and a vertical line 104B on pole section 14. Marks 104A and 104B could be placed so that when aligned with one another, pins 42 would be aligned with openings 40 in latch catches 36. This would assist the installer, who normally is at or near the bottom of section 14, to know when alignment is reached. Similarly, horizontal indicia or lines 106 could be marked on section 16 to help an installer visually see how close to fully extended a pole section is.

The foregoing is not the only way of extending and retracting pole 10, but is a very efficient way of doing so.

As has been described, this arrangement also does not require extremely close tolerances as the locking mechanisms have built-in play or tolerance that allows quick and easy operation.

Options and Alternatives Regarding Pole 10

It is to be understood that the aforementioned embodiment is but one form the invention can take. Alternatives, such as are within the skill of those of ordinary skill in the art, defined solely by the claims appended hereto.

For example, the invention is intended primarily for use with poles elevating items to substantial heights. By substantial heights, it is meant on the order of 35' or more. As a practical matter, the range could be up to on the order of 120' fully extended.

The precise dimensions of the pole sections and the locking mechanisms are to be designed for the particular height of pole, working conditions and items to be elevated. Base 12 can be either permanent or portable. Base pole section 14, for example, could use some other type of mechanism or structure for attachment to a base. Examples would be bolts, direct burial in the ground, or other connections. Pole 10 can be used to elevate a variety of items or devices. One example given is lighting fixtures such as wide-area, high intensity lighting fixtures of the nature disclosed in U.S. Pat. No. 5,398,478. Other items are possible, including, but not limited to electrical wires, communications devices or antenna, communication wires, beacons or warning lights.

Note that the invention has many advantages. One example is that it allows non-remote aiming of light fixtures with less costly equipment than large cranes or the like. Another example relates to permanent lighting. The collapsible pole allows for easy lamp replacement.

In the preferred embodiment, the pole sections are tapered with succeeding sections generally smaller in diameter than preceding sections. It should be noted however that in the preferred embodiment, the smallest diameter of each preceding section is smaller than the largest diameter of its succeeding section. The sections are made to leave some clearance when extended relative to one another to allow for rotation between the sections.

However, it is possible to use the concepts discussed herein where the tapering of sections is in the opposite direction. Still further, a middle pole section could have the largest diameter, and preceding and succeeding sections smaller diameters, so that they retract into the middle member. The sections do not necessarily have to be tapered, but it is preferred.

Figure 21C:
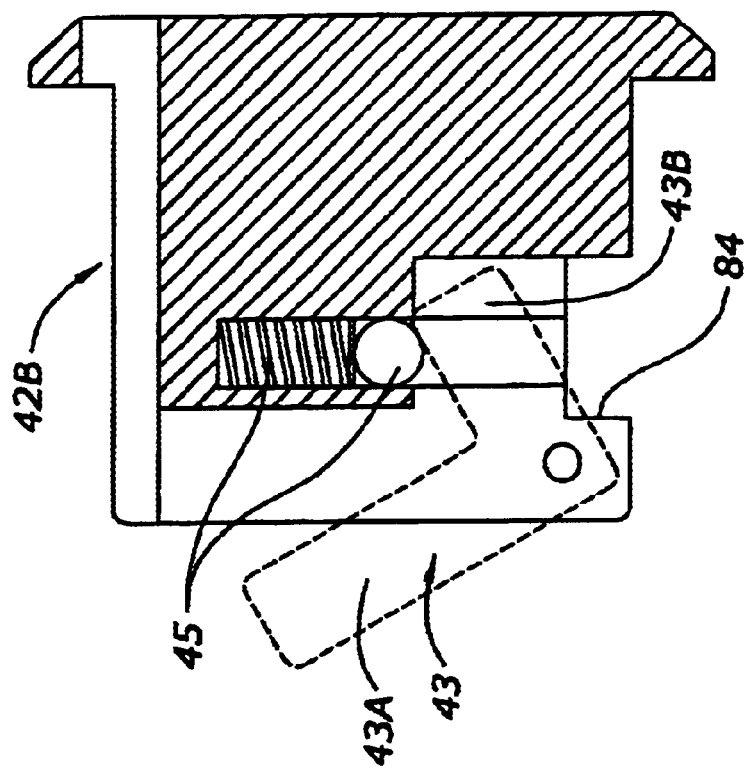
FIG. 21C is similar to FIG. 21B but shows the catch pin in a different state.
Figure 21B:
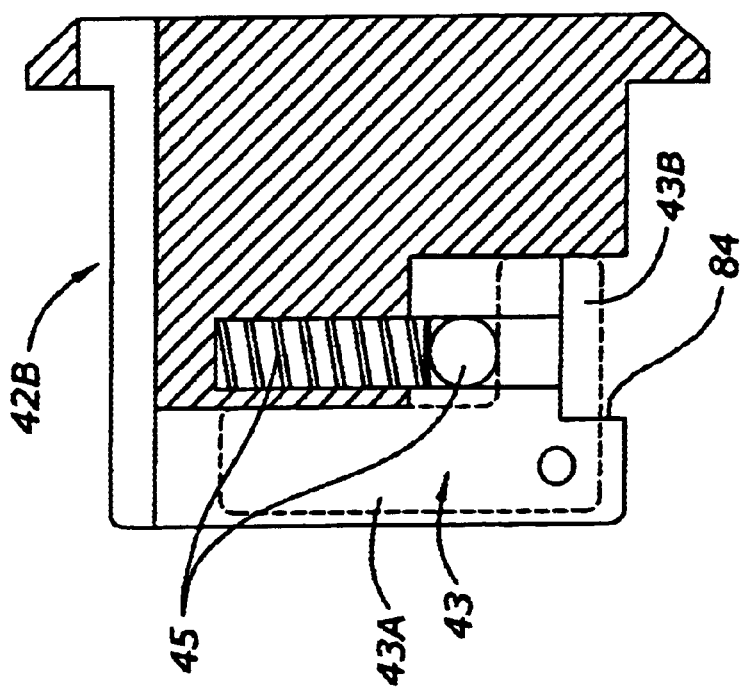
FIG. 21B is an enlarged side elevational sectional view of an alternative embodiment for a catch pin.
Figure 26A:
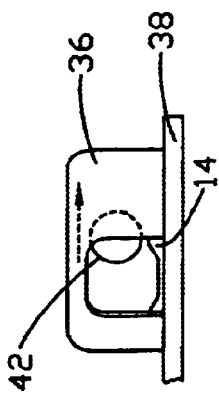
FIGS. 26A–26D are similar to FIGS. 25A–25D except that the two pole sections are rotated slightly relative to one another.
Figure 26B:
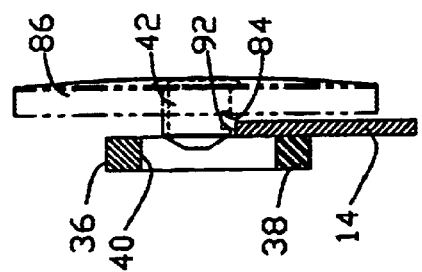
Figure 26C:
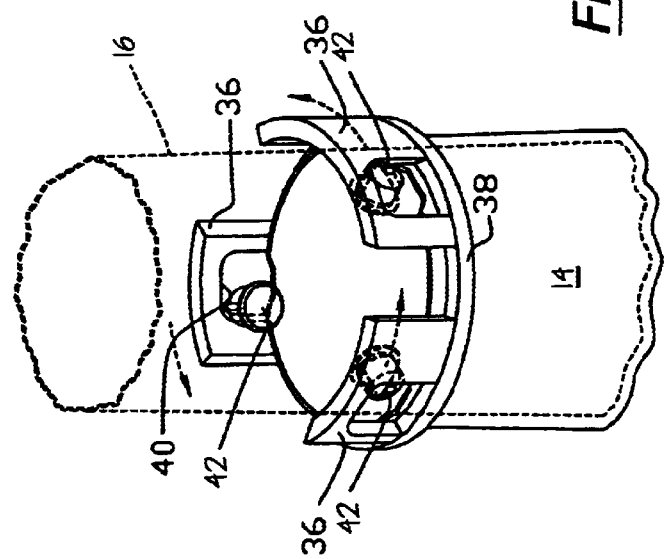
Figure 26D:
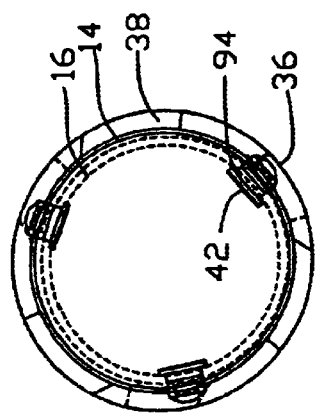
Figure 27B:
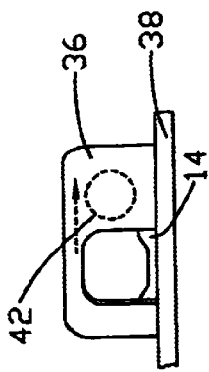
FIGS. 27A–27D are similar to FIGS. 26A–26D except that the two pole sections are rotated slightly more relative to one another.
Figure 27D:
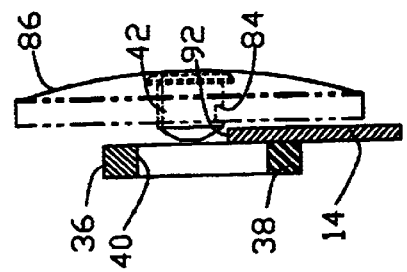
Figure 27A:
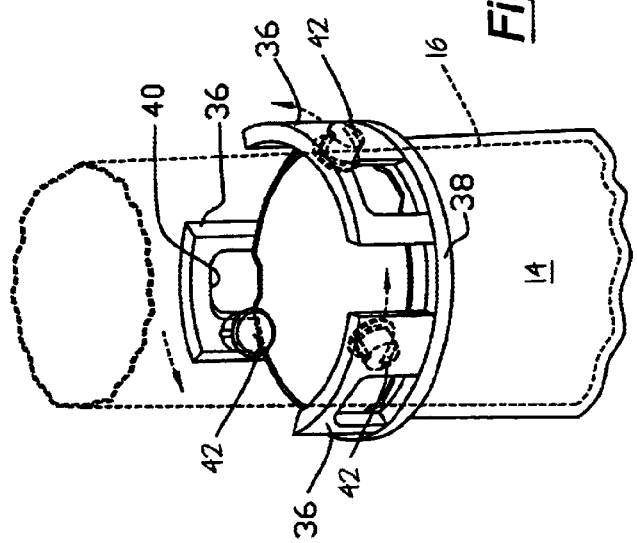
Figure 27C:
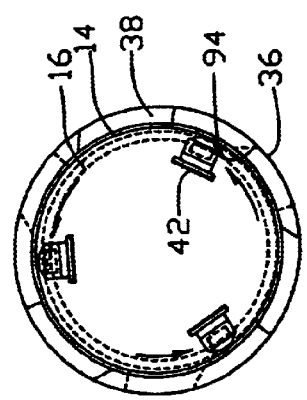
Figure 28A:
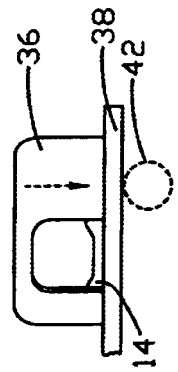
FIGS. 28A–28D are similar to FIGS. 27A–D but show two pole sections being slightly telescopically retracted relative to one another.
Figure 28B:
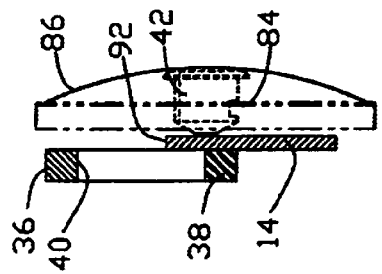
Figure 28C:
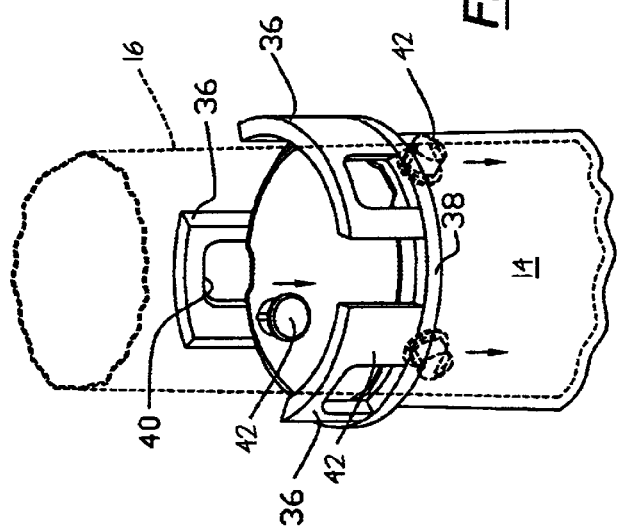
Figure 28D:
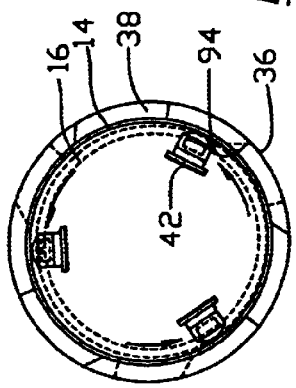

FIGS. 21B and C illustrate an alternative embodiment for a catch pin. As shown in FIGS. 21B and C, alternative embodiment catch pin 42B includes what will be called a flag 43 pivotally mounted interiorly of the front end of pin 42B. FIG. 21B shows flag 43 in its normal state. Internal spring and ball combination 45 pushes downwardly on the short leg 43B of flag 43 to keep it normally in the position of FIG. 21B. However, when pin 42B extends through opening 40, and latch catch 36 and transverse cutout 84 of pin 42B engages the top of a pole section, that top edge of the pole section then enters transverse cutout 84 of pin 42B, abuts short arm 43B of flag 43 and overcomes the downward force of spring and ball 45 to pivot flag 43 to the position shown in FIG. 21C. In that position long arm 43A of flag 43 would pivot out of retraction in catch pin 42B. This would provide a visual indication to workers that pin 42B is appropriately seated on the top of a pole section to assist the operators to confirm the extended pole sections are locked. Flag 43 could be metal or other material. It could be painted or otherwise marked to make it highly visually perceptible, even from substantial distances.

Previously stop blocks 68 were discussed in association with limiting the travel of nested pole sections within one another. Alternatively, stop blocks could be positioned on the outside around the top of each pole section, instead of on the inside bottom. Such alternative stop blocks would function the same way. They would limit how far down each pole section would move into the preceding pole section by extending the diameter of, and perhaps slightly outside the diameter of, the preceding pole section. Additionally, they could be spaced apart around the top of a pole section in a manner that would not allow more than a certain rotation of the succeeding pole section. For example, some type of extension or feature of the succeeding pole section could extend outwardly and limit rotation of succeeding pole section relative to the preceding pole section to the extent of spacing of stop blocks.

Removable weight(s) 256 could fit into the interior of base frame 12 to provide additional mass, if desired.

Operation and Installation of Entire Lighting System

FIGS. 37–70 illustrate installation of lighting system of FIGS. 30 and 31 at a location. Tractor-trailer, 100, loaded as shown in FIGS. 30 and 31, would be driven to a desired location. Lift truck 114 would be lowered and released so that a worker could drive lift truck 114 to the position on the ground free from trailer 104.

Figure 37:
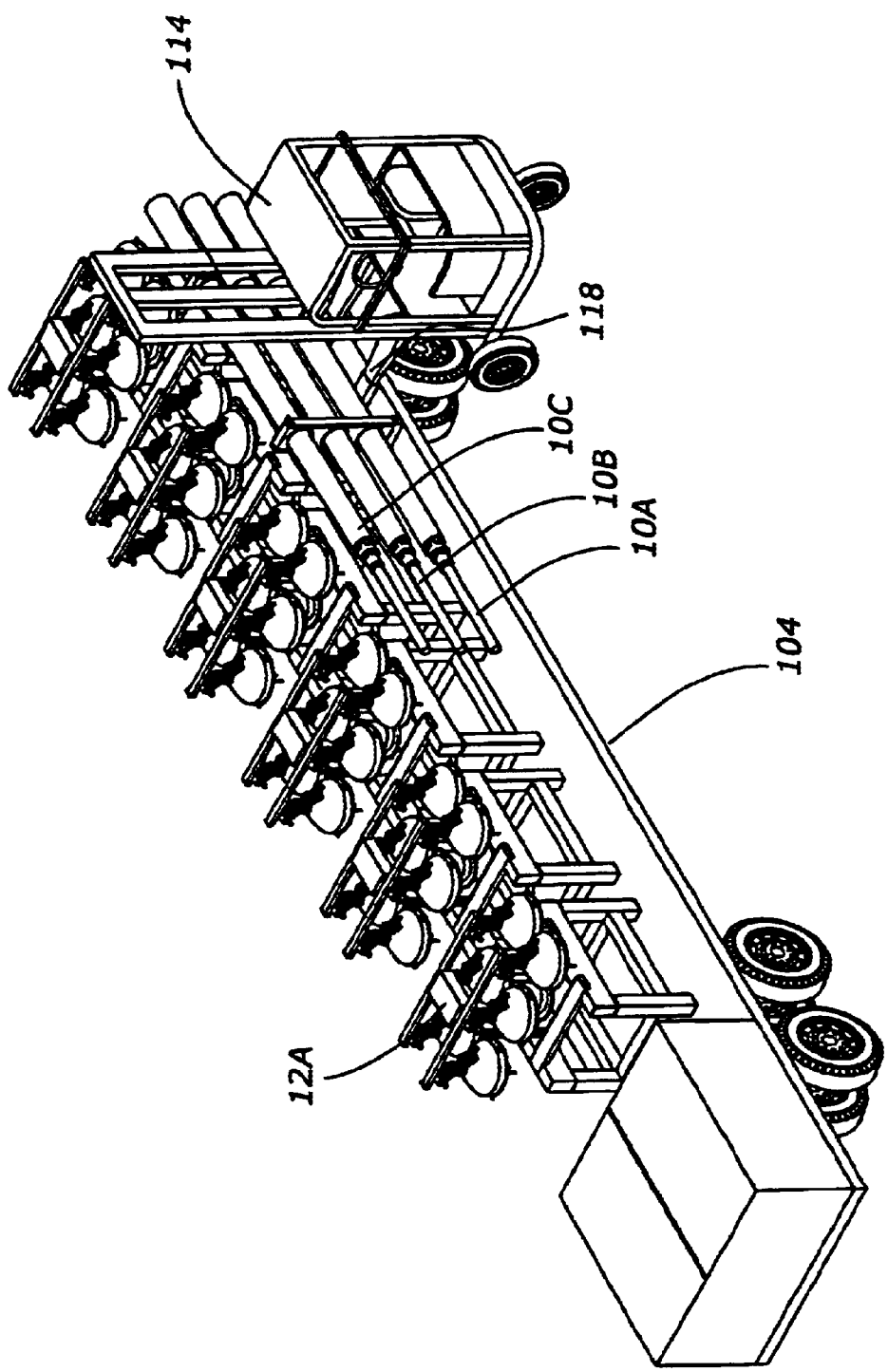
FIG. 37 is a diagrammatic view similar to FIG. 30 but illustrating removal of poles from the system in a loaded position.
Figure 38A:
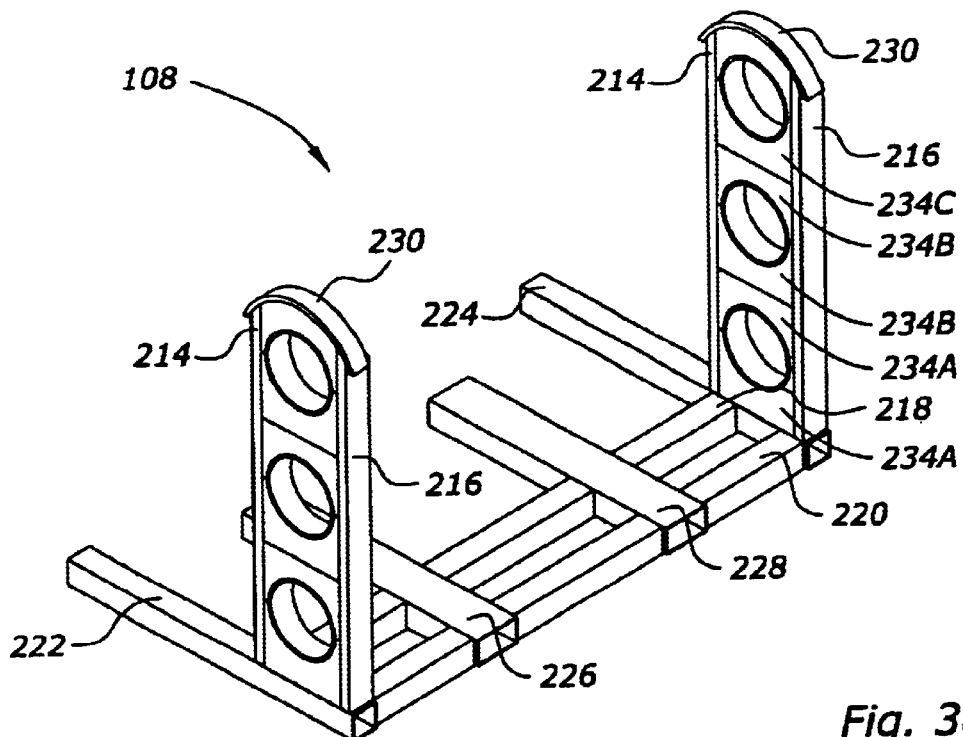
FIG. 38A is an enlarged perspective view of a pole rack for holding the poles of FIG. 38A during transport.

Securing hardware would be released and forks 118 of lift truck 114 positioned to move underneath and then lift rack 108 holding three poles 10A–C from trailer 104 (See FIG. 37). FIGS. 38A and B illustrate pole rack 108. A pair of uprights 214 and 216 extend from opposite ends of connectors 218 and 220. Feet 222 and 224 extend transversely from the longitudinal axis of connectors 218 and 220 on one side of connectors 218 and 220. Lift truck fork tubes 226 and 228 are installed and spaced apart intermediate positions along connectors 218 and 220.

Each pair of uprights 214 and 216 are configured to receive a series of upper and/or lower blocks 232 and 234 (See FIG. 38B) in a stacked relationship. Straps 230 can be removably secured across the top of uprights 214 and 216 to assist in retention of blocks 232 and 234 in upright pairs 214/216.

Figure 38B:
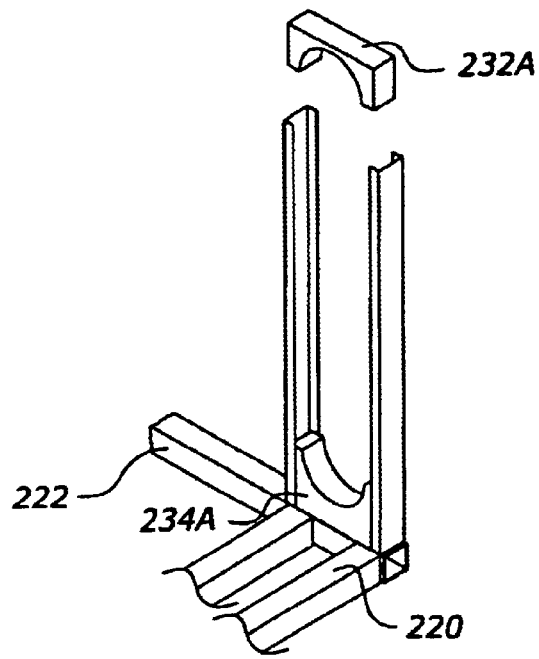
FIG. 38B is an isolated view of a side of the rack of FIG. 38A showing removable mounting blocks.

As indicated in FIG. 38B, the first set of lower blocks 234A are slid from the top of respective upright pairs 2141216 down to the bottom. A first pole 110A can then be dropped through upright pairs 214/216 into the hemispherical cutout in lower blocks 234A and supported thereon. Upper blocks 232A would then be slid down respective receiver pairs 214/216 with its hemispherical cutout facing downward. Each pair of lower and upper blocks 234A and 232 would then provide a complete yolk around poles 10A and hold it in the position on rack 108.

Similarly, a next set of lower blocks 234B would be inserted in upright pairs 214/216, second pole cradled therein, and upper blocks 232B placed over pole 10B in rack 108. Lower blocks 234C would then be placed in upright pairs 214/216. A third pole 10C would then be placed upon lower blocks 234C Upper blocks 234 would not be needed. Straps 230 could secure the upper pole 10C in place. Strap 230 could include a ratchet tightener.

Fork tubes 226 and 228 allow a lift truck to lift the entire rack 108, with all three poles 10A–C in place, off trailer 104. The rack with three poles could then be driven to a location and set on the ground. Poles 10A–C could then be individually removed from rack 108 by a reverse procedure.

Rack 108 could be secured to trailer 104 by a number of different ways. One way is to utilize adjustable members along connectors 218 and 220, or other parts of rack 108, that could be inserted into stake receivers that are preexisting in many trailers 104. Entire rack 108 could then be also chained to trailer 104.

Figure 39:
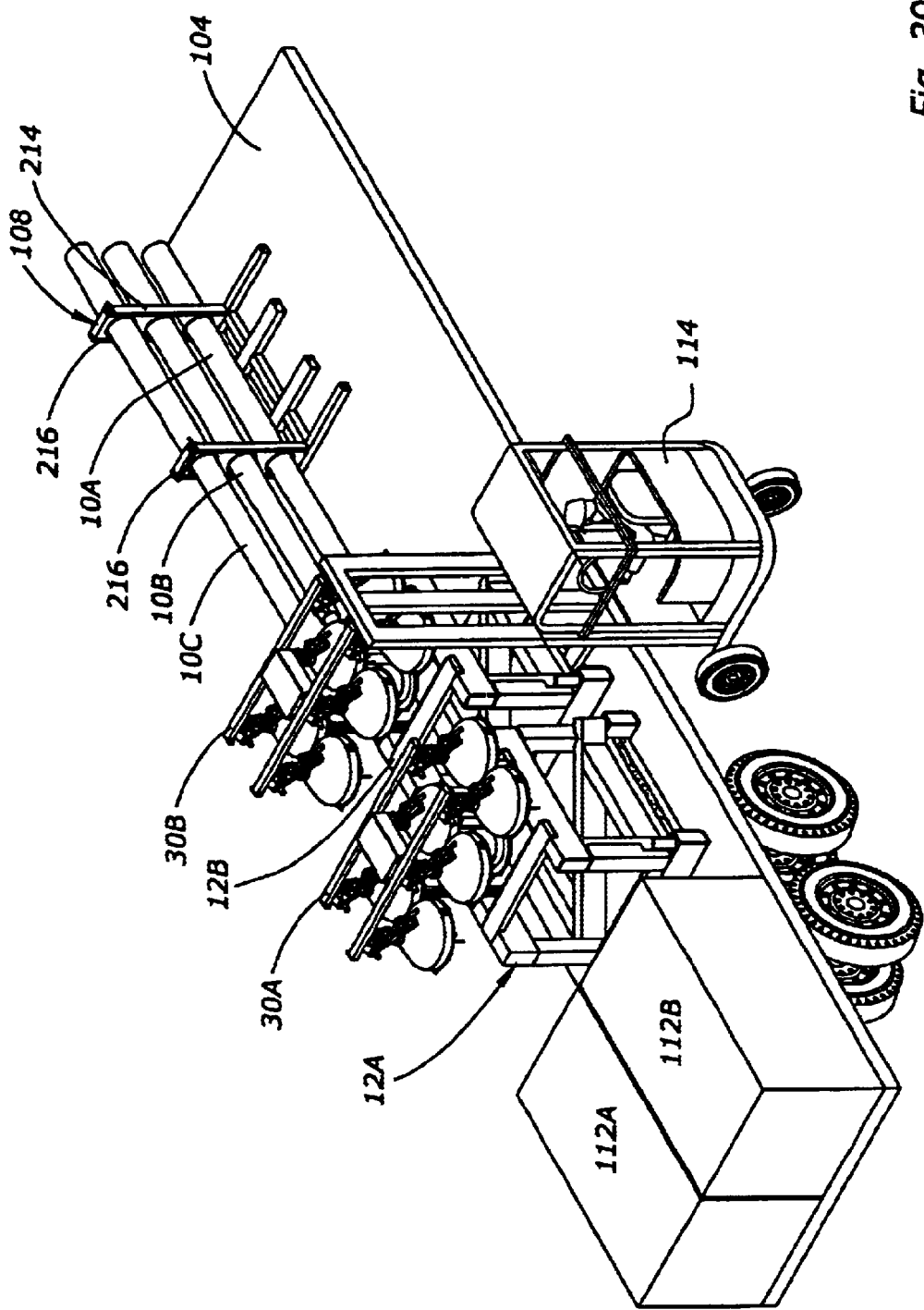
FIG. 39 is similar to FIG. to 37 but illustrates removal of the bases from loaded position.

FIG. 39 illustrates a lift truck similarly could grasp base 12A (once poles 10A–C have been removed) from truck 104. FIG. 39 illustrates the process of removing bases 12 from trailer 104 with forklift 114. As is shown, a lighting array 30 is mounted for transport on each base 12. Thus lift truck 114 can remove a base 12 with attached light array 30 and move it to the site for installation of one of the poles 10 and associated light array 30.

Figure 40:
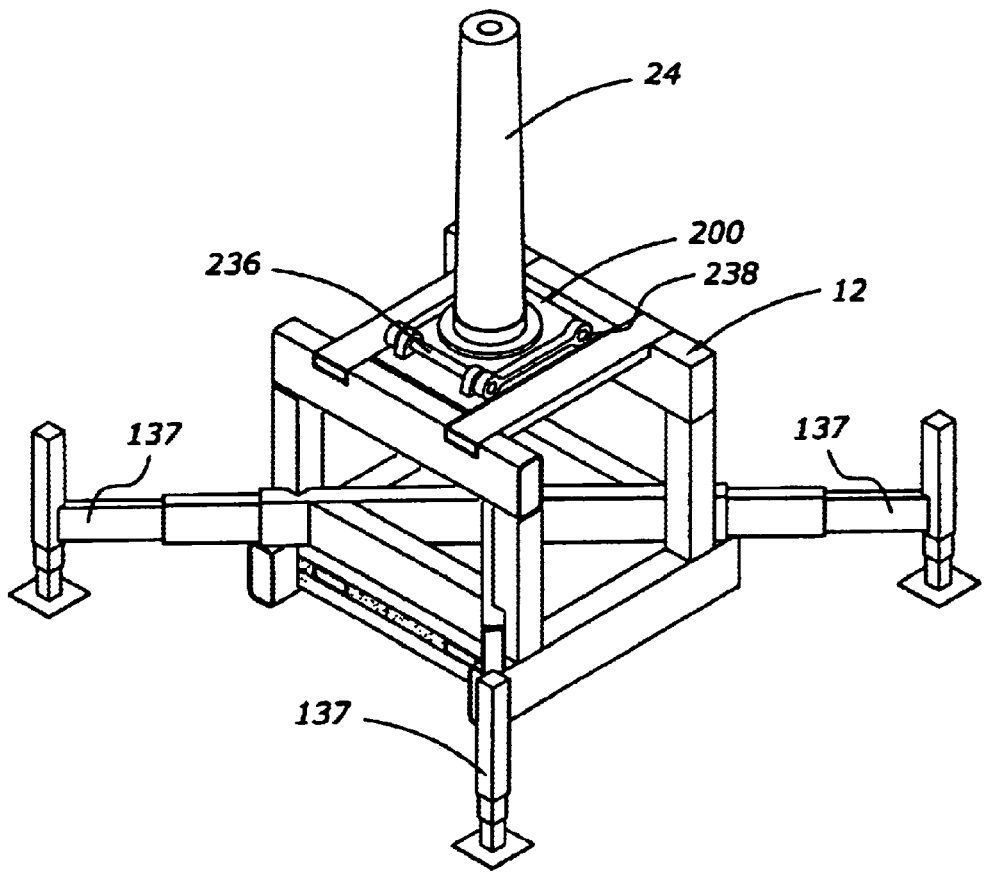
FIG. 40 is enlarged isolated view of a base top with stub and pivot connection.

Lift truck 114 could move base 12A to a pre-determined or desired position relative to a lighting target area. Base 12 could be leveled, or prepared for needed support of pole 10. Lift truck 114 could then grasp pole 10A and move it to base 12A. FIG. 40 illustrates optional outriggers 137 that can be used to create a bigger footprint for base 12. FIG. 40 also illustrates that plate 200 for stub 24 could be pivotable around pivot 236 to move from vertical position shown in FIG. 40 to a horizontal position shown in FIG. 41. A pin 238 or other mechanism could lock plate 200 in horizontal position shown in FIG. 40 for use with pole 10, but be releasable to allow the downward horizontal pivoting of stub 24 shown in FIG. 41. Once a base 12 has been put into a desired position and appropriately prepared (e.g. outrigger extended to desired or appropriate positions base 12 level, and optionally weight added to base 12), base 12 is ready to receive a pole 10.

Figure 41:
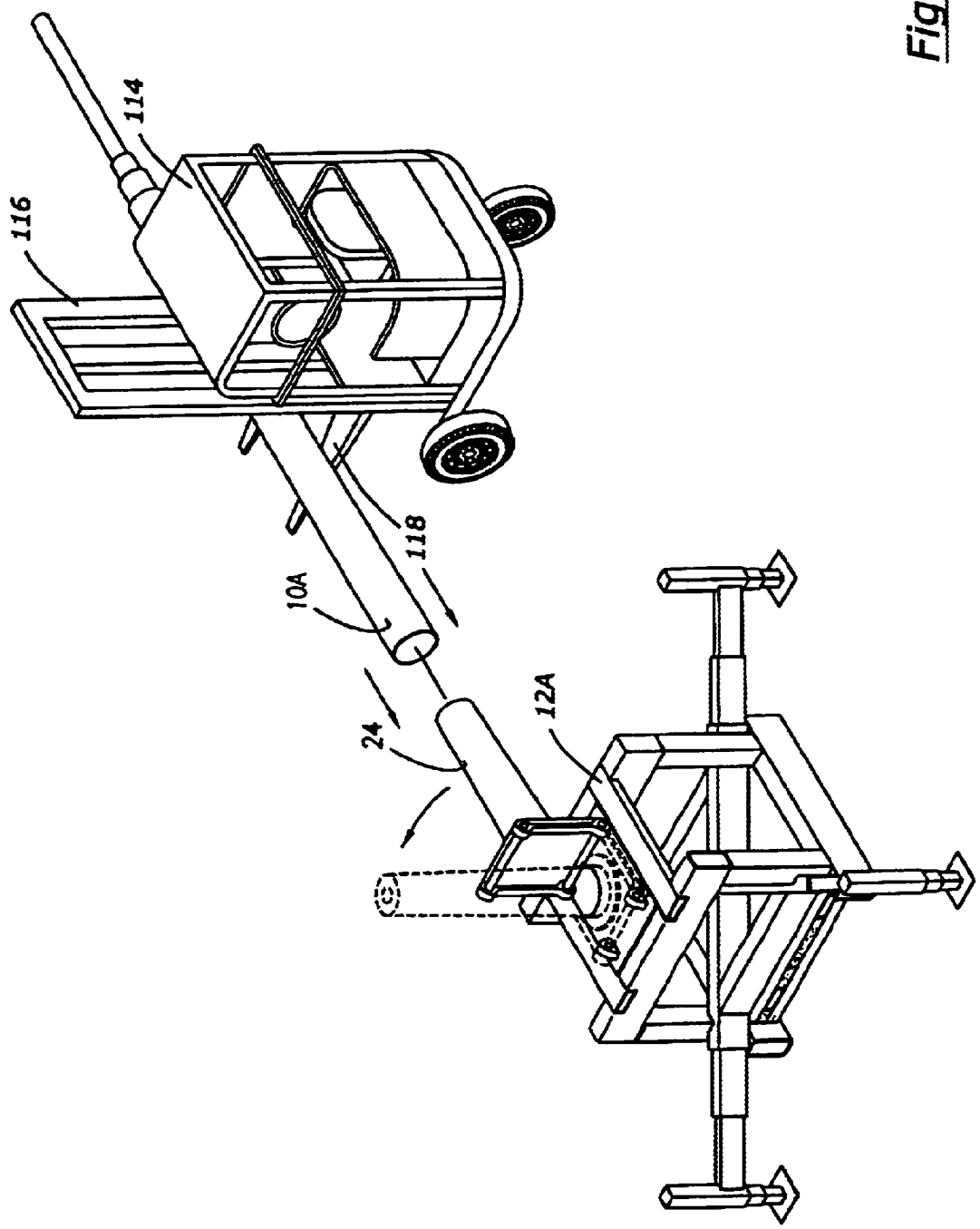
FIG. 41 is a diagrammatic view of the pivoting of the base top of FIG. 40, and assembly of a pole to the base top.

FIGS. 40 and 41 illustrate attachment of a pole 10 to a base 12 and, in more detail, stub 24 on stub plate 200. Opposite sides of plate 200 are pivotably mounted relative to base frame 26. By appropriate release of one side of stub plate 200, stub 24 can be pivoted from vertical to horizontal (see FIG. 41). Lift truck 114 can manipulate pole 10A in a generally horizontal position so that its lower end can slip-fit over similarly horizontal tilted down stub 24. As previously discussed, the lower end of pole 10A is hollow and tapered to slip fit over the tapered perimeter of stub 24. By appropriate maneuvering, the pole 10A is slip fit down onto stub 24 so that a substantial part of stub 24 extends up into pole 10A. However, pole 10A is not wedged or otherwise secured against rotational movement. It is desirable to rotate pole 10 onto stub 24 during the pole extension or retraction process, or to precisely aim lighting fixtures attached at the top of pole 10. Lift truck 114 or other means can then be used to pivot stub plate 200 back to normal position, thus raising pole 10A to a vertical position (see, e.g., FIG. 53). Stub plate 200 would then be secured in position with stub 26 vertical and pole 10A vertical.

Lighting array 30A would have previously been prepared by removing the transport frame members. Once pole 10A is slip fit onto stub 24, array 30A is secured to pole top 22 of pole 10A. Thus, pole 10A, in collapsed or retracted form, can easily be assembled at basically ground level, moved to base 12, connected to stub 26, have lighting array 30 attached, and then moved to vertical. No cranes, or other large, expensive, complex machines are required to accomplish these steps.

Figure 42:
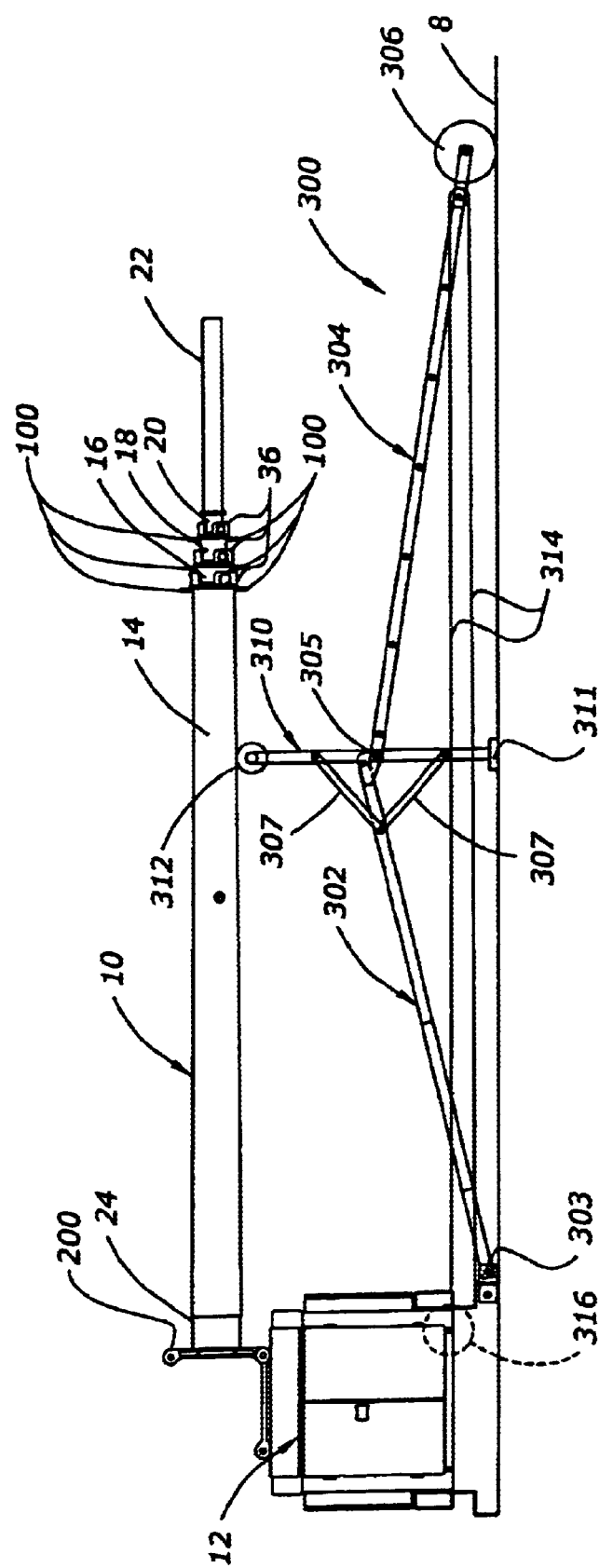
FIG. 42 is a elevation view illustrating a pole, after assembly to the base, as supported by a device used to raise the entire pole from a pivoted down position to a vertical position.
Figure 43:
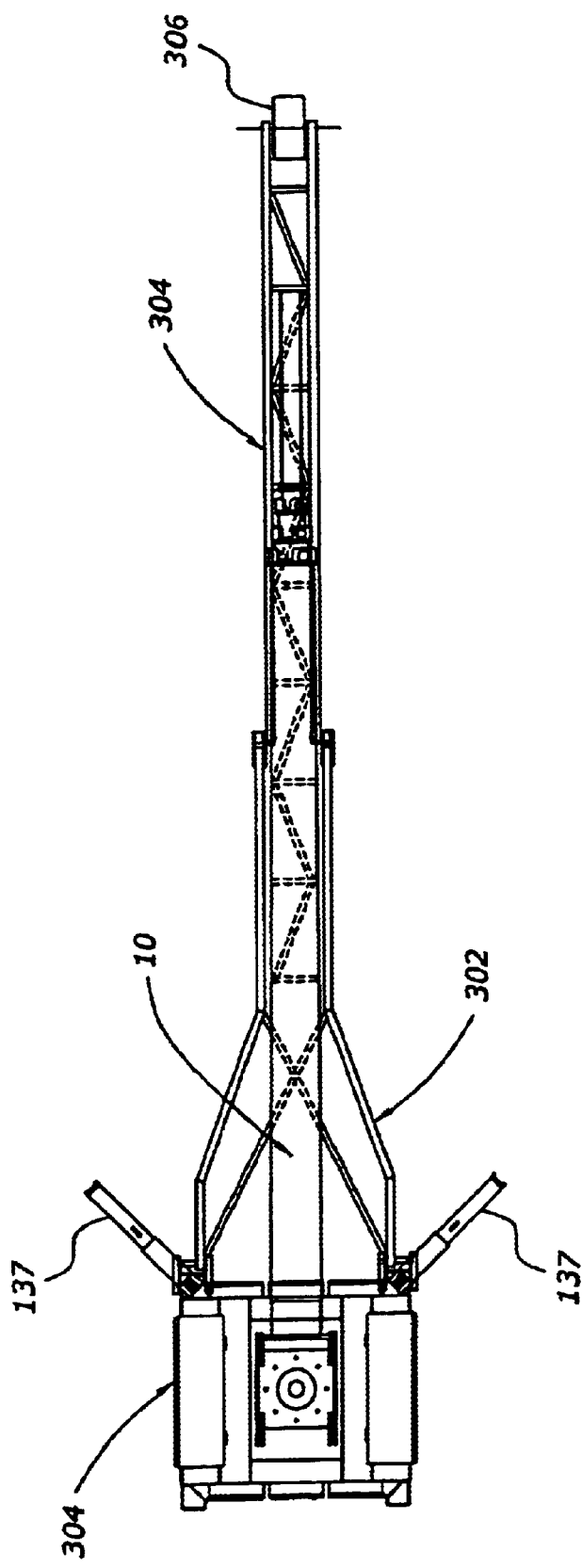
FIG. 43 is top plan view of FIG. 42.
Figure 49:
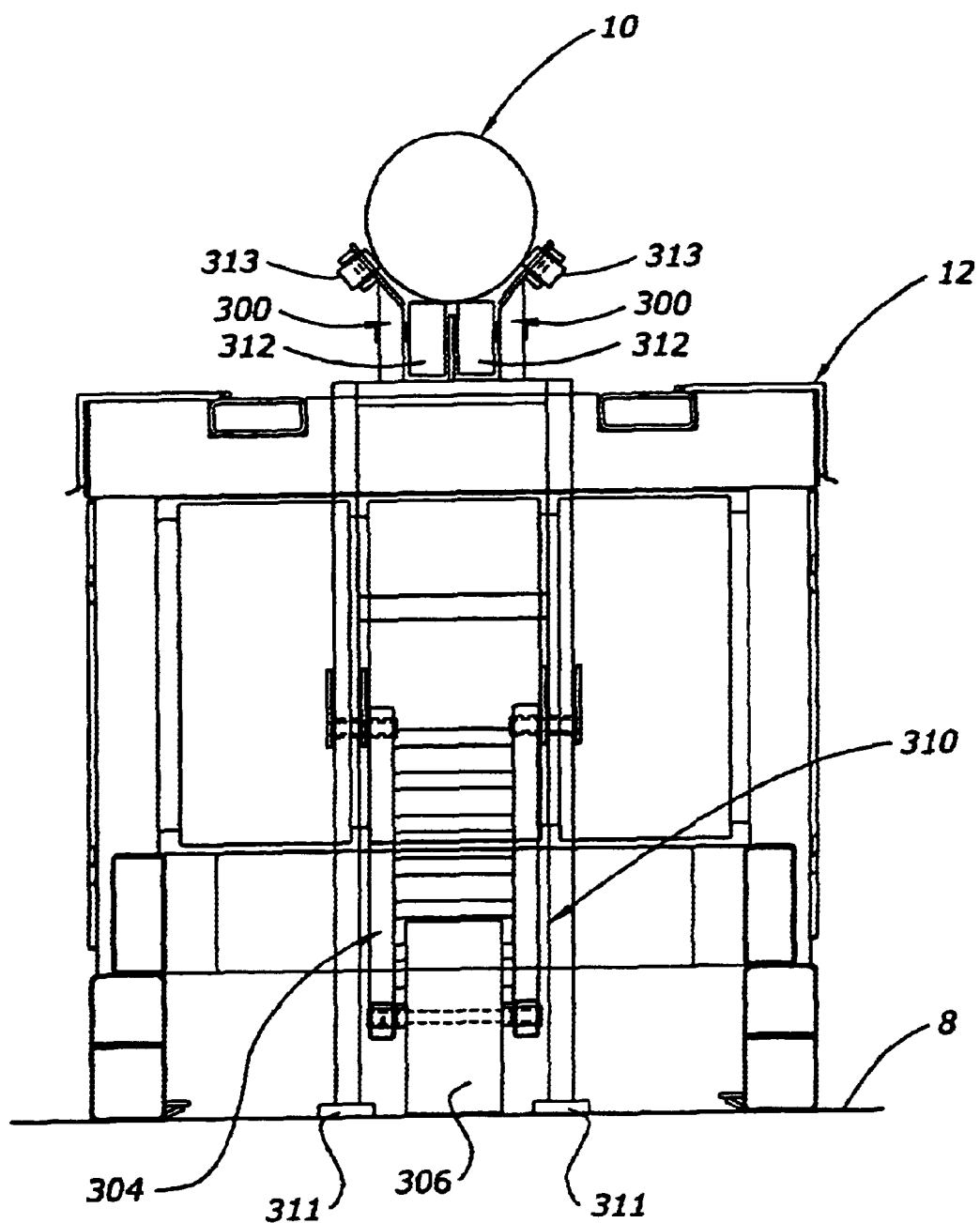
FIG. 49 is a side elevation of FIG. 42, showing the pole in position to be raised.
Figure 52:
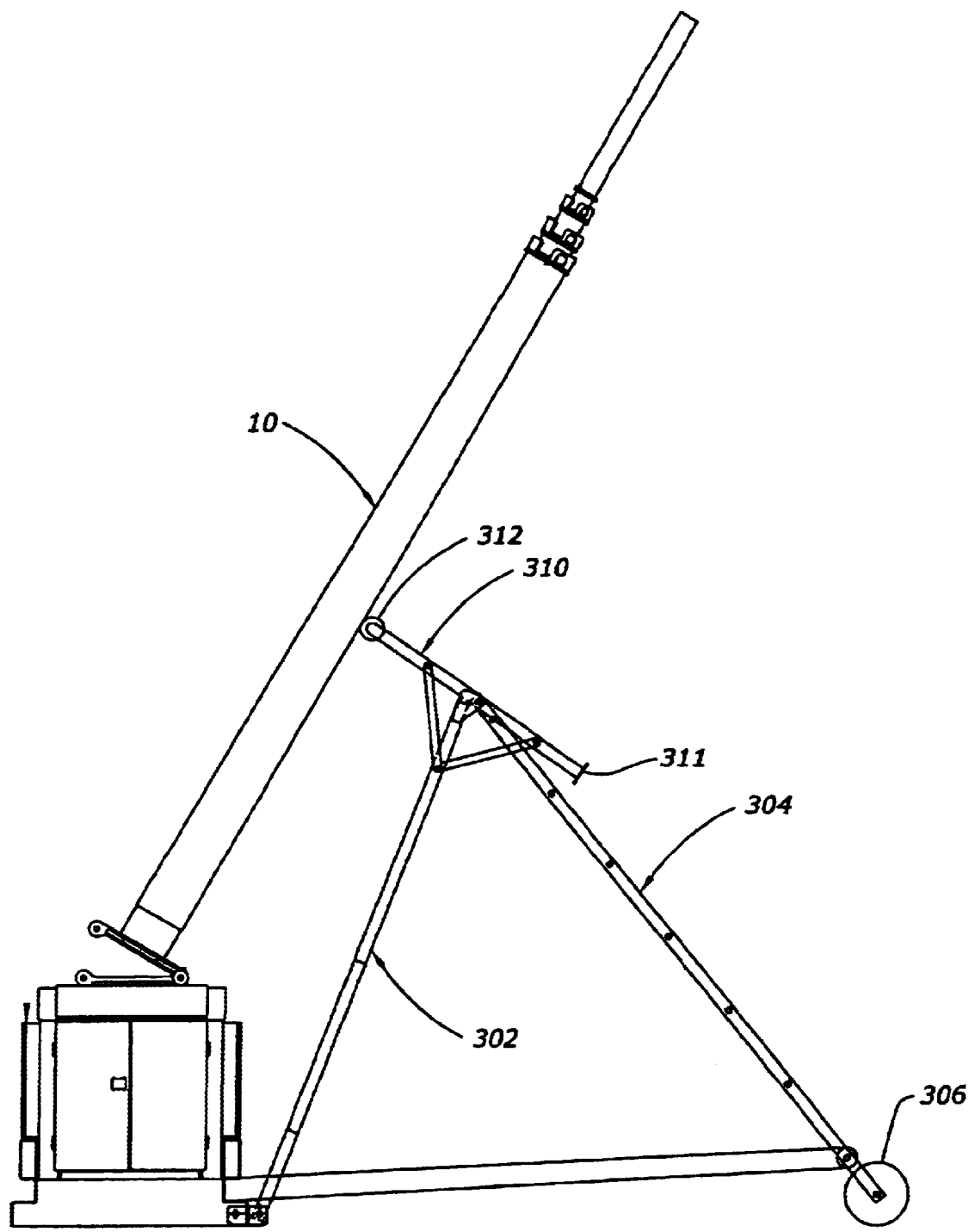
FIG. 52 is similar to FIG. 51 but shows the device continuing to raise the pole.
Figure 53:
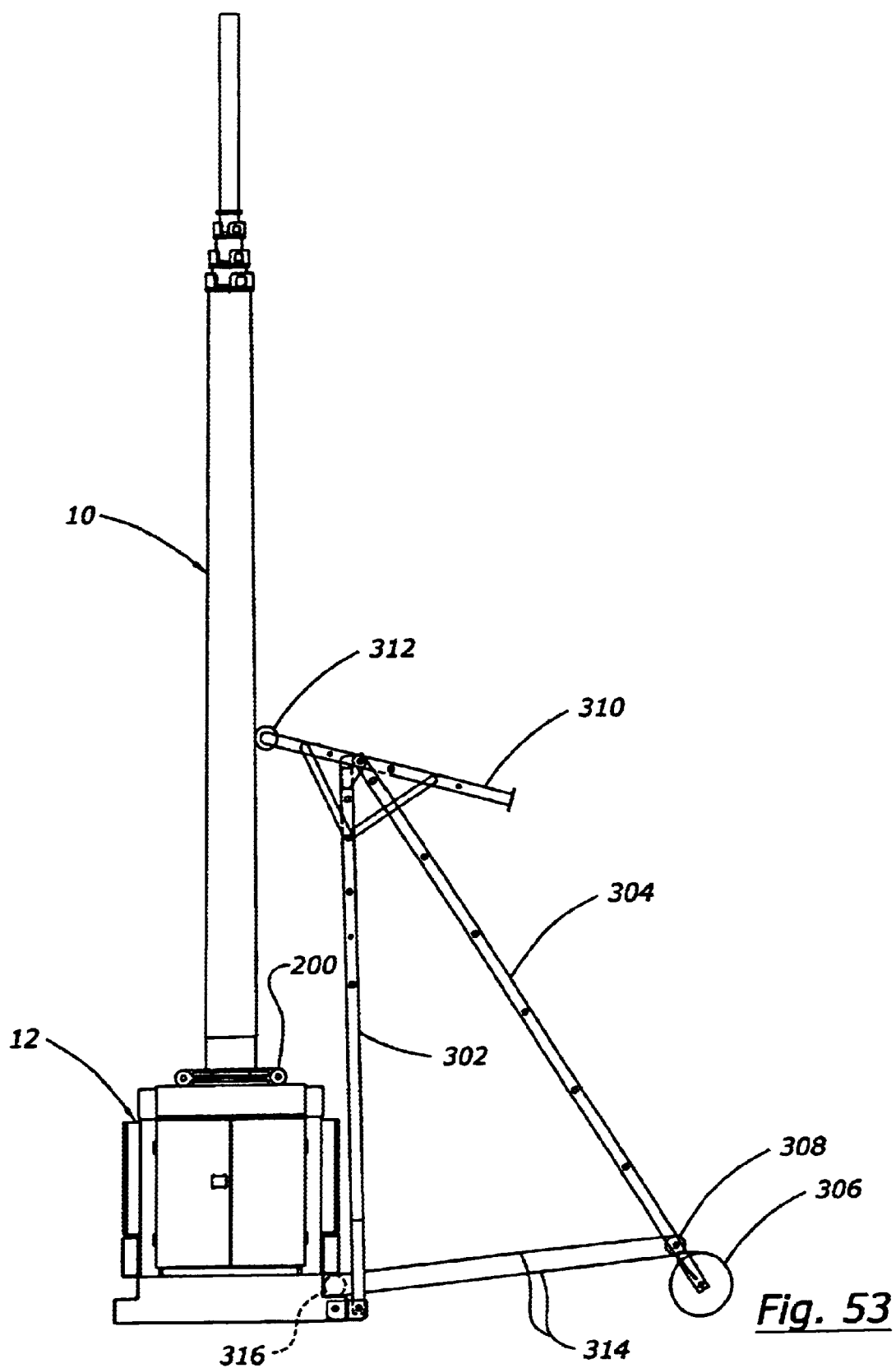
FIG. 53 is similar to FIG. 52 but shows the device having raised the pole to vertical on a base.

The task is to raise the pole 10 from pivoted down horizontal position shown in FIG. 42 to a vertical position shown in FIG. 53. One way to do so is illustrated in FIGS. 42–53. Other ways are, of course, possible.

A pole raising mechanism 300 includes an anchor portion 302 pivotally connected at 303 to base 12. A free portion 304 is pivotally connected at 305 to anchor portion 302, and at its distal end includes a wheel 306 and pulley 308. A support portion 310 is also pivotally connection at or around 305 to a junction of portions 302 and 304 and has rollers 312 and 313 at one end, and feet 311 at the other. As shown, braces 307 are connected between anchor portion 302 and support portion 310.

Raising mechanism 300 is relatively lightweight, can be folded up such that the portion 302 and 304 are adjacent for minimization of space occupied, and can be easily manipulated in place as shown in FIG. 42. In that orientation, support portion 310 would support the side of pole 10 by rollers 312 and 313 with feet 311 of support portion 310 placed on ground 8. Lift truck 114 could then release support for pole 10. Motor 316 would shorten cables 314. This would pull pulley 308, and thus the distal end of portion 304 towards motor 316. This in turn would cause support portion 310 to move upwardly as illustrated in FIG. 50. Rollers 312 and 313 would roll along the side of pole 10, but side rollers 313 would cooperate with rollers 312 to cradle and hold pole 10.

Motor 316 can be an electric motor operable off of power from generators 112, or from batteries stored in base 12. Other power sources are of course possible.

Figure 51:
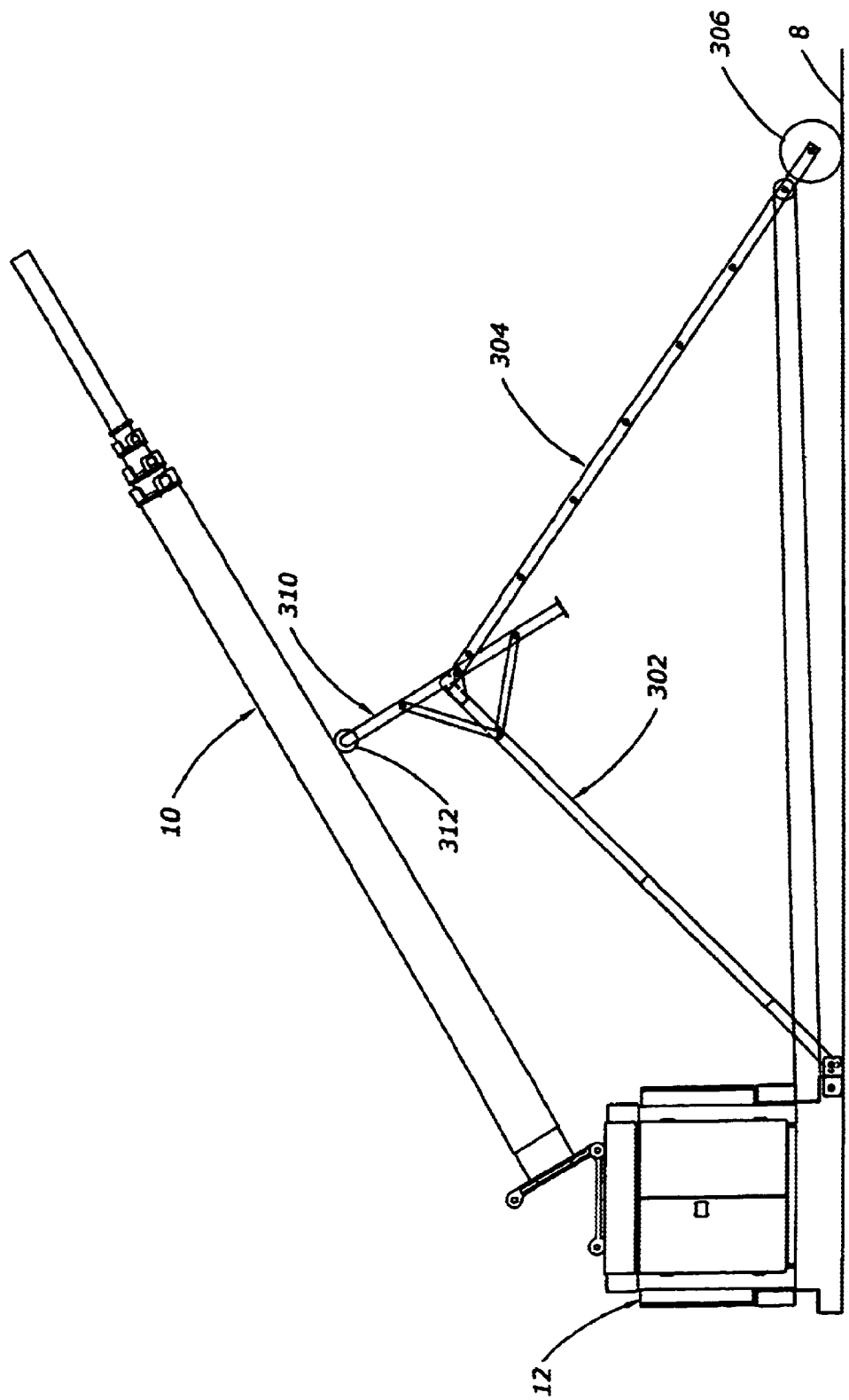
FIG. 51 is a side elevation of FIG. 50.

As shown if FIGS. 51, 52, and 53, motor 316 would continue to be operated to shorten cables 314 to fold up portion 304 and 302 causing support portion 310 to push pole 10 to an upright or vertical position shown in FIG. 53.

Once in the upright position in FIG. 53, base plate 200 is secured in place to disallow pivoting and pole 10, in collapsed or shortened form, is now supported and upright on base 12. Lighting array 30 (not shown) would have been attached to the top of pole 10. Once pole 10A is in vertical upright position, raising mechanism 300 can be disattached and moved to the next base to raise the next pole. It is possible for raising mechanism 300 to be stored on trailer 104. It is lightweight yet rugged enough for its raising function. Also, it takes up relatively a small amount of space on trailer 104. It is possible to carry it underneath the top trailer surface 104.

Figure 54:
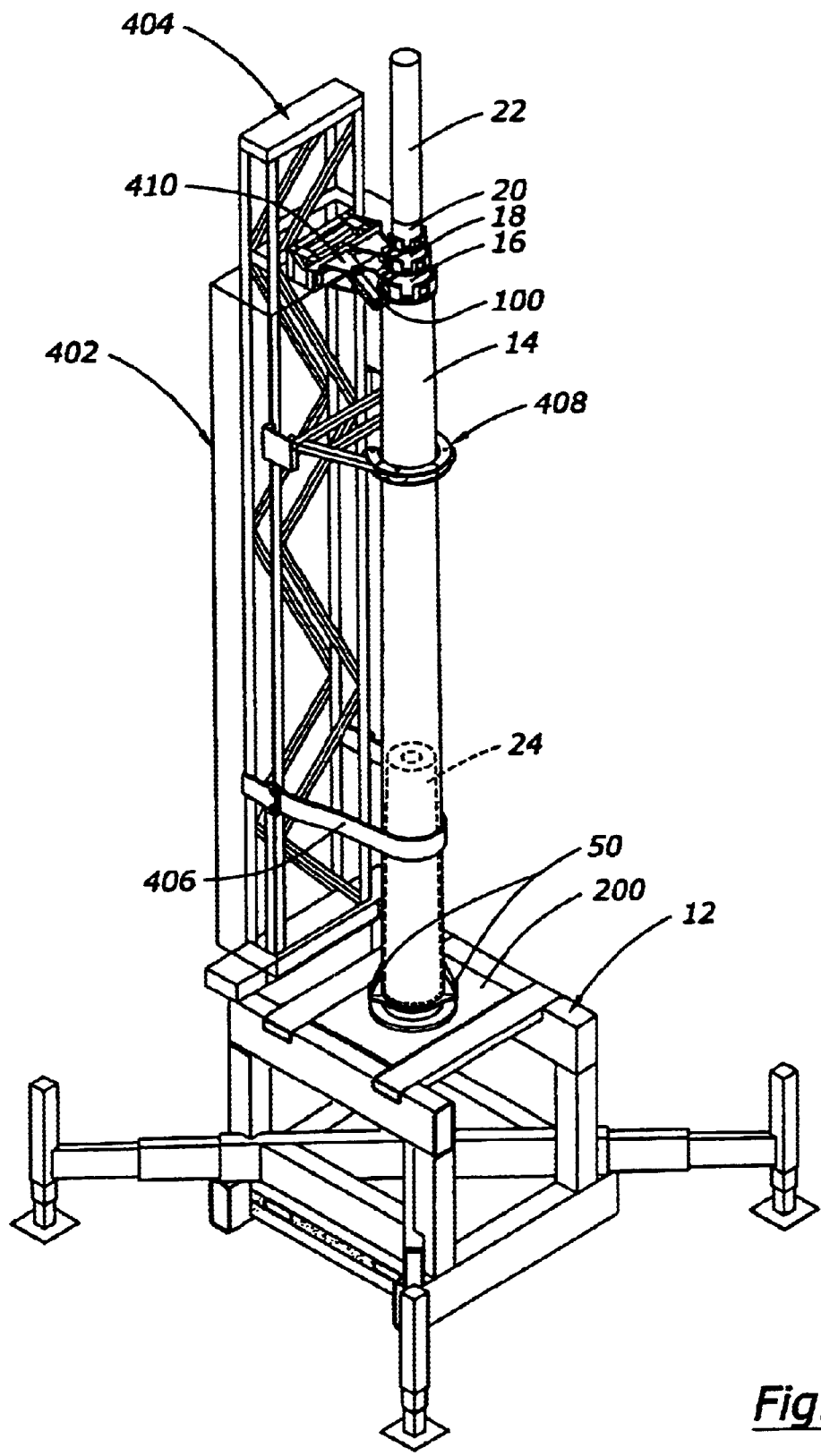
FIG. 54 is a diagrammatic view illustrating a device mounted on a base next to a pole in vertical position, the device being prepared for use to vertically extend extendable portions of the pole.

Pole 10A would then be extended, as described earlier. One specific example of how extension of pole 10A can be accomplished is shown at FIGS. 54–70. Another mechanism, here called extension mechanism 400, can consist of a base framework 402 and a fly frame 404. Fly frame 404 is shown in FIG. 54 in a retracted position in base portion 402. It is extendable to an extended position (see FIG. 67), by means of an electrical accuator such as an electrical motor and a rack and pinion arrangement. Other extension mechanisms are possible. Extension mechanism 400 is relatively lightweight and takes up a relatively small amount of space. Therefore it can be mounted on trailer 104 either on its upper surface or stowed underneath. The bottom end of extension mechanism 400 can be mounted upon the top of a base 12 spaced apart slightly from an upright pole 10. The length of extension mechanism 400 is such that when in a retracted state as shown in FIG. 54, it is at least as long as an pole section. Fly portion 404 of extension mechanism 400 would be long enough so that when fully extended from base portion 402, it can pull an extendable pole section to its fully extended position.

Extension mechanism 400 can be lifted up onto the top of base 12 by lift truck 114, or otherwise can be moved into general position. Mechanism 400 includes a releasable strap 406 to secure its lower portion around pole 10, and clamping ring 408 to secure it towards the top of the pole section 14, and a finger lock mechanism 410 mounted on or near the top of fly portion 404 and which is operable to grasp ears 100 on an extendable pole section 16 18 or 20. Once finger lock 410 grabs ears 100 on an extendable pole section, fly 404 is moved upwardly thus pulling extendable pole section upwardly. Once the extendable section is pulled up so that catch pins 42 are at the general same level as latch catches 36 at the top of the preceding pole section, base pole section 14 is rotated with pole 49 into pole receiver 50 at the bottom of pole section 14 to lock pins 42 into latch catches 36, as previously described. Once that occurs, the extended pole section is extended and locked relative to the proceeding pole section. Finger lock 410 can be remotely released and fly 404 moved down to grab the ears 100 on the next largest extendable pole section. The extension and locking process is then repeated. If there are additional extendable pole sections, the entire process is repeated until all pole sections are extended and locked to create the fully extended pole 10. This process contemplates that the top most extendable pole section is extended first. The remaining extendable pole sections would then still be down at the level reachable and graspable by finger lock 410 when fly 404 is retracted.

FIGS. 55–59 show finger lock 410 in more detail. A mounting beam 412 is attached to a carriage 411 that in turn is attached to an accuator that can move carriage 411 laterally relative to fly portion 404. The specifics of the acuators in carriage 411 are not shown, but could involve utilization of any type of electrically powered and controlled acuator such as servo or stepper motors. This allows finger lock 410 to be adjusted laterally relative to pole 10 once extension mechanism 400 is locked in place relative to pole 10.

A pair of plates 414/416 extend from mount 412. A pivot member 418 extends vertically between outer ends of plates 414 and 416. A top finger 22 with a side cutout 423 is pivotable around pivot 418 and spaced apart from a bottom finger 424 with upwardly extending pin 421 at its outer end. A spacer 424 spaces fingers 420 and 422 from one another, but both fingers 420 and 422 are pivotable around pivot 418.

Figure 55:
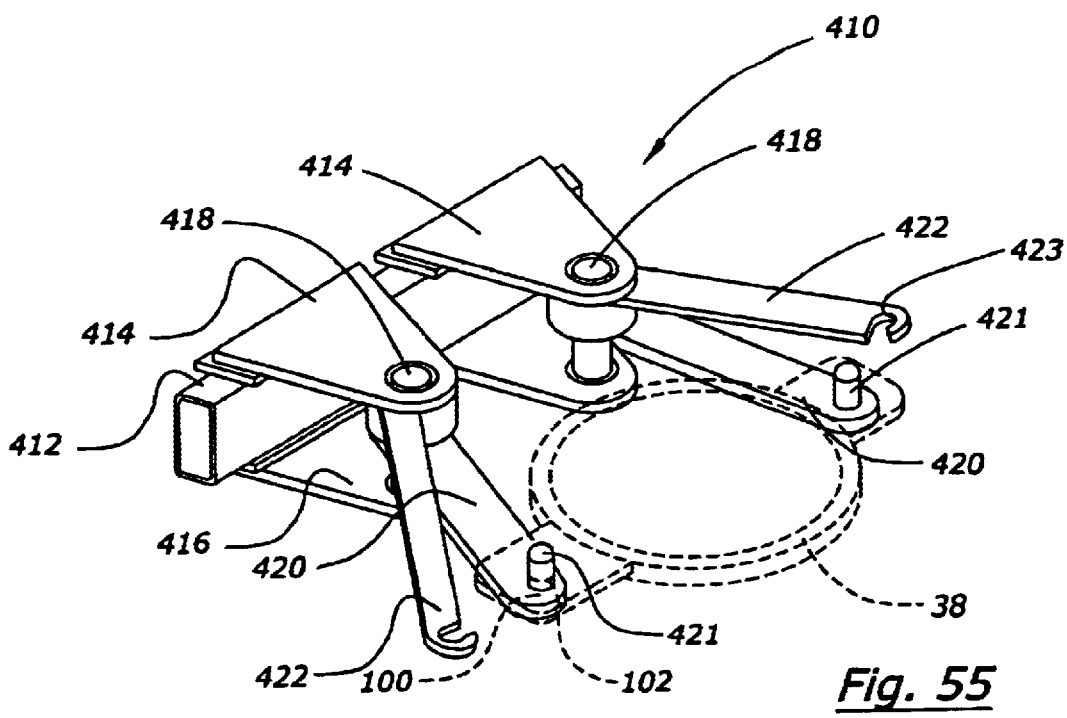
FIG. 55 is an enlarged isolated perspective view of a set of fingers in open position used to grab ears on an extendable pole section.
Figure 58:
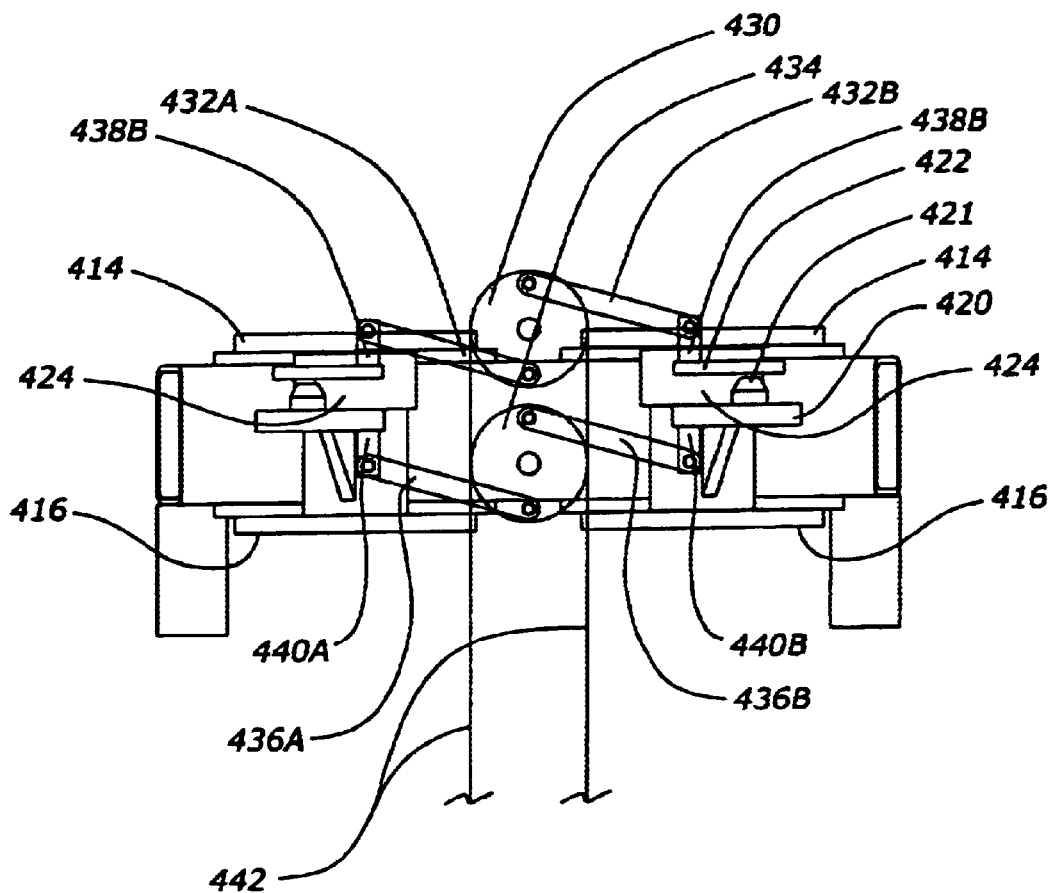
FIG. 58 is a front elevation of FIG. 56, showing actuators to effectuate opening and closing of the finger pairs.
Figure 59:
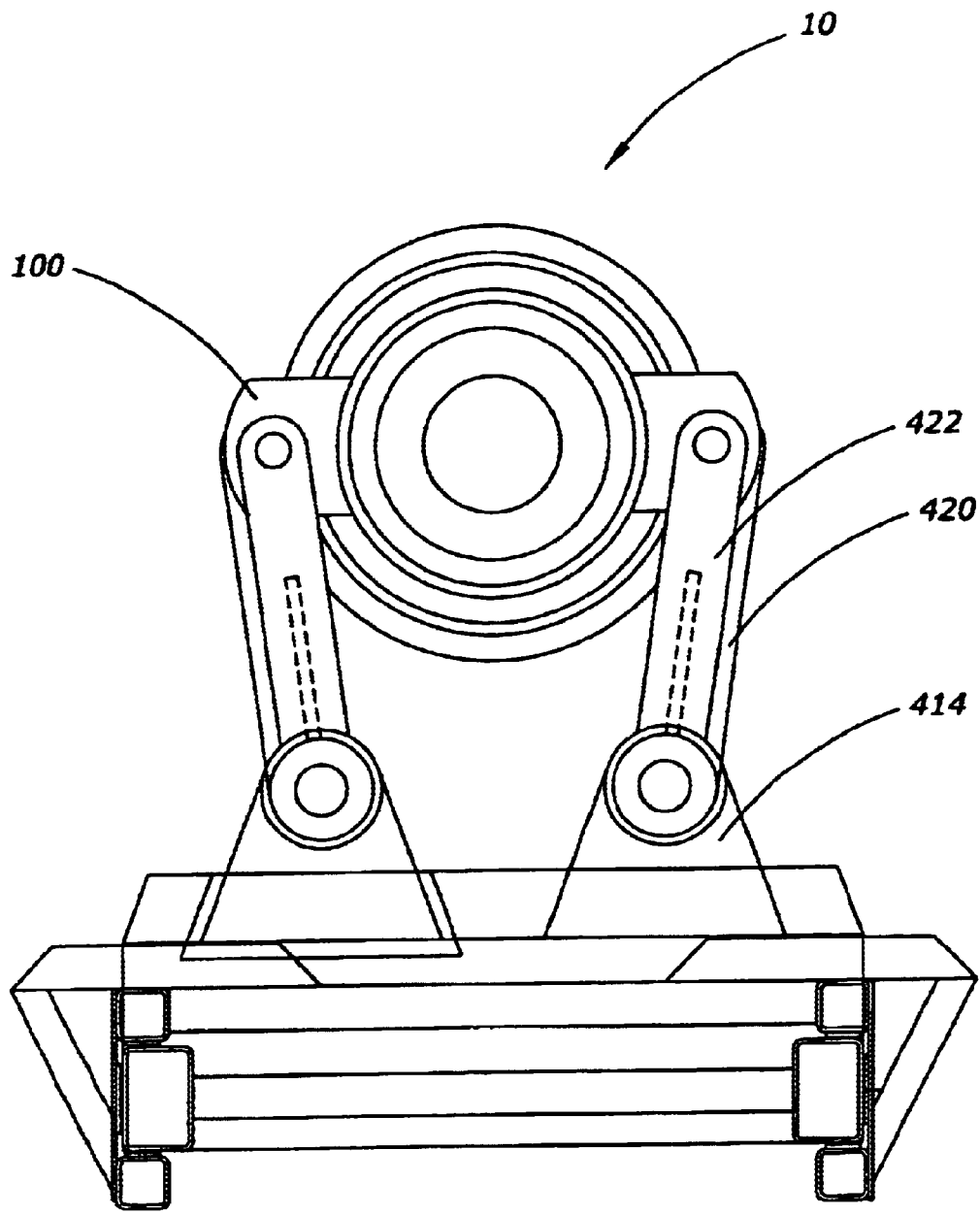
FIG. 59 is a top plan view of FIG. 56.
Figure 60:
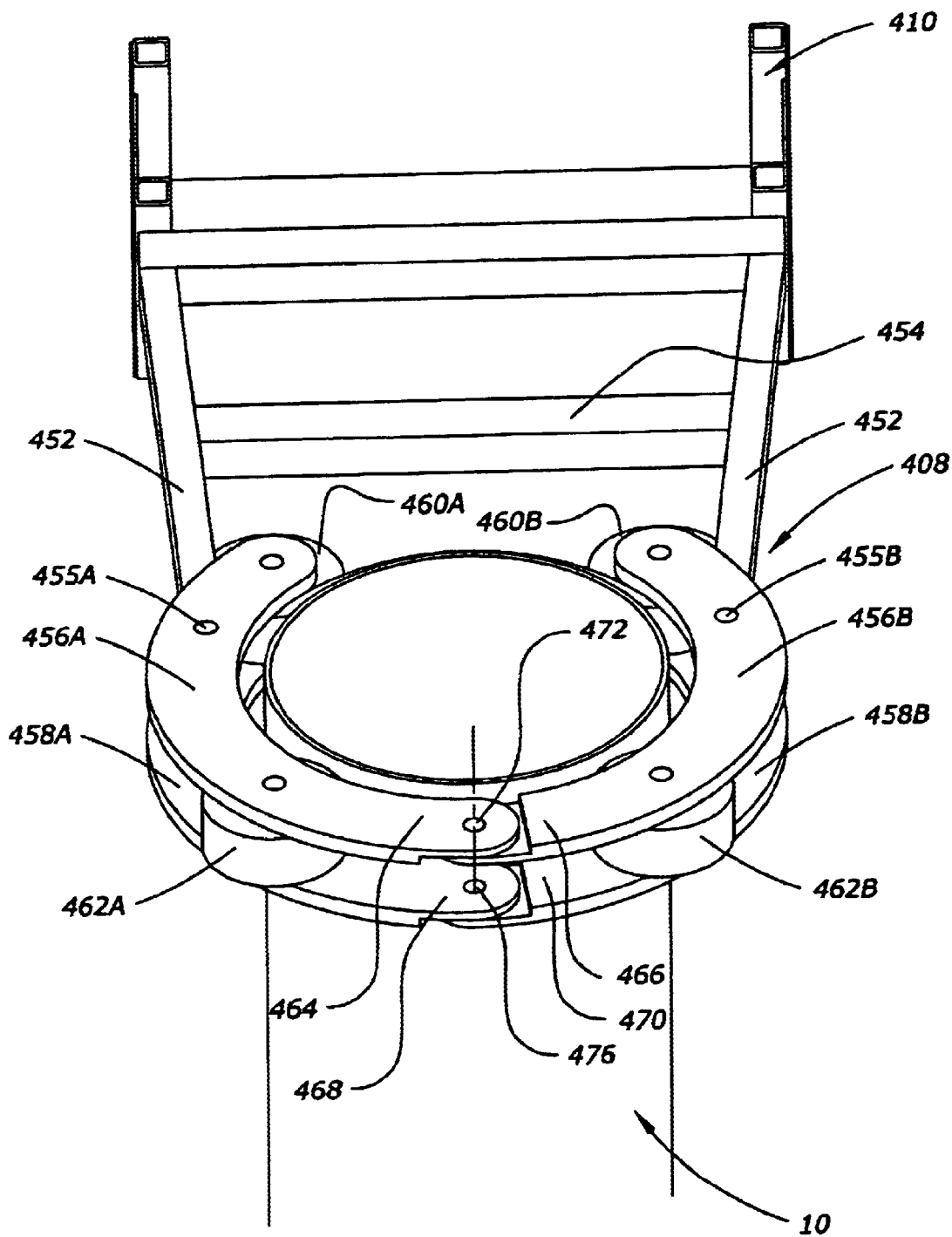
FIG. 60 is a front perspective view of an automatically operating base pole section grasping ring in a closed and locked position around a base pole section.
Figure 61:
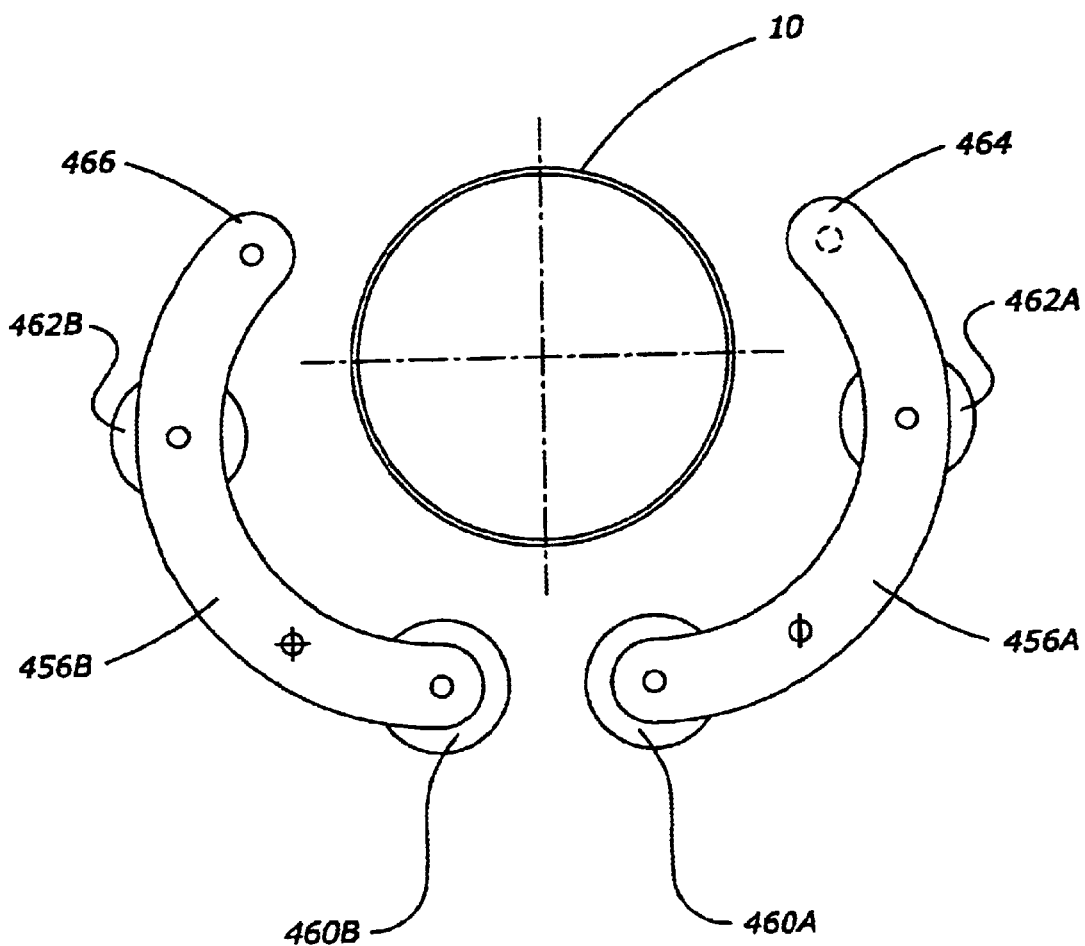
FIG. 61 is a top plan view of the grasping ring of FIG. 60 is a normally open position.
Figure 62:
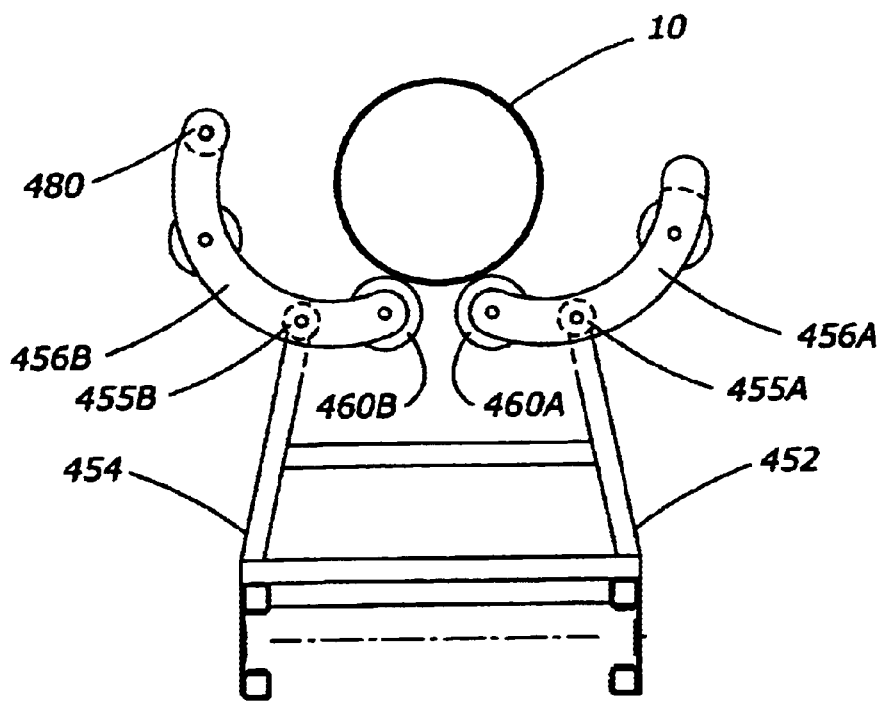
FIG. 62 is a top plan view of the grasping ring of FIG. 60 as it approaches a pole and begins automatic closing around the pole.
Figure 63:
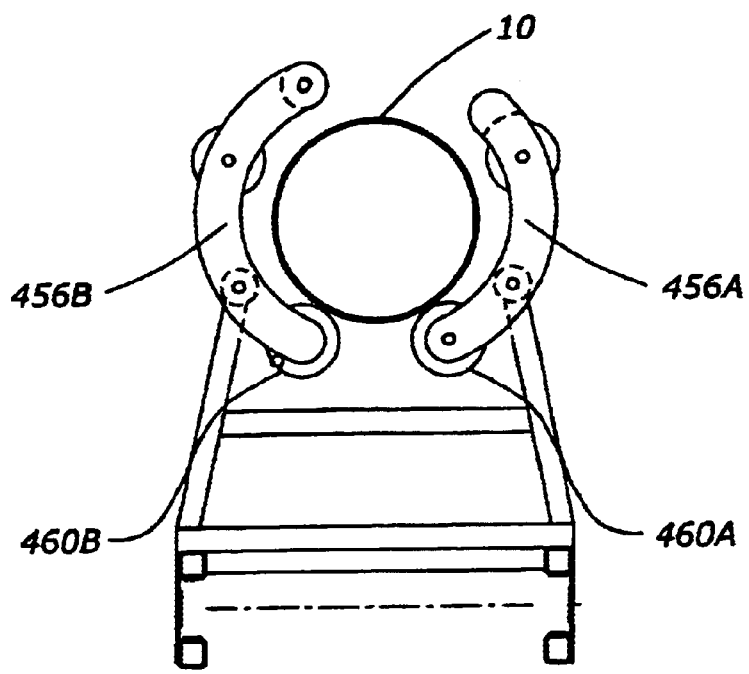
FIG. 63 is similar to FIG. 2 but shown the grasping ring almost closed around a pole.
Figure 64:
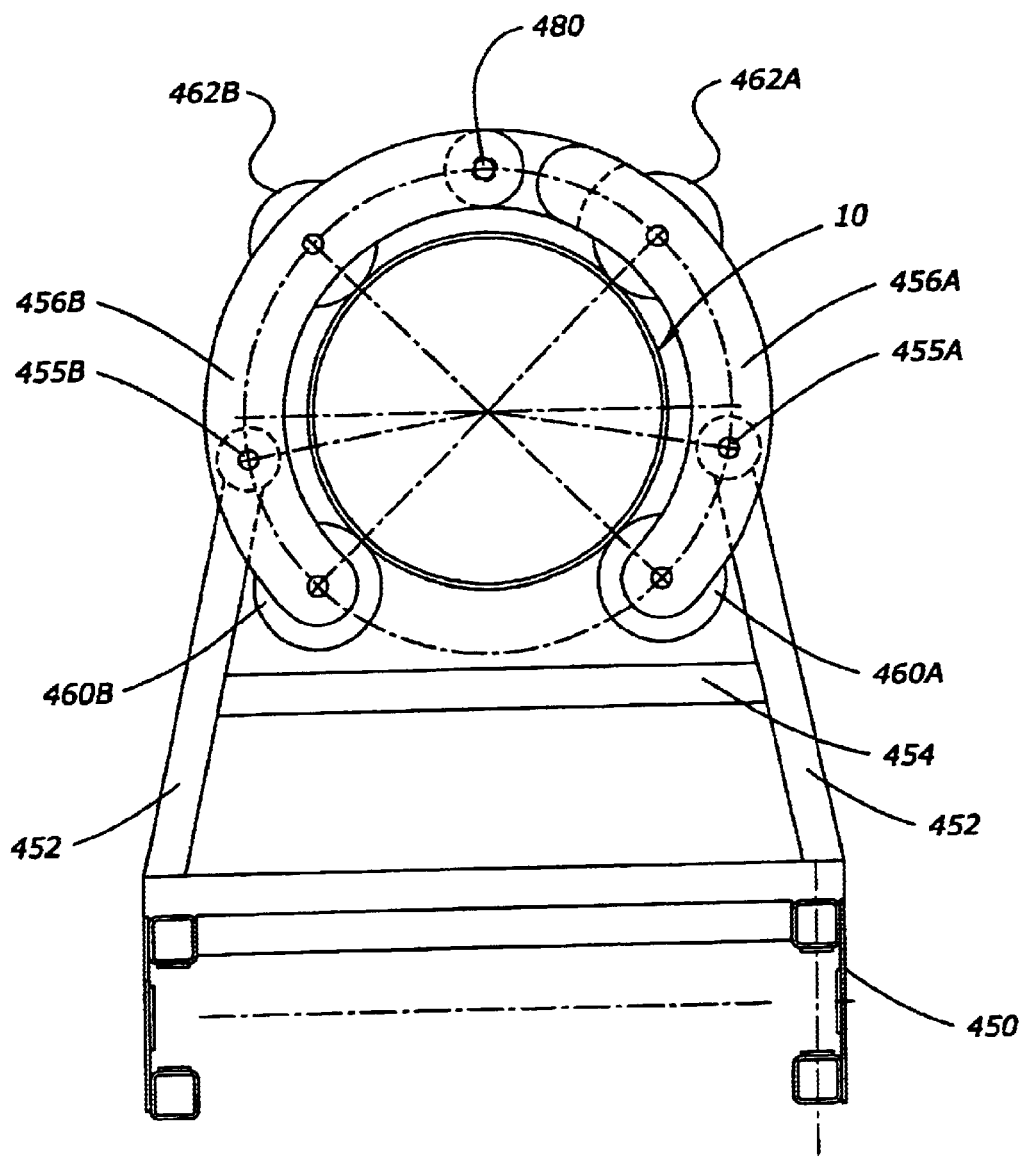
FIG. 64 illustrates automatic closing of the grasping ring of FIG. 60.

By referring to FIG. 58, remote control of the pivoting of fingers 420 and 422 can be accomplished by rotatable wheels 430 and 434 mounted on finger lock 410. Links or arms 432A and B and 436A and B extend from wheels 430 and 434 respectively to paths 438A/B and 436A/B on fingers 420 and 422. Rotation of wheel 430 and/or 434 causes arms 432 and 436 to push or pull fingers 420 or 422 outward or inward. A cable 442 can be connected to wheels 430 and 434 and extend down to the bottom of extension member 400. Personnel at the bottom could manually pull cable 442 one way or the other to open or close fingers 420 and 422. It is important to note, as illustrated in FIG. 55, that bottom fingers 420 are normally closer to one another than outer fingers 422 so that carriage 411 to be moved towards pole 10. Fly 404 is vertically adjusted to that pins 421 on lower fingers 420 past just under ears 100 of an extendable pole section of pole 10. Once pins 421 are in vertical alignment underneath holes 102 and ears 100 attached to collar 38 on the top of an extendable pole section, fly 404 can be slightly vertically raised. Pins 421 would then enter through the bottom and extends through holes 102 and ears 100. At that time, top fingers 422 can be pivoted inwardly to that lateral openings 423 made around pin 421. Top and bottom fingers 420 and 422 would thus basically be parallel and function to lock pins 421 in holes 102 of ears 100. The extendable pole section associated with ears 100 is therefore grasped and cannot escape finger lock 410 vertically, or rotate.

Figure 56:
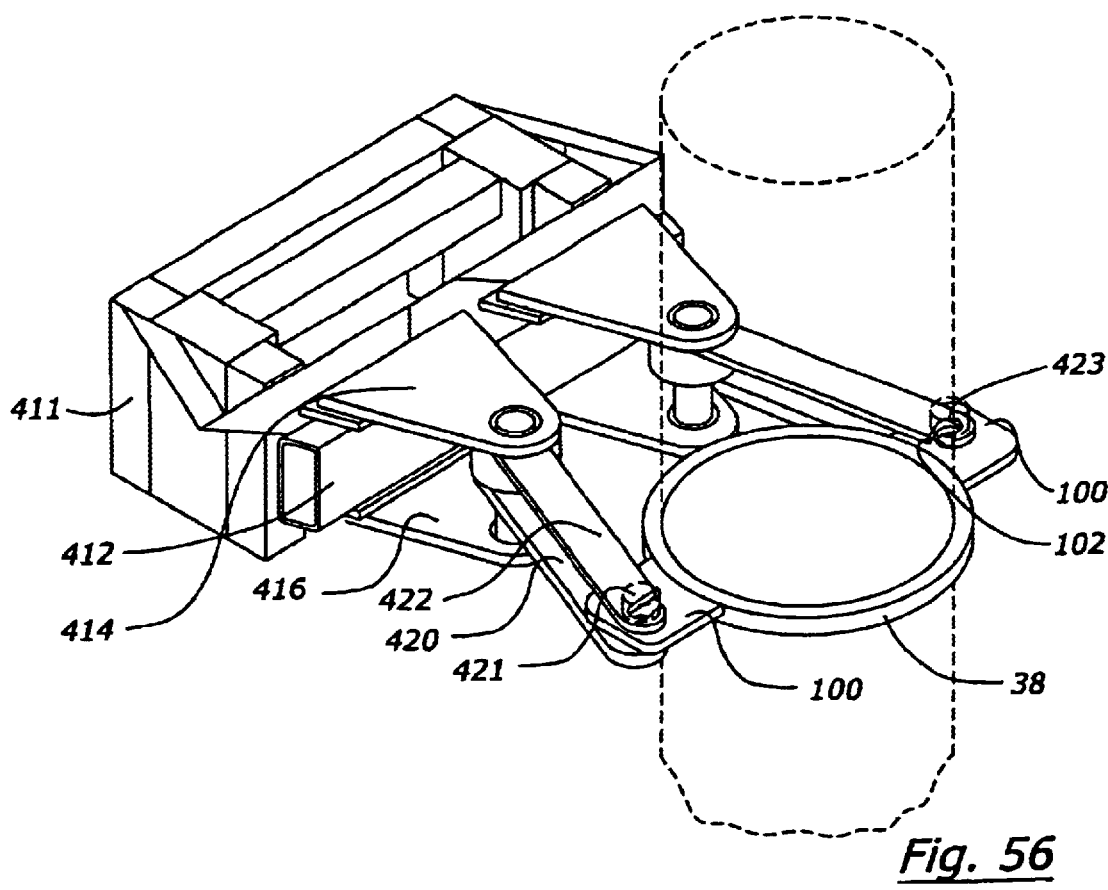
FIG. 56 is similar to FIG. 55, but shows the fingers in closed locked position to ears on an extendable pole section.
Figure 57:
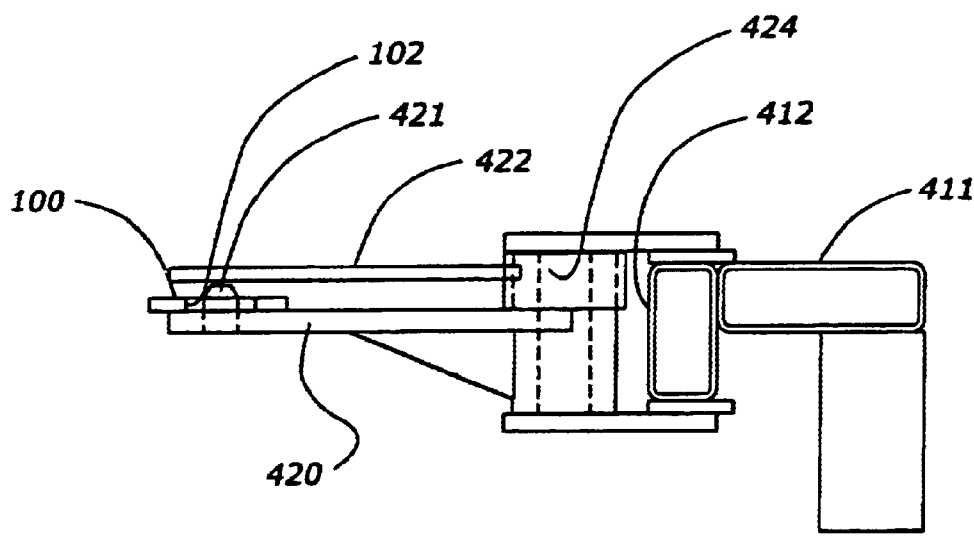
FIG. 57 is a side elevation of FIG. 56.

FIG. 56 shows finger lock 410 in a locked position. Extension of line 404 of extension mechanism 400 would then lift that pole section relative to an preceding pole sections.

FIGS. 60–64 illustrate in more detail clamping ring 408. They provide a secure grip to the top of base pole section 14, and support extension mechanism 400, an automatic functioning clasping ring 408 is disclosed. The connection or mount 450 to base portion 402 of mechanism 400 has arms 452 extending therefrom and held in spaced apart position by cross member 454. The outer ends of arms 452 are connected to closeable jaws that pivot around pivot pin 455A and B.

The closeable jaws are defined by top and bottom jaws 456 and 458, of essentially the same shape spaced apart and including back or proximal roller 460 and front roller 462. The distal ends of jaws 456 and 458 include openings 472 and 476, and overlap with corresponding distal ends 464 and 468 of the other set of jaws 456 and 458. The opposing sets of jaws 456/458 are held in a normally open position (see FIG. 62) by springs (not shown). As extension mechanism 400 is brought into position relative to pole 10, mechanism 400 is positioned so that pole 10 enters between opposing jaws 456/458A and B until rollers 460A and B come into contact with pole 10 (see FIG. 62). Further movement of mechanism 400 towards pole 10 causes jaws 456/458A and B to close around pole 10 (see FIG. 63), until the position of FIG. 64. The spring loaded pin 480 will automatically seek in openings 464 and 476 when the outer ends of the jaws overlap. This automatically locks grasping mechanism 408 to pole section 14.

Figure 65:
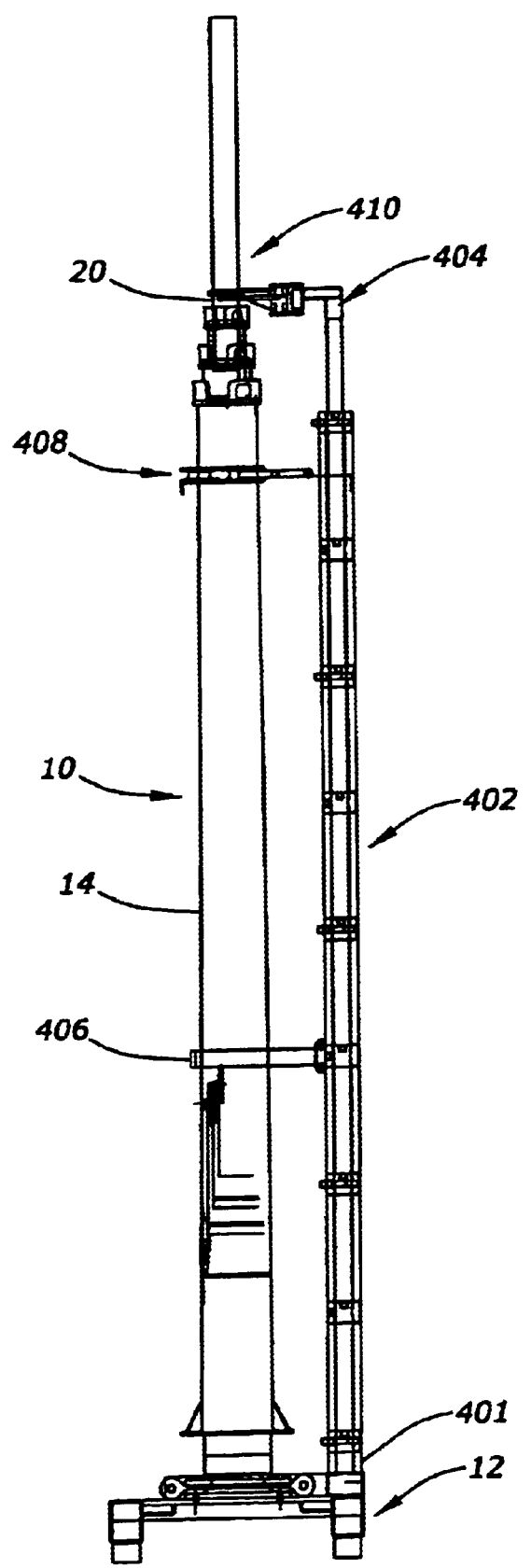
FIG. 65 is side elevation of FIG. 54.
Figure 66:
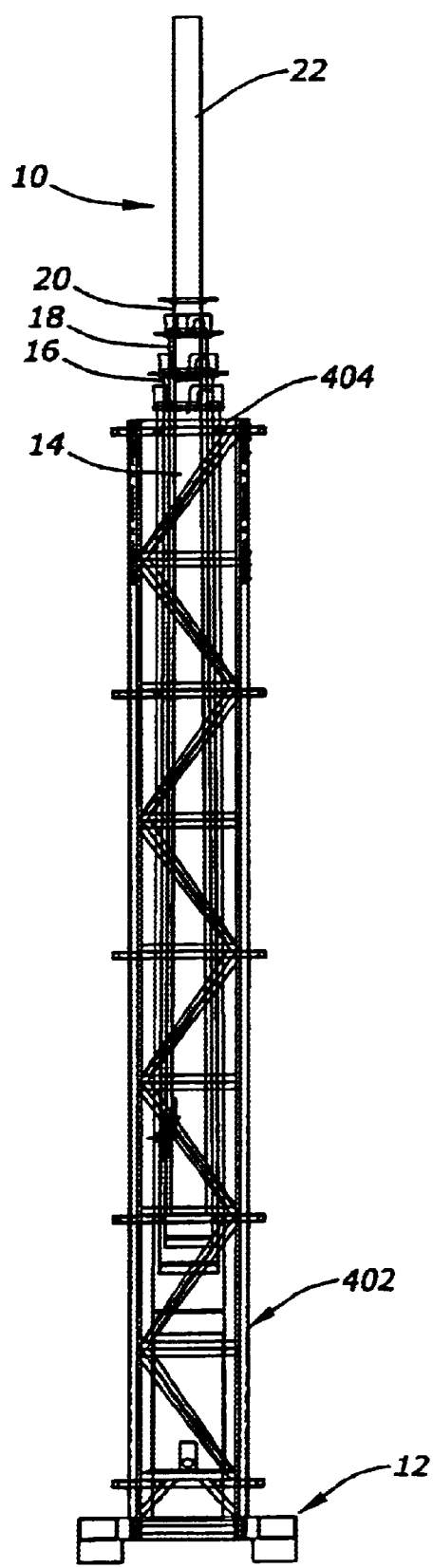
FIG. 66 is a front elevational of FIG. 54.

FIGS. 65 and 66 show extension mechanism 400 in position with strap 406 around lower part of pole section 14, grasping ring 408 locked around the top part of pole section 14, and finger lock 410 locked into ears of uppermost pole section 20.

Figures 67, 69, 70:
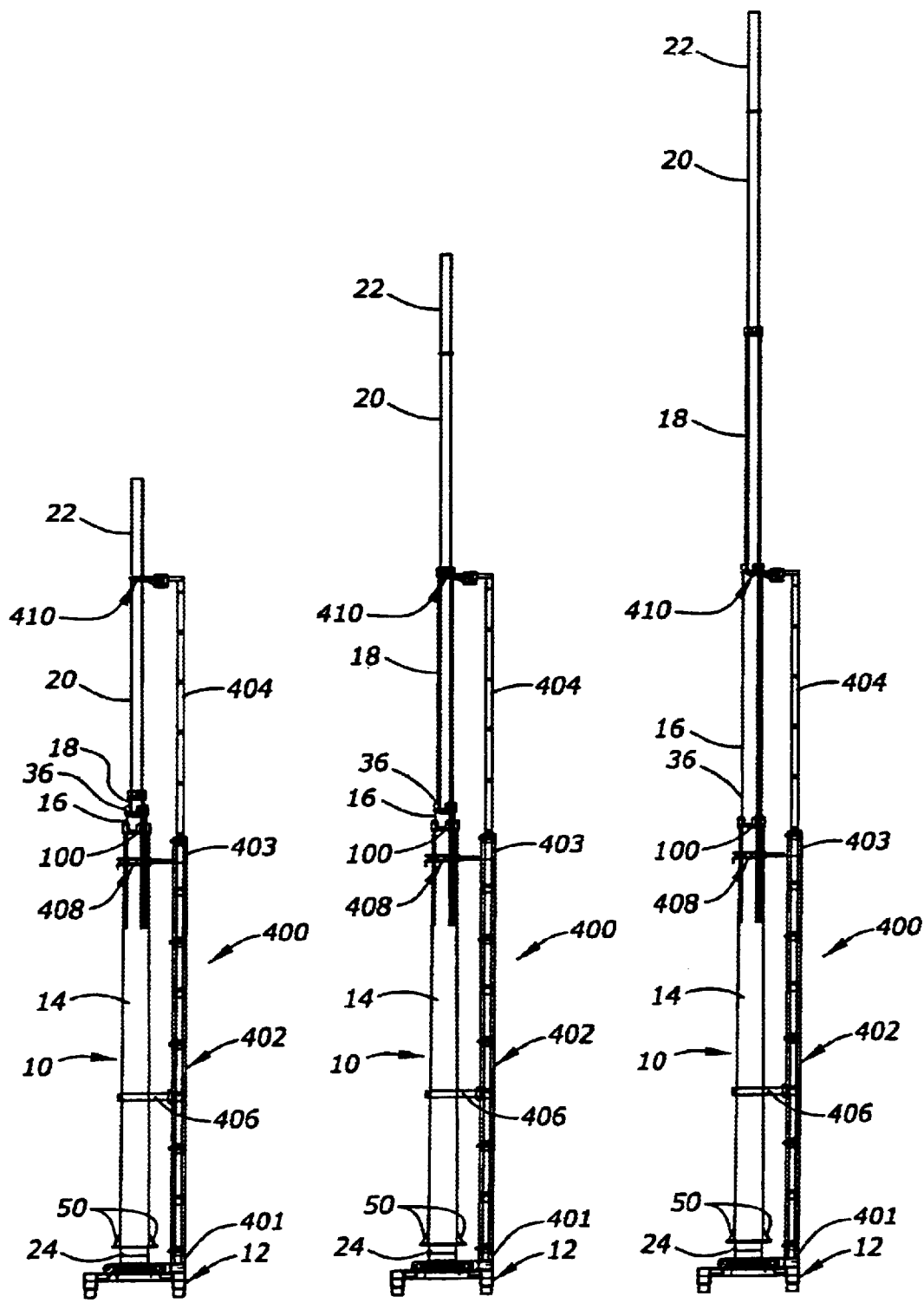
FIG. 67 is similar to FIG. 65 but shows completion of vertical extension of a first extendable pole section of the pole.
FIG. 69 is similar to FIG. 67 but shows extension of a second pole section.
FIG. 70 is similar to FIG. 67 but show extension of a third pole section to complete the full extension of the pole.
Figure 68:
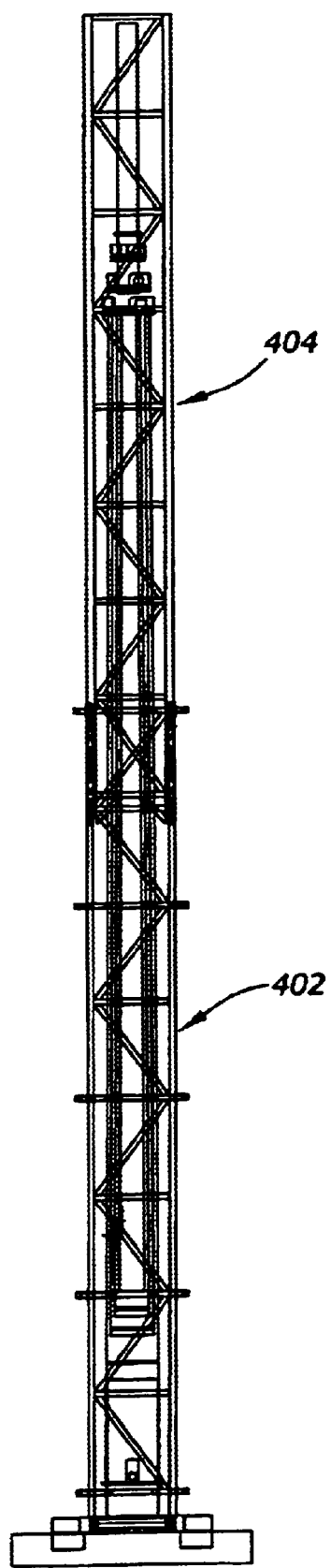
FIG. 68 is a front elevation of FIG. 67.

FIGS. 67 and 68 show fly 404 extended and pole section 20 fully extended where it can be locked in fully extended position relative to preceding pole section 18. After rotating base section 14 to lock pole section 20 in extended position relative to pole section 18, finger lock 410 would be released by pivoting top fingers 422 outwardly, slightly lowering fly 404 to move pins 421 out of holes 120 and ears 100 of pole section 20, and then moving carriage 411 away from pole 10. Fly 404 would then be retracted and finger lock 410 manipulated to lock into ears 100 on pole section 18. Pole section 18 would then be extended in a similar manner and locked (see FIG. 69). The process would be repeated to extend pole section 16 until pole 10 is at its fully extended height. Finger lock 410 would then be removed from the pole 10, fly 404 retracted and a strap 406 removed. Mechanism 400 would then be withdrawn from pole 10. By sufficient lateral movement of mechanism 400 away from pole 10, clamping ring 408 would overcome the locking force of pin 480 and the jaws of clamping ring 408 would open to allow the detachment of mechanism 400 from pole 10. Mechanism 400 could then be moved to the next base 12 and collapsible pin to extend it in a similar fashion. This can be sequentially done until all poles 10 are fully extended.

Figure 71:
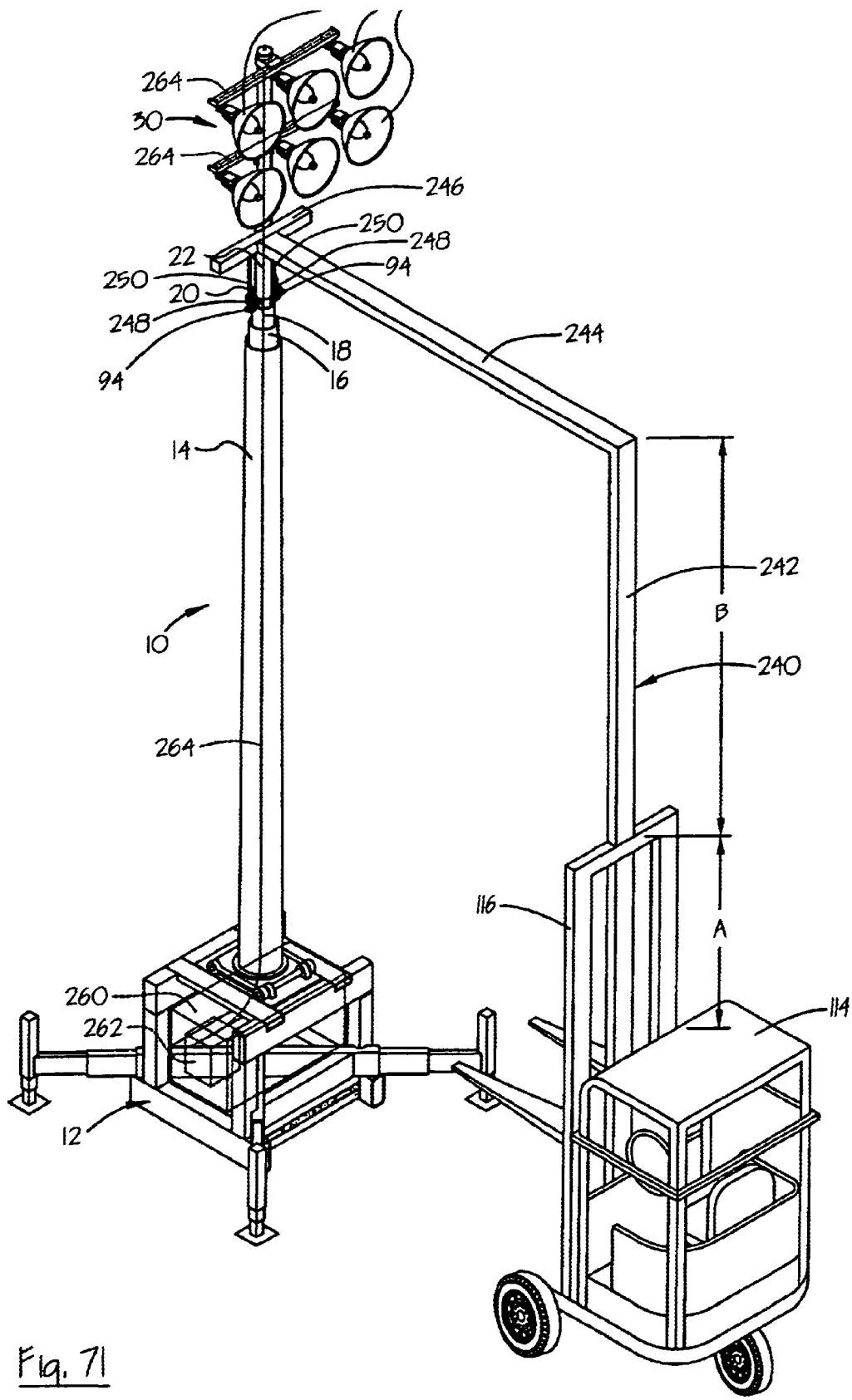
FIG. 71 is a perspective view of an alternative embodiment of an attachment of a tool to a lift truck to raise extendable pole sections of the pole.
Figure 72:
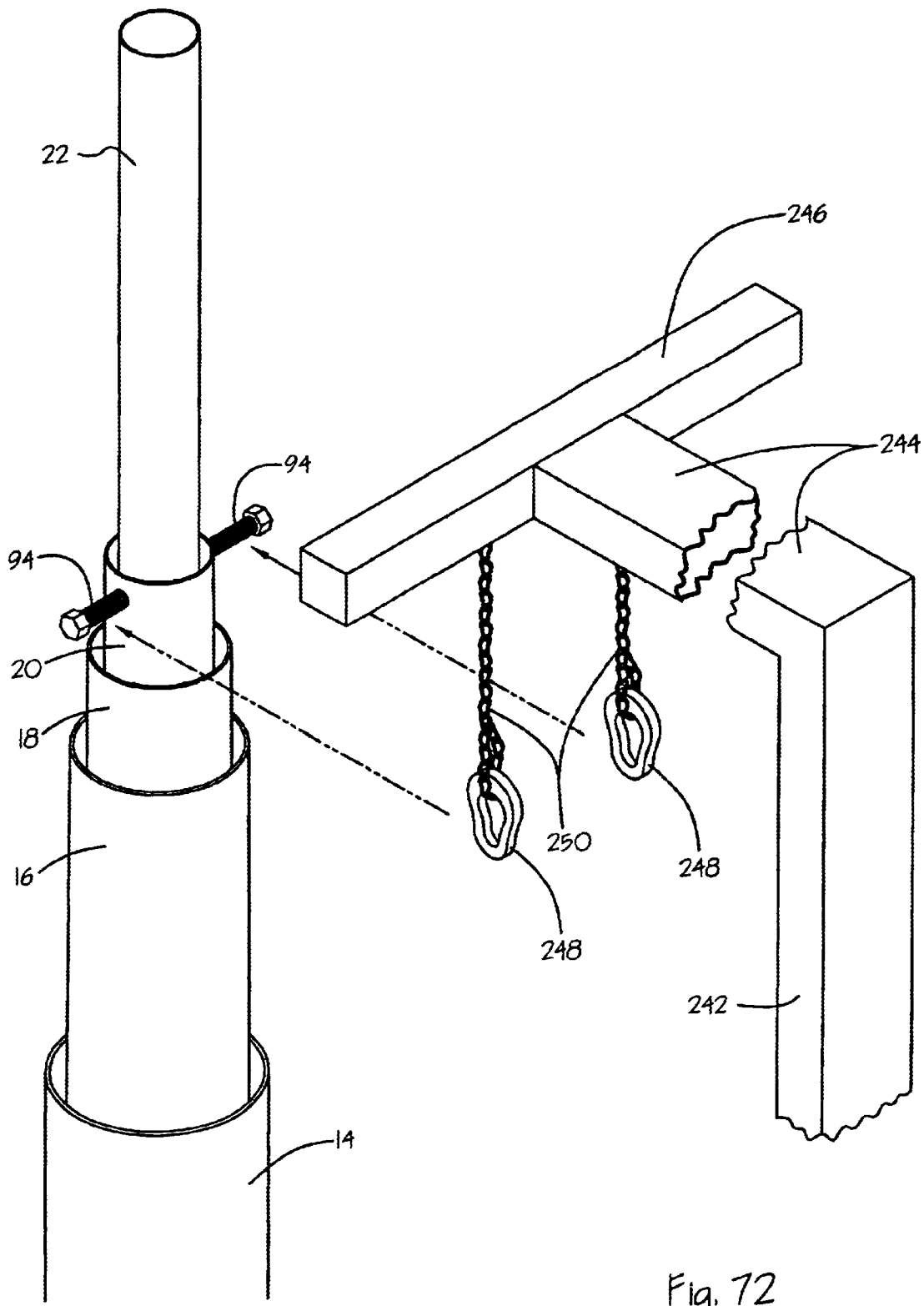
FIG. 72 is an enlarged perspective view of the tool that can be used with a lift truck to facilitate extension of extendable pole sections of the pole.
Figure 73:
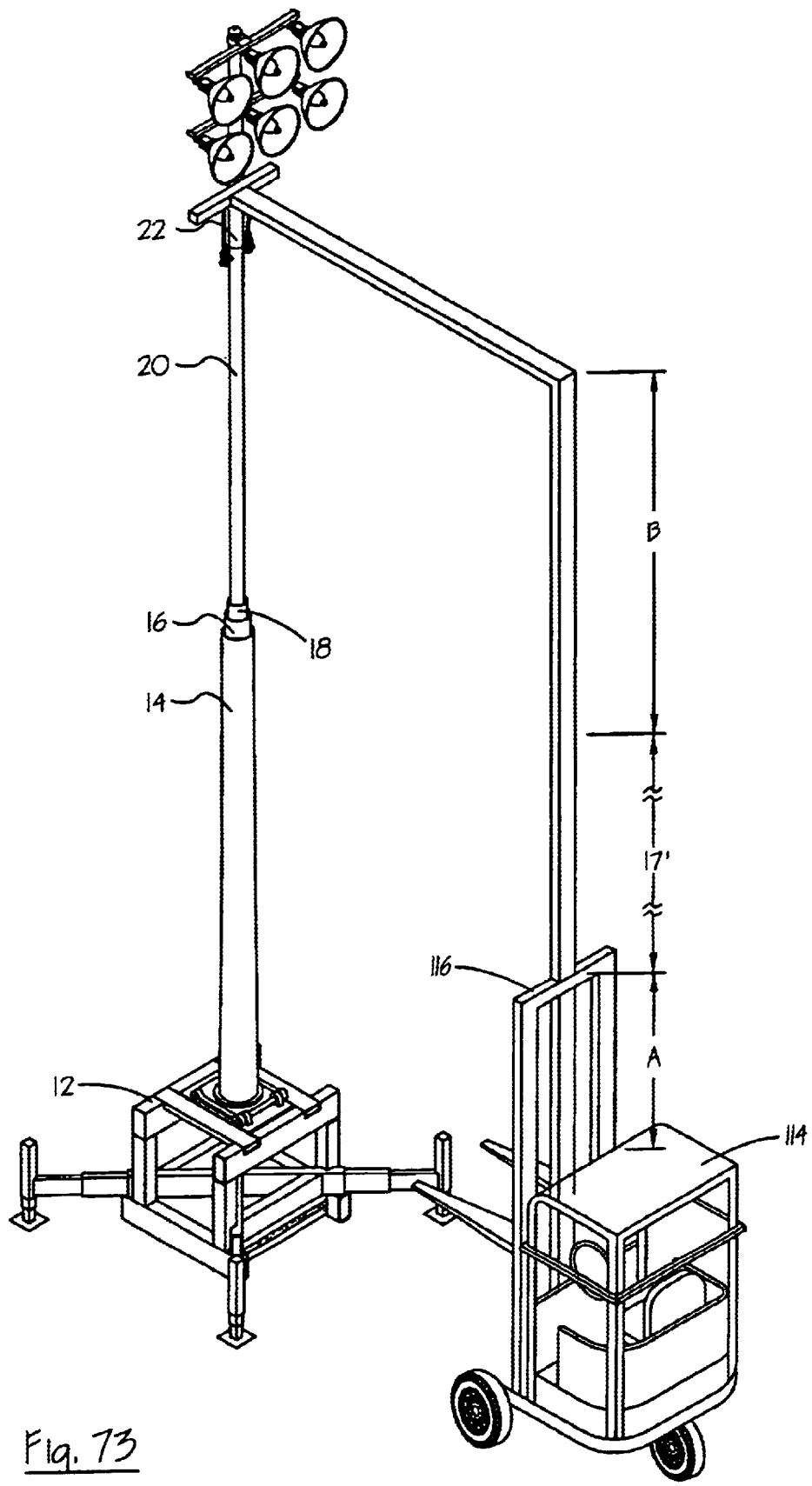
FIG. 73 is similar to FIG. 74 but shows an extendable pole section extended by the tool and lift truck.
Figure 74:
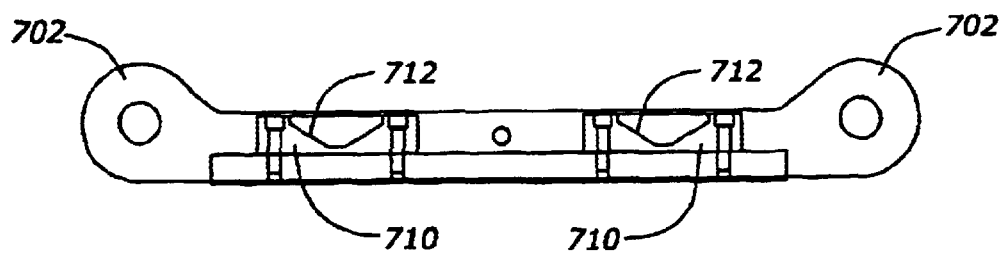
FIG. 74 is an enlarged side elevational partial sectional view of hingeable base-plate attachable to a base according to the invention.

But there are alternative ways to extend the pole sections. One such way is shown at FIGS. 71–73. Electrical generator (s) 260, control(s) 262, and connections (e.g. wires or cables) 264 are diagrammatically illustrated at FIG. 71.

Special tool or attachment 240 can be installed on lift truck 114. Attachment 240 includes a vertical post 242, an outwardly extending arm 244, cross member 246 at the end of arm 244, and attachment rings 248 connected to cross member 246 by chains 250.

Bolts 94 on opposite sides of pole section 16, can be grasped by manipulating lift truck attachment 240 to position whereby rings 248 can be placed over bolts 94 (see FIG. 72). Lift truck 114 would be operated to raise too 240, and thus pole section 20 a sufficient distance (within the range of travel of mast 116) until pole section 20 is fully extended from pole section 18. As previously described, locking mechanisms 34 relative to pole sections 18 and 20 would be manipulated to then lock section 20 in extended position relative to section 18 (see FIG. 73).

The above-described procedure could then be applied to extend pole section 18 relative to pole section 16. Finally, the procedure is repeated for pole section 16 relative to base pole section 14. At this point, pole 10A would be completely extended with lighting fixtures 110 of array 30A elevated.

It is to be understood that the nature of the slip-fit mount of pole 10A to stub 26 allows for some rotation of pole 10A relative to stub 26 even when pole 10A is fully extended with fixtures 110 attached. This is accomplished by using base pole turning gussets 50 and not completely seating pole 10A onto to stub 26. The array of fixtures can thus be turned according to desire by grasping and turning pole 10 on base stub 26. As previously discussed, rotation of pole 10 on base stub 24 also facilitates locking and unlocking of extendible pole sections.

The assembly of pole 10A, base 12A, and array 30A has been described. The same procedure can then be used for any or all of pole, base, lighting array combinations 10B/12B/30B to 10F/12F/30F. Lift truck 114 allows one worker to sequentially manipulate the components and erect high-powered lighting arrays to these substantial heights without large, expensive, complicated machines.

As can be appreciated, disassembly and loading of the components back into trailer 104 can be done in reverse fashion to that described regarding installation and erection of the lighting system.

An optional feature to help control raising and lowering of a pole (see FIGS. 42–53) is illustrated at FIGS. 74–78. A pivoting connection between base 12 and pole 10 is facilitated by a pivot plate 200. Pivot plate 200 includes a hinge base plate 200A welded or bolted to base 12 (see FIGS. 74 and 75). Hinge base plate 200A includes four pairs of ears 702/704. Two pairs of ears 702/704 are aligned along a pivot axis 201. The other two pairs of fears 702/704 are aligned along pivot axis 203.

Figure 75:
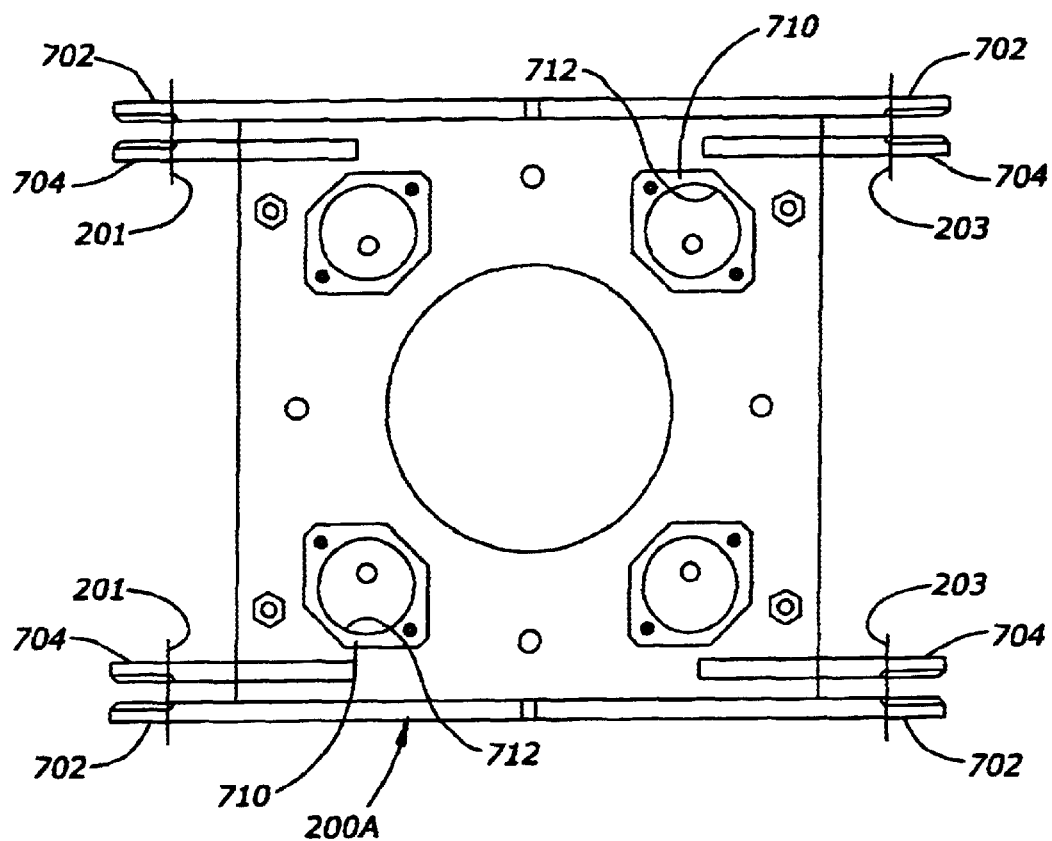
FIG. 75 is a top plan view of FIG. 74.

Hinge base plate 200A also includes four spring cups 710 bolted thereto in a configuration shown in FIG. 75. Spring cup 710 includes a shaped depression 712.

Figure 76:
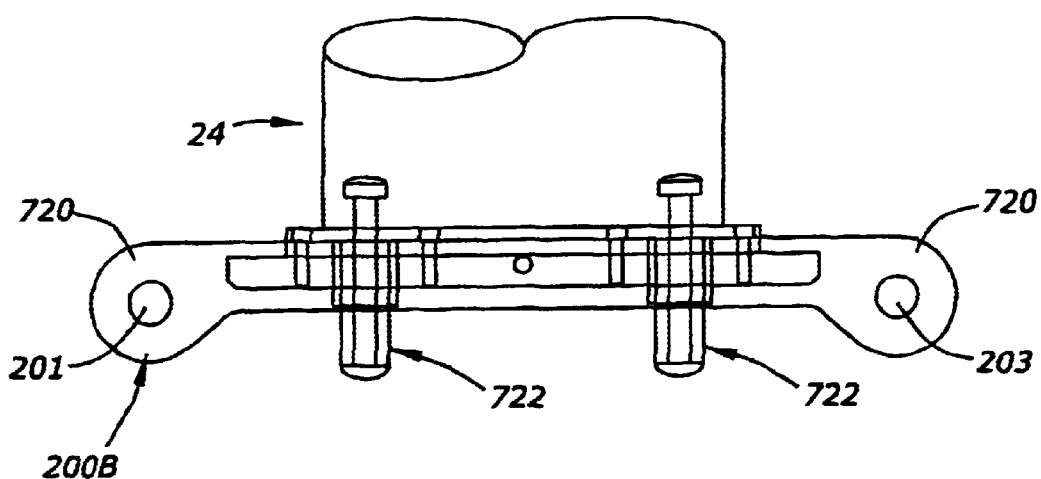
FIG. 76 is a side elevation partial sectional view of a pivoting portion relative to the base plate of FIG. 74.
Figure 77:
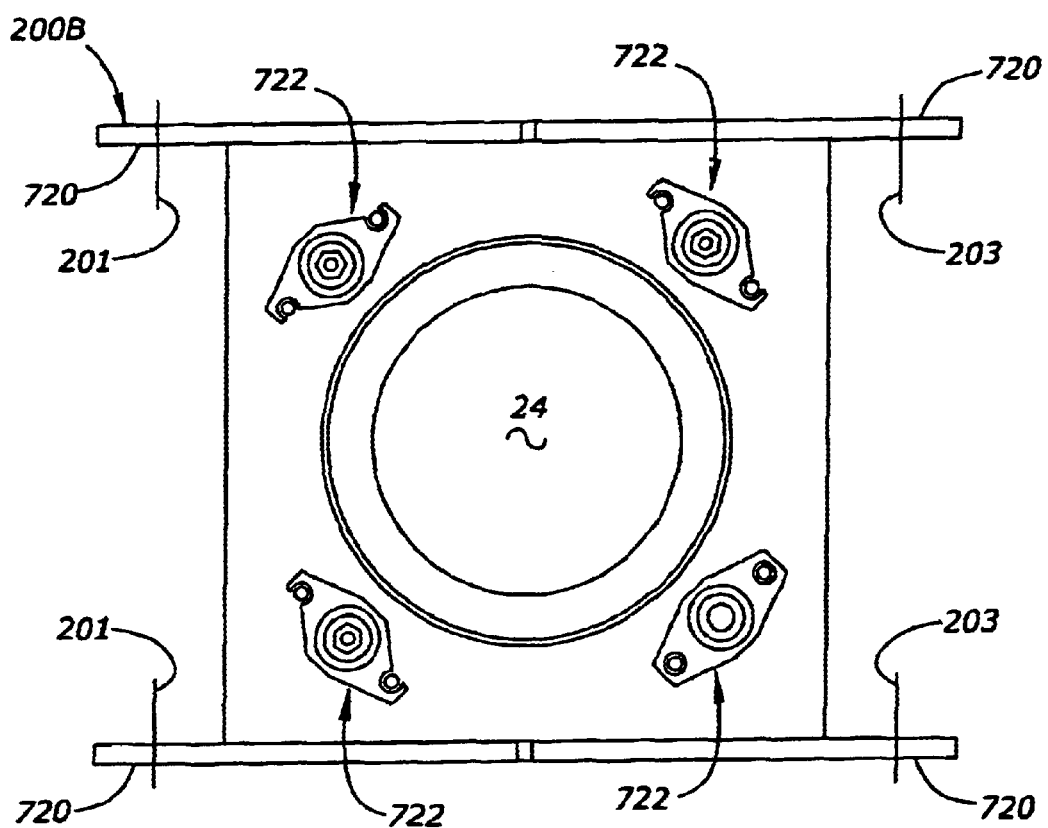
FIG. 77 is a bottom plan view of FIG. 76.

The other part of the hinge arrangement is a base rotation sub assembly 200B shown in FIGS. 76 and 77. Assembly 200B includes four ears 720 which are configured to mate between ear pairs 702/704 of base plate 200A when parts 200A and 200B are assembled together. Pins can be inserted along pivot axes 201 and 203 to lock pieces 200A and 200B together.

As shown in FIGS. 76 and 77, base rotation sub assembly 200B also includes spring assemblies 722 positioned to correspond with the position of spring cups 712 in portion 200A.

Figure 78:
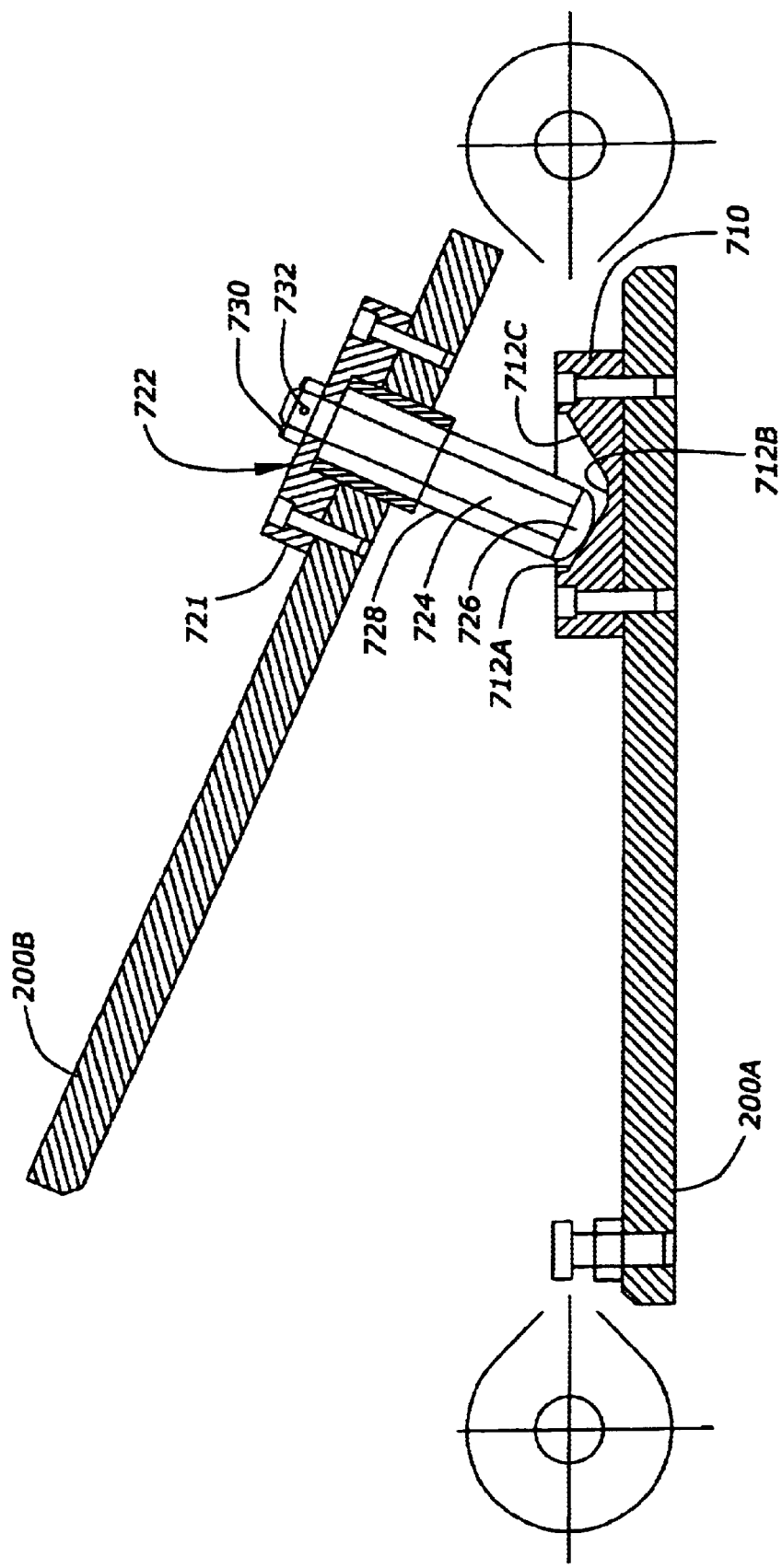
FIG. 78 is a still further enlarged side elevational sectional view of the parts of FIGS. 74 and 76 in operative engagement.

FIG. 78 illustrates the operation of spring assemblies 722. When portion 200B is mated to portion 200A, e.g. when pole stub 24 is vertical, bottom rounded ends 726 of pins 724 align with the bottom of spring cups 712. Plate 200B is adjacent and parallel. to plate 200A and thus, as illustrated in FIG. 76, pins 724 are pushed forwardly against downward biasing pressure of springs 728.

When pole 10 is to be installed on stub 24, which is attached to base rotation stub assembly 200B, one side of assembly 200B is unpinned from base plate 200A and pivoted up vertically to the position shown in FIG. 42. Pin/spring combinations 724/728 are all separated from spring cups 712 when in this position. Pole 10 is slip fit onto stub 24 and, as shown in FIGS. 50, 51, and 52, pole 10 is then pivoted upwardly such that base rotation stub assembly 200B pivots back towards staying parallel and adjacent to base plate 200A. It can then be pinned or locked in place.

The arrangement of FIGS. 74–78 helps control raising a pole 10 in the following way. When pole 10 is pivoted upwardly to the point that the pair of pin/spring combinations 724/728 nearest the pivot axis between pieces 200A and 200B first come into contact with their corresponding respective spring cups 712, the lower rounded ends 726 of pins 724 come into abutment with the first slope surfaces 712A of spring cups 712. Surfaces 712A of the spring cups 712 are designed, along with the length and configuration of pins 724, such that from that point on, further pivoting results in depression of pins 724 relative to springs 728. Springs 728 thus start creating resistance against moving pole 10 to vertical from that point on. This helps control against uncontrollable flopping of pole 10 to the vertical position which could cause structural damage or present risk of harm to workers. In the embodiment shown in FIGS. 74–78, the configuration begins creating resistance when the pole is about 20 degrees from vertical. Pressure or resistance allows a soft "landing" for pole 10 which deters it from going over center.

Similarly, this structure provides assistance when lowering pole 10. When tipping pole 10 down, pressure or resistance is applied to pole 10 by roller 312 (see FIGS. 53 and 52). A pair of pin and spring combinations 724/728 (depending on which side of plate 200B is being pivoted) keep pressure on roller 312 and keep the winch cable tight until there is enough weight on roller 312 to push it down by gravity.

By having pairs of spring cups 712 and pin/spring combination 724/728 on opposite sides of pieces 200A and 200B, by unpinning pieces 200A or 200B at either side, tipping can occur in either direction.

Pin 724 is installed through a spring retainer 721 bolted on the top of piece 200B. A collar in spring retainer 730 is secured to pin 724 by spring pin 732. Spring 728 can be a 1.5 OD by 0.7 ID by 5 LG die spring (McMaster number 9296K87 or equal).

It is to be understood that the foregoing are but examples of forms that the invention can take. Variations obvious to those skilled in the art shall be included within scope of the invention, which is defined solely by the claims herein.

What is claimed:

1. A lighting apparatus comprising:
   a base comprising a frame having a ground-contacting portion adapted for stationary placement of the base on the ground and having a pole mount, the base being adapted to be loaded on, unloaded from, and carried upon an over-the-road truck or trailer for movement from position to position and having a height, length, width and weight within acceptable over the road regulations;
   a pole having a lower end adapted to removably mount on the pole mount of the base and an upper end adjustable between a retracted position and extended position greater than 35 feet from the lower end of the pole; and
   a light head including one or more high-intensity lighting fixtures adapted to removably mount on the upper end of the pole;
   each pole in retracted position and each light head, having a height, length, width and weight within acceptable over the road regulations and adapted to be separated from the base and each other and transported on an over-the-road truck or trailer.

2. The apparatus of claim 1 wherein the frame of the base comprises a bottom, sides, and a top which define an interior area of the frame, and including a mount on or near the top adapted to receive a pole.

3. The apparatus of claim 2 further comprising a removable weight adapted for installation into the frame of the base.

4. The apparatus of claim 2 wherein the ground-contacting portion of the base comprises one or more outriggers.

5. The apparatus of claim 2 wherein the base is dimensioned to resist overturning moment in relation to the height of the pole when extended, expected use conditions, and the nature of the light head and lighting fixture mounted to the pole.

6. The apparatus of claim 2 wherein the base further comprises receivers for lift truck forks.

7. The apparatus of claim 2 wherein the dimensions of the base fit on a standard over-the-road semi trailer or truck.

8. The apparatus of claim 2 wherein the base further comprises adjustable components to level the base upon a supporting surface.

9. The apparatus of claim 1 wherein the pole comprises:
   (a) a first pole section;
   (b) a second pole section adapted to nest inside the first pole section between a collapsed position where a substantial amount of the second pole section is inside the first pole section but a portion of the second pole section is above the first pole section and telescopically extend along the longitudinal axis to an extended position where a substantial amount of the second pole section is extended outside the first pole section.

10. The apparatus of claim 9 wherein the pole comprises hollow tubular steel.

11. The apparatus of claim 9 further comprising a releasable locking member mounted on the pole and comprising a component that engages said first and second pole sections when the second pole section is in the extended position to releasably lock the second pole section against longitudinal movement relative the first pole section.

12. The apparatus of claim 9 wherein the pole comprises a plurality of pole sections telescopically related to one another.

13. The apparatus of claim 1 wherein said pole mount of the base comprises a stub adapted to receive the bottom end of a pole by slip-fitting.

14. The apparatus of claim 13 wherein said stub is mounted on a bracket that is connected to the base.

15. The apparatus of claim 14 wherein said bracket is pivotable between a position where said stub is generally vertical to a position where said stub is generally horizontal.

16. The apparatus of claim 1 wherein the lighting fixture comprises a light source on the order of 1,000 watts or greater.

17. The apparatus of claim 16 wherein the lighting head further comprises a mounting connection for removable mounting to the upper end of the pole.

18. The apparatus of claim 17 further comprising the lower end of the pole is adapted to slip-fit on the pole mount comprising a stub extending from the base.

19. The apparatus of claim 17 further comprising a removable framework adapted for removable connection to the light head and to the base to support the light head when separated from the pole for shipment connected to the base.

20. The apparatus of claim 19 wherein the framework further comprises moveable portions to which the light head is attachable allowing the light head to be collapsed closer the perimeter of the base make the light head and base combination smaller for transport.

21. The apparatus of claim 1 wherein the base, pole, and lighting fixture have dimensions that less than or equal to perimeter dimension of a conventional, over-the-road trailer for a tractor-trailer combination.

22. The apparatus of claim 21 wherein the trailer is approximately 50' by 8' wide.

23. The apparatus of claim 21 in combination with a conventional trailer for an over-the-road tractor-trailer.

24. The apparatus of claim 21 in combination with a trailer of an over-the-road tractor-trailer.

25. The apparatus of claim 1 further comprising a plurality of bases, poles, and light heads.

26. The apparatus of claim 25 in combination with a conventional trailer for an over-the-road tractor-trailer combination.

27. The apparatus of claim 25 in combination with a conventional over-the-road truck.

28. The apparatus of claim 25 wherein said plurality of bases, poles, and lighting fixtures comprises four to six sets of each.

29. The apparatus of claim 28 wherein the bases, poles, and lighting fixtures are in combination with a conventional over-the-road trailer of a tractor-trailer combination where the combined total weight is less than approximately 80,000 pounds.

30. The apparatus of claim 25 further comprising one or more electrical power generators.

31. The apparatus of claim 30 further comprising electrical controls and connections between an electrical power source and the lighting fixtures.

32. The apparatus of claim 25 further comprising a lift truck.

33. The apparatus of claim 32 wherein said lift-truck has a relative small size.

34. The apparatus of claim 33 wherein said lift-truck removably mounts on a conventional over-the-road trailer.

35. The apparatus of claim 34 when said lift-truck has a vertical reach of at least eight feet.

36. The apparatus of claim 25 wherein said poles when retracted are less than 35' long, but when extended are greater than 35' long.

37. The apparatus of claim 36 wherein said poles when extended are greater than 50' long.

38. A lighting system comprising:
a plurality of bases each comprising a frame having a ground-contacting portion adapted for stationary placement of the base on the ground and having a pole mount, the base being adapted to be loaded on, unloaded from, and carried upon an over the road truck or trailer for movement from position to position and having a height, length, width and weight within acceptable over the road regulations, each base being positionable independently of the other bases;
a plurality of poles, each pole comprising:
  (a) a first tubular pole section adapted to removably mounted to a pole mount of a base;
  (b) a second pole section adapted to nest inside the first pole section between a collapsed position where a substantial amount of the second pole section is inside the first pole section but a portion of the second pole section is above the first pole section and telescopically extends along the longitudinal axis to an extended position where a substantial amount of the second pole section is extended outside the first pole section;
a plurality of mounting arrays each adapted to mount on the upper end of a pole, each mounting array comprising one or more high intensity light fixtures.

39. A lighting system comprising:
a plurality of moveable bases of the size to fit on and be transported by a single semi-trailer of no longer than approximately 50 feet;
a plurality of lighting arrays each adapted to mount on the upper end of a pole but transportable on said semi-trailer;
a plurality of poles each adapted to removably mount on a base and having an upper end adjustable between a retracted position and an extended position greater than 35 feet, sized to fit on and be transported by said trailer when in a retracted position;
so that one or more sets of a base, array, and pole can be transported on one trailer to a location, each base removed and set at a desired position off of the trailer, an array mounted on a pole, a pole mounted on a base, and the pole extended, to provide moveable, high-intensity lighting at substantial heights which can be disassembled, loaded to the trailer, and ready for over-the-road transport to another application.

40. A method of moveable wide area lighting comprising:
loading a base, a lighting array, and an extendable pole to elevate a lighting array to between 35 feet and 120 feet, all adapted to fit and be transported on a standard over-the-road tractor-trailer or truck and not exceed weight or size limitations thereof, on a said tractor-trailer or truck;
transporting the trailer or truck to an area to be lighted;
unloading the base, array, and pole from the trailer or truck;
positioning the base as desired off of the trailer or truck;
attaching the array to the pole;
mounting the pole/array to the base;
extending the pole.

41. The method of claim 40 further comprising reversing the procedure of claim 40 to load the base, array, and pole for transport to a different lighting application.

* * * * *

UNITED STATES PATENT AND TRADEMARK OFFICE
CERTIFICATE OF CORRECTION

PATENT NO.     : 6,692,142 B1
DATED          : February 17, 2004
INVENTOR(S)    : Gordin et al.

It is certified that error appears in the above-identified patent and that said Letters Patent is hereby corrected as shown below:

Title page,
Item [54], Title, should be -- APPARATUS, METHOD, AND SYSTEM OF MOVEABLE LIGHTING --

Signed and Sealed this

Twenty-seventh Day of April, 2004

JON W. DUDAS
*Acting Director of the United States Patent and Trademark Office*